US012603834B2

(12) United States Patent
Barac et al.

(10) Patent No.: US 12,603,834 B2
(45) Date of Patent: Apr. 14, 2026

(54) ENHANCED QUALITY-OF-EXPERIENCE (QoE) MEASUREMENTS WITH NON-APPLICATION LAYER INFORMATION

(71) Applicant: Telefonaktiebolaget LM Ericsson (publ), Stockholm (SE)

(72) Inventors: Filip Barac, Huddinge (SE); Luca Lunardi, Genoa (IT); Ali Parichehrehteroujeni, Linköping (SE); Johan Rune, Lidingö (SE); Cecilia Eklöf, Täby (SE); Angelo Centonza, Granada (ES); Nicklas Johansson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 664 days.

(21) Appl. No.: 17/928,756

(22) PCT Filed: Jun. 2, 2021

(86) PCT No.: PCT/SE2021/050513
§ 371 (c)(1),
(2) Date: Nov. 30, 2022

(87) PCT Pub. No.: WO2022/005359
PCT Pub. Date: Jan. 6, 2022

(65) Prior Publication Data
US 2023/0216751 A1     Jul. 6, 2023

Related U.S. Application Data

(60) Provisional application No. 63/046,183, filed on Jun. 30, 2020.

(51) Int. Cl.
H04W 24/00     (2009.01)
H04L 41/5067     (2022.01)
(Continued)

(52) U.S. Cl.
CPC .......... *H04L 45/24* (2013.01); *H04L 41/5067* (2013.01); *H04L 45/243* (2022.05); *H04W 24/08* (2013.01)

(58) Field of Classification Search
CPC ... H04L 45/24; H04L 41/5067; H04L 45/243; H04L 45/245; H04L 47/41; H04W 24/08
(Continued)

(56) References Cited

U.S. PATENT DOCUMENTS 11,509,546 B2     11/2022     Eklöf et al.
12,439,286 B2     10/2025     Kumar et al.
(Continued)

FOREIGN PATENT DOCUMENTS

WO     2019073340 A1     4/2019
WO     2019106055 A1     6/2019
(Continued)

OTHER PUBLICATIONS

"3GPP 38.331 V16.6.0", 5G; NR; Radio Resource Control (RRC); Protocol specification, ETSI TS 138 331 V16.6.0 (Release 16), Oct. 2021, pp. 1-948.
(Continued)

*Primary Examiner* — Tanmay K Shah
(74) *Attorney, Agent, or Firm* — Murphy, Bilak & Homiller, PLLC

(57) ABSTRACT

Embodiments include methods for a user equipment (UE) to perform quality of experience (QoE) measurements configured by a wireless network. Such methods include receiving, from a radio access network node (RNN) in the wireless network, a QoE measurement configuration for one or more services provided by the UE application layer. Such methods include performing application-layer QoE measurements for the one or more services according to the QoE measurement configuration and sending, to or via the RNN in accordance
(Continued)

with QoE measurement configuration, one or more messages comprising: one or more QoE measurement reports comprising results of the QoE measurements; and network assistance information (NAI) related to one or more paths that carry data associated with the one or more services. Other embodiments include complementary methods for RNNs and measurement functions, as well as UEs, RNNs, and measurement functions configured to perform such methods.

18 Claims, 20 Drawing Sheets

(51) Int. Cl.
    *H04L 45/24*         (2022.01)
    *H04L 45/243*      (2022.01)
    *H04W 24/08*      (2009.01)
(58) Field of Classification Search
    USPC ........................................................ 455/423
    See application file for complete search history.

(56)             References Cited

U.S. PATENT DOCUMENTS

| | | | |
|---|---|---|---|
| 2013/0114446 A1 | 5/2013 | Liu et al. | |
| 2013/0128756 A1 | 5/2013 | Zhang et al. | |
| 2013/0268577 A1 | 10/2013 | Oyman | |
| 2013/0286868 A1 | 10/2013 | Oyman et al. | |
| 2017/0134980 A1 | 5/2017 | Persson et al. | |
| 2018/0035438 A1* | 2/2018 | Pao ...................... | H04W 72/21 |
| 2018/0041913 A1 | 2/2018 | Zhu et al. | |
| 2018/0324617 A1 | 11/2018 | Schmidt et al. | |
| 2019/0222491 A1 | 7/2019 | Tomkins et al. | |
| 2020/0112907 A1 | 4/2020 | Dao et al. | |
| 2020/0145851 A1 | 5/2020 | Berlin et al. | |
| 2020/0280498 A1 | 9/2020 | Eklf et al. | |
| 2021/0352749 A1 | 11/2021 | Szilagyi et al. | |
| 2021/0409998 A1 | 12/2021 | Kwok et al. | |
| 2022/0070709 A1 | 3/2022 | Kumar et al. | |
| 2022/0158781 A1 | 5/2022 | Zhu et al. | |
| 2022/0279385 A1 | 9/2022 | Johansson et al. | |
| 2022/0417780 A1 | 12/2022 | Liu et al. | |
| 2023/0115085 A1 | 4/2023 | Hu et al. | |
| 2023/0116324 A1 | 4/2023 | Eklf et al. | |

FOREIGN PATENT DOCUMENTS

| | | |
|---|---|---|
| WO | 2022005359 A1 | 1/2022 |
| WO | 2022075904 A1 | 4/2022 |

OTHER PUBLICATIONS

"3GPP TS 26.114 V16.5.2", 3rd Generation Partnership Project; Technical Specification Group Services and System Aspects; IP Multimedia Subsystem (IMS); Multimedia Telephony; Media handling and interaction (Release 16), Mar. 2020, pp. 1-446.
"3GPP TS 26.247 V16.2.0", 3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 16), Dec. 2019, pp. 1-139.
"3GPP TS 27.007 V16.4.0", 3rd Generation Partnership Project; Technical Specification Group Core Network and Terminals; AT command set for User Equipment (UE) (Release 16), Mar. 2020, pp. 1-355.
"3GPP TS 32.422 V16.1.0", 3rd Generation Partnership Project; Technical Specification Group Services and System Aspects; Telecommunication management; Subscriber and equipment trace; Trace control and configuration management (Release 16), Mar. 2020, pp. 1-214.

"3GPP TS 33.210 V16.3.0", 3rd Generation Partnership Project; Technical Specification Group Services and System Aspects; 3G security; Network Domain Security (NDS); IP network layer security (Release 16), Mar. 2020, pp. 1-27.
"3GPP TS 36.300 V16.0.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), Dec. 2019, pp. 1-366.
"3GPP TS 36.331 V15.9.0", 3rd Generation Partnership Project; Technical Specification Group Radio Access Network; Evolved Universal Terrestrial Radio Access (E-UTRA); Radio Resource Control (RRC); Protocol specification (Release 15), Mar. 2020, pp. 1-964.
"3GPP TS 33.501 V16.2.0", 3rd Generation Partnership Project; Technical Specification Group Services and System Aspects; Security architecture and procedures for 5G system (Release 16), Mar. 2020, pp. 1-227.
"Discussion on QoE measurement collection for RDC", 3GPP TSG-RAN WG2 Meeting #105, R2-1901857, Athens, Greece, Feb. 25-Mar. 1, 2019, pp. 1-3.
"UE Application Layer Measurement ID and Type for QoE for Streaming service in Eutran", 3GPP TSG-RAN3 Meeting #98, R3-174807, Reno, USA, November 27-Dec. 1, 2017, pp. 1-22.
"3GPP TS 37.340 V16.1.0", 3rd Generation Partnership Project; Technical Specification Group Radio Access Network; Evolved Universal Terrestrial Radio Access (E-UTRA) and NR; Multiconnectivity; Stage 2 (Release 16), Mar. 2020, pp. 1-74.
"3GPP TS 38.423 V16.1.0", 3rd Generation Partnership Project; Technical Specification Group Radio Access Network; NG-RAN; Xn application protocol (XnAP) (Release 16), Mar. 2020, pp. 1-334.
"3GPP TS 38.300 V16.1.0", 3rd Generation Partnership Project; Technical Specification Group Radio Access Network; NR; NR and NG-RAN Overall Description; Stage 2 (Release 16), Mar. 2020, pp. 1-133.
"3GPP TS 38.331 V16.0.0", 3rd Generation Partnership Project; Technical Specification Group Radio Access Network; NR; Radio Resource Control (RRC) protocol specification (Release 16), Mar. 2020, pp. 1-835.
"3GPP TS 25.331 V15.1.0", 3rd Generation Partnership Project; Technical Specification Group Radio Access Network; Radio Resource Control (RRC); Protocol specification (Release 15), Dec. 2017, pp. 1-2316.
"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.
"3GPP TR 38.804 V14.0.0", 3rd Generation Partnership Project; Technical Specification Group Radio Access Network; Study on New Radio Access Technology; Radio Interface Protocol Aspects (Release 14), Mar. 2017, pp. 1-57.
"3GPP TS 23.501 V16.4.0", 3rd Generation Partnership Project; Technical Specification Group Services and System Aspects; System architecture for the 5G System (5GS); Stage 2 (Release 16), Mar. 2020, pp. 1-430.
"3GPP TS 25.133 V16.0.0", 3rd Generation Partnership Project; Technical Specification Group Radio Access Network; Requirements for support of radio resource management (FDD) (Release 16), Dec. 2018, pp. 1-411.
"3GPP TS 28.405 V16.0.0", 3rd Generation Partnership Project; Technical Specification Group Services and System Aspects; Telecommunication management; Quality of Experience (QoE) measurement collection; Control and configuration (Release 16), Jul. 2020, pp. 1-16.
"3GPP TS 38.314 V16.1.0", 3rd Generation Partnership Project; Technical Specification Group Radio Access Network; NR; Layer 2 Measurements; (Release 16), Sep. 2020, pp. 1-18.
"3GPP TS 38.331 V16.2.0", 3rd Generation Partnership Project; Technical Specification Group Radio Access Network; NR; Radio Resource Control (RRC) protocol specification (Release 16), Sep. 2020, pp. 1-921.
"LS Reply on QoE Measurement Collection", 3GPP TSG-SA4 Meeting #109-e, S4-200962, Online, May 20-Jun. 3, 2019, pp. 1-2.

(56) References Cited

OTHER PUBLICATIONS

"Potential RAN3 impacts about QoE measurement", 3GPP TSG-RAN WG3 #109-e, R3-205283, E-Meeting, Aug. 17-28, 2020, pp. 1-6.
"Summary of NR QoE Services", 3GPP TSG-RAN WG3 #109-e, RS-205479, Online, Aug. 17-28, 2020, pp. 1-8.
"3GPP TS 38.215 V16.4.0", 3rd Generation Partnership Project; Technical Specification Group Radio Access Network; NR; Physical layer measurements (Release 16), Dec. 2020, pp. 1-25.
"3GPP TR 36.805 V9.0.0", 3rd Generation Partnership Project; Technical Specification Group Radio Access Network; Study on Minimization of drive-tests in Next Generation Networks; (Release 9), Dec. 2009, pp. 1-24.
"3GPP TS 28.405 V1.3.0", S5-202345; 3rd Generation Partnership Project; Technical Specification Group Services and System Aspects; Telecommunication management; Quality of Experience (QoE) measurement collection; Control and configuration (Release 16), Apr. 2020, pp. 1-53.
"3GPP TS 36.413 V16.1.0", 3rd Generation Partnership Project; Technical Specification Group Radio Access Network; Evolved Universal Terrestrial Radio Access Network (E-UTRAN); S1 Application Protocol (S1AP) (Release 16), Mar. 2020, pp. 1-130.
"3GPP TS 38.463 V15.4.0", 3rd Generation Partnership Project; Technical Specification Group Radio Access Network; NG-RAN; E1 Application Protocol (E1AP) (Release 15), Jul. 2019, pp. 1-177.
"Agreements for MR-DC with 5GC", 3GPP TSG-RAN WG2 Meeting #104, R2-1819036, Spokane, USA, Nov. 12-16, 2018, pp. 1-53.
"Alignment of radio related measurement and QoE measurement", 3GPP TSG-RAN WG3 #112-e, R3-212496, Online, May 17-28, 2021, pp. 1-3.
"Discussion QoE Measurement Collection for streaming services", 3GPP TSG-RAN WG2 #96, R2-168022, Reno, Nevada, USA, Nov. 14-18, 2016, pp. 1-22.
"NR QoE Measurement Triggering, Configuration, Collection and Reporting", 3GPP TSG-RAN WG2 Meeting #109-e, R2-2007600, Electronic meeting, Aug. 17-28, 2020, pp. 1-5.
"QoE measurement collection additions", 3GPP TSG RAN2 Meeting #110, R2-2004624, Electronic meeting, Jun. 1-12, 2020, pp. 1-80.
"Stage 2 TP to update bearer type description", 3GPP TSG-RAN WG2 Meeting#100, R2-1714183, Reno, USA, Nov. 27-Dec. 1, 2017, pp. 1-30.
"3GPP TS 36.331 V16.0.0", 3rd Generation Partnership Project; Technical Specification Group Radio Access Network; Evolved Universal Terrestrial Radio Access (E-UTRA); Radio Resource Control (RRC); Protocol specification (Release 16), Mar. 2020, pp. 1-1048.
"3GPP TS 36.423 V16.1.0", 3rd Generation Partnership Project; Technical Specification Group Radio Access Network; Evolved Universal Terrestrial Radio Access Network (E-UTRAN); X2 application protocol (X2AP) (Release 16), Mar. 2020, pp. 1-438.
"3GPP TS 38.401 V16.1.0", 3rd Generation Partnership Project; Technical Specification Group Radio Access Network; NG-RAN; Architecture description (Release 16), Mar. 2020, pp. 1-50.
"3GPP TS 38.473 V16.1.0", 3rd Generation Partnership Project; Technical Specification Group Radio Access Network; NG-RAN; F1 application protocol (F1AP) (Release 16), Mar. 2020, pp. 1-240.
"3GPP TR 38.806 V15.0.0", 3rd Generation Partnership Project; Technical Specification Group Radio Access Network; Study of separation of NR Control Plane (CP) and User Plane (UP) for split option 2; (Release 15), Dec. 2017, pp. 1-22.

"3GPP TS 28.307 V16.0.0", 3rd Generation Partnership Project; Technical Specification Group Radio Access Network; Radio Resource Control (RRC); Protocol specification (Release 16), Jul. 2020, pp. 1-10.
"3GPP TS 28.308 V16.0.0", 3rd Generation Partnership Project; Technical Specification Group Services and System Aspects; Telecommunication management; Quality of Experience (QoE) measurement collection Integration Reference Point (IRP); Information Service (IS) (Release 16), Jul. 2020, pp. 1-21.
"3GPP TS 28.309 V16.0.0", 3rd Generation Partnership Project; Tech Spec Grp Services and System Aspects; Telecommunication management; Mgmt of Quality of Experience (QoE) measurement collection Integration Reference Point (IRP); Solution Set (SS) definitions (Release 16), Sep. 2020, pp. 1-31.
"3GPP TS 28.621 V16.0.0", 3rd Generation Partnership Project; Technical Specification Group Services and System Aspects; Telecommunication management; Generic Network Resource Model (NRM) Integration Reference Point (IRP); Requirements (Release 16), Jul. 2020, pp. 1-7.
"3GPP TS 28.622 V16.5.0", 3rd Generation Partnership Project; Technical Specification Group Services and System Aspects; Telecommunication management; Generic Network Resource Model (NRM) Integration Reference Point (IRP); Information Service (IS) (Release 16), Sep. 2020, pp. 1-55.
"3GPP TS 28.623 V16.4.0", 3rd Generation Partnership Project; Technical Specification Group Services and System Aspects; Telecommunication management; Generic Network Resource Model (NRM) Integration Reference Point (IRP); Solution Set (SS) definitions (Release 16), Jul. 2020, pp. 1-90.
"3GPP TS 32.441 V16.0.0", 3rd Generation Partnership Project; Technical Specification Group Services and System Aspects; Telecommunication management; Trace Management Integration Reference Point (IRP); Requirements (Release 16), Jul. 2020, pp. 1-15.
"3GPP TS 32.442 V16.0.0", 3rd Generation Partnership Project; Technical Specification Group Services and System Aspects; Telecommunication management; Trace Management Integration Reference Point (IRP); Information Service (IS) (Release 16), Jul. 2020, pp. 1-32.
"3GPP TS 32.446 V16.0.0", 3rd Generation Partnership Project; Technical Specification Group Services and System Aspects; Telecommunication management; Trace Management Integration Reference Point (IRP); Solution Set (SS) definitions (Release 16), Jul. 2020, pp. 1-47.
"3GPP TS 33.210 V16.4.0", 3rd Generation Partnership Project; Technical Specification Group Services and System Aspects; Network Domain Security (NDS); IP network layer security (Release 16), Jul. 2020, pp. 1-27.
"New WI proposal: Quality of Experience (QoE) Measurement Collection for streaming services in E-UTRAN", 3GPP TSG RAN meeting #81, Gold Coast, Australia, RP-181640, Revision of RP-170956, Sep. 10-13, 2018, pp. 1-5.
"Summary of Offline Discussion on NR QoE Management Solutions", 3GPP TSG-RAN WG3 Meeting #109-e, R3-205726, Online, Aug. 17-27, 2020, pp. 1-13.
"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.2.1, Sep. 2020, pp. 1-1081.
"3rd Generation Partnership Project; Technical Specification Group Radio Access Network; NR; NR and NG-RAN Overall Description; Stage 2 (Release 16)", 3GPP TS 38.300 V16.3.0, Sep. 2020, pp. 1-148.
ETSI, "Universal Mobile Telecommunications System (UMTS); Radio Resource Control (RRC); Protocol specification (3GPP TS 25.331 version 16.1.0 Release 16)", ETSI TS 125 331 V16.1.0, Nov. 2020, pp. 1-2382.

* cited by examiner

```
-- ASN1START
-- TAG-VARMOBILITYHISTORYREPORT-START

VarMobilityHistoryReport-r16 ::= VisitedCellInfoList-r16

-- TAG-VARMOBILITYHISTORYREPORT-STOP
-- ASN1STOP
```

FIG. 16A

```
-- ASN1START
-- TAG-VISITEDCELLINFOLIST-START
VisitedCellInfoList-r16 ::= SEQUENCE (SIZE (1..maxCellHistory-r16)) OF
                                     VisitedCellInfo-r16

VisitedCellInfo-r16 ::=   SEQUENCE {
    visitedCellId-r16          CHOICE {
        nr-CellId-r16            CHOICE {
            cgi-Info                 CGI-InfoNR,
            pci-arfcn-r16            SEQUENCE {
                physCellId-r16           PhysCellId,
                carrierFreq-r16          ARFCN-ValueNR
            }
        },
        eutra-CellId-r16         CHOICE {
            cellGlobalId-r16         CGI-InfoEUTRA,
            pci-arfcn-r16            SEQUENCE {
                physCellId-r16           PhysCellId,
                carrierFreq-r16          ARFCN-ValueEUTRA
            }
        }
    }                                        OPTIONAL,
    timeSpent-r16              INTEGER (0..4095),
    ...
}
-- TAG-VISITEDCELLINFOLIST-STOP
-- ASN1STOP
```

FIG. 16B

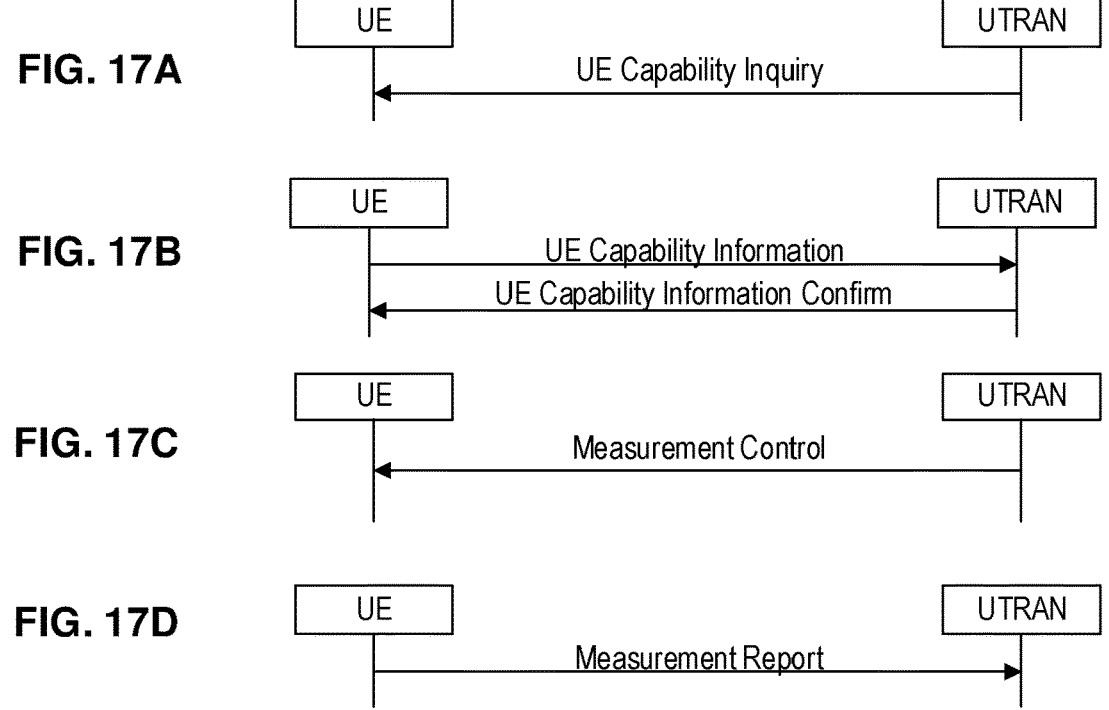

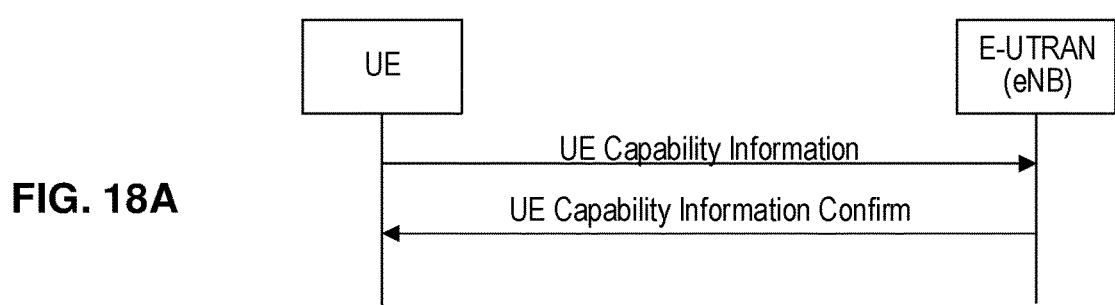

FIG. 18A

```
MeasParameters-v1530 ::=           SEQUENCE {
     qoe-MeasReport-r15                 ENUMERATED {supported}    OPTIONAL,
     qoe-MTSI-MeasReport-r15            ENUMERATED {supported}    OPTIONAL,
     ca-IdleModeMeasurements-r15        ENUMERATED {supported}    OPTIONAL,
     ca-IdleModeValidityArea-r15        ENUMERATED {supported}    OPTIONAL,
     heightMeas-r15                     ENUMERATED {supported}    OPTIONAL,
     multipleCellsMeasExtension-r15     ENUMERATED {supported}    OPTIONAL
}

MeasParameters-v16xy ::=          SEQUENCE {
     qoe-Extensions-r16                 ENUMERATED {supported}    OPTIONAL
}
```

FIG. 18B

```
-- ASN1START
QoE-Reference-r16 ::=       SEQUENCE {
     plmn-Identity-r16       PLMN-Identity,
     qmc-Id-r16              OCTET STRING (SIZE (3))
}
-- ASN1STOP
```

FIG. 18C

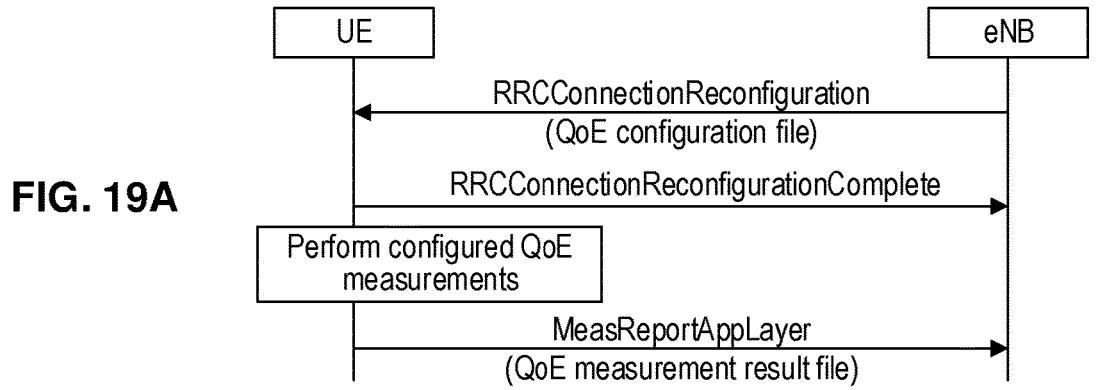

FIG. 19A

```
measConfigAppLayer-r15          CHOICE {
    release                     NULL,
    setup                       SEQUENCE{
        measConfigAppLayerContainer-r15    OCTET STRING (SIZE(1..1000)),
        serviceType-r15                    ENUMERATED {qoe, qoemtsi, spare6, spare5, spare4, spare3, spare2, spare1}
    }
} measConfigAppLayerToAddModList-r18    SEQUENCE (SIZE (1.. maxQoE-Measurement-r18)) OF MeasConfigAppLayer-r18 OPTIONAL,  -- Need ON
measConfigAppLayerToReleaseList-r18   SEQUENCE (SIZE (1.. maxQoE-Measurement-r18)) OF MeasReleaseAppLayer-r18 OPTIONAL  -- Need ON MeasConfigAppLayer-r18 ::= SEQUENCE {
    measConfigAppLayerContainer-r15 OCTET STRING (SIZE(1..1000))    OPTIONAL,  -- Need ON
    serviceType-r18                 ServiceType-r18                 OPTIONAL,  -- Need ON
    qoe-Reference-r18               QoE-Reference-r18               OPTIONAL,  -- Need ON
    withinArea-r18                  ENUMERATED {inside, outside}    OPTIONAL,  -- Need ON
    temporaryStopQoE-r18            BOOLEAN,
    restartQoE-r18                  BOOLEAN
}

MeasReleaseAppLayer-r18 ::= SEQUENCE {
    serviceType-r18                 ServiceType-r18                 OPTIONAL,  -- Need ON
    qoe-Reference-r18               QoE-Reference-r18               OPTIONAL   -- Need ON
}
```

FIG. 19B

```
-- ASN1START
MeasReportAppLayer-r15 ::=          SEQUENCE {
    criticalExtensions             CHOICE {
        measReportAppLayer-r15          MeasReportAppLayer-r15-IEs,
        criticalExtensionsFuture        SEQUENCE {}
    }
}

MeasReportAppLayer-r15-IEs ::=      SEQUENCE {
    measReportAppLayerContainer-r15     OCTET STRING (SIZE(1..8000))                          OPTIONAL,
    serviceType-r15                     ENUMERATED {qoe, qoemtsi, spare6, spare5, spare4, spare3, spare2, spare1}   OPTIONAL,
    nonCriticalExtension                MeasReportAppLayer-v1590-IEs                          OPTIONAL
}

MeasReportAppLayer-v1590-IEs ::= SEQUENCE {
    lateNonCriticalExtension            OCTET STRING                                          OPTIONAL,
    nonCriticalExtension                MeasReportAppLayer-IEs-v18xy                          OPTIONAL
}

MeasReportAppLayer-IEs-v18xy ::= SEQUENCE {
    qoe-Reference-r18                   QoE-Reference-r18                                      OPTIONAL,  -- Need ON
    recordingSessionIndication-r18      BOOLEAN                                               OPTIONAL,  -- Need ON
    nonCriticalExtension                SEQUENCE {}                                           OPTIONAL
}
-- ASN1STOP
```

FIG. 19C

```
-- ASN1START
MeasReportAppLayer-r17 ::=        SEQUENCE {
    criticalExtensions               CHOICE {
        measReportAppLayer-r17           MeasReportAppLayer-r17-IEs,
        criticalExtensionsFuture         SEQUENCE {}
    }
}

MeasReportAppLayer-r17-IEs ::=    SEQUENCE {
    measReportAppLayerContainer-r17   OCTET STRING (SIZE(1..8000))             OPTIONAL,
    serviceType-r17                   ENUMERATED {qoe, qoemtsi, spare6, spare5, spare4,
                                                 spare3, spare2, spare1}     OPTIONAL,
    mobilityHistoryReport-r17         MobilityHistoryReport-r17               OPTIONAL,
    nonCriticalExtension              MeasReportAppLayer-v17xy-IEs            OPTIONAL
}

MeasReportAppLayer-v17xy-IEs ::=  SEQUENCE {
    lateNonCriticalExtension          OCTET STRING                            OPTIONAL,
    nonCriticalExtension              SEQUENCE {}                             OPTIONAL
}
-- ASN1STOP
```

FIG. 21

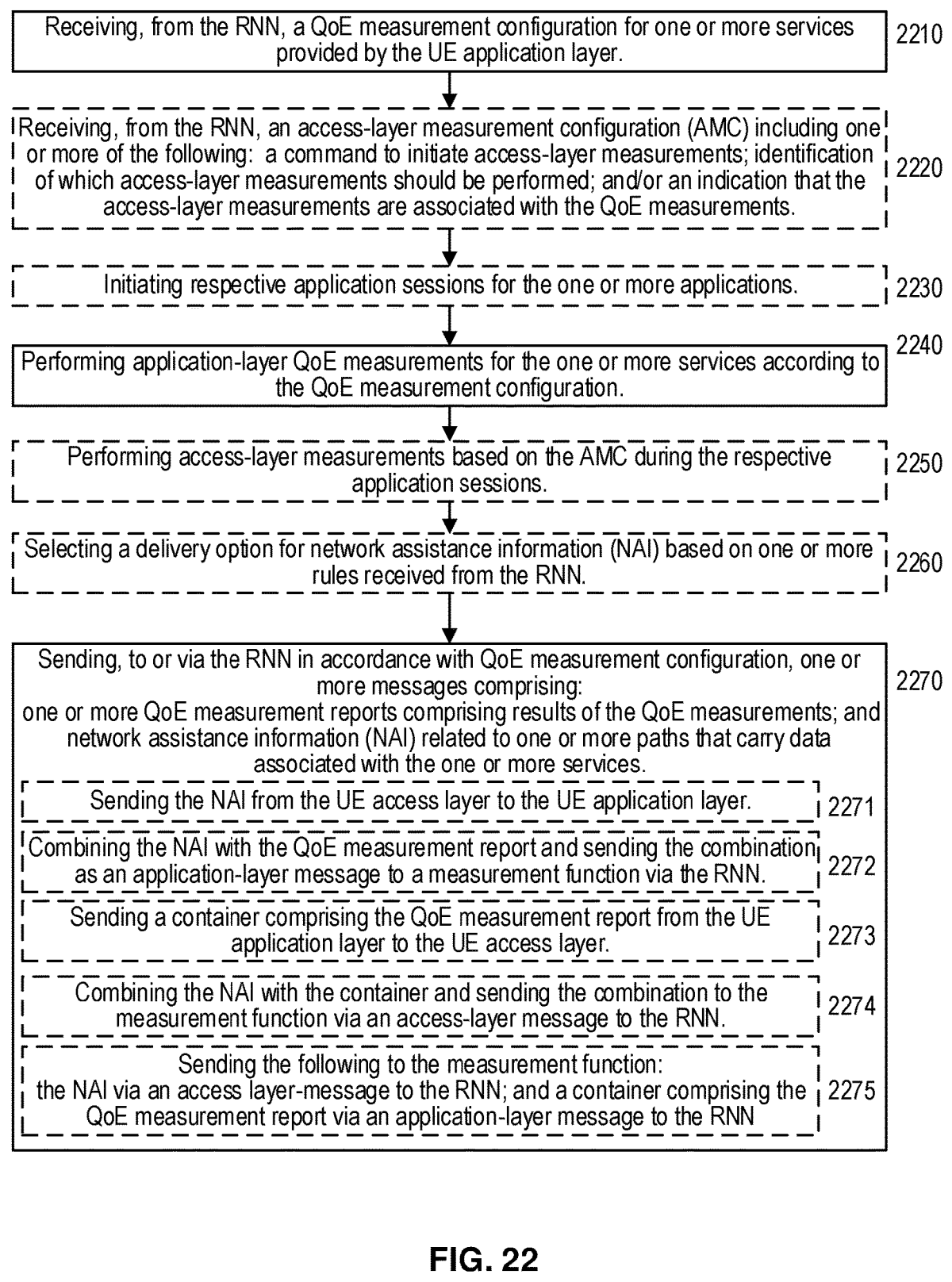

Receiving, from the RNN, a QoE measurement configuration for one or more services provided by the UE application layer.  2210

Receiving, from the RNN, an access-layer measurement configuration (AMC) including one or more of the following: a command to initiate access-layer measurements; identification of which access-layer measurements should be performed; and/or an indication that the access-layer measurements are associated with the QoE measurements.  2220

Initiating respective application sessions for the one or more applications.  2230

Performing application-layer QoE measurements for the one or more services according to the QoE measurement configuration.  2240

Performing access-layer measurements based on the AMC during the respective application sessions.  2250

Selecting a delivery option for network assistance information (NAI) based on one or more rules received from the RNN.  2260

Sending, to or via the RNN in accordance with QoE measurement configuration, one or more messages comprising:
one or more QoE measurement reports comprising results of the QoE measurements; and network assistance information (NAI) related to one or more paths that carry data associated with the one or more services.  2270

Sending the NAI from the UE access layer to the UE application layer.  2271

Combining the NAI with the QoE measurement report and sending the combination as an application-layer message to a measurement function via the RNN.  2272

Sending a container comprising the QoE measurement report from the UE application layer to the UE access layer.  2273

Combining the NAI with the container and sending the combination to the measurement function via an access-layer message to the RNN.  2274

Sending the following to the measurement function:
the NAI via an access layer-message to the RNN; and a container comprising the QoE measurement report via an application-layer message to the RNN  2275

FIG. 22

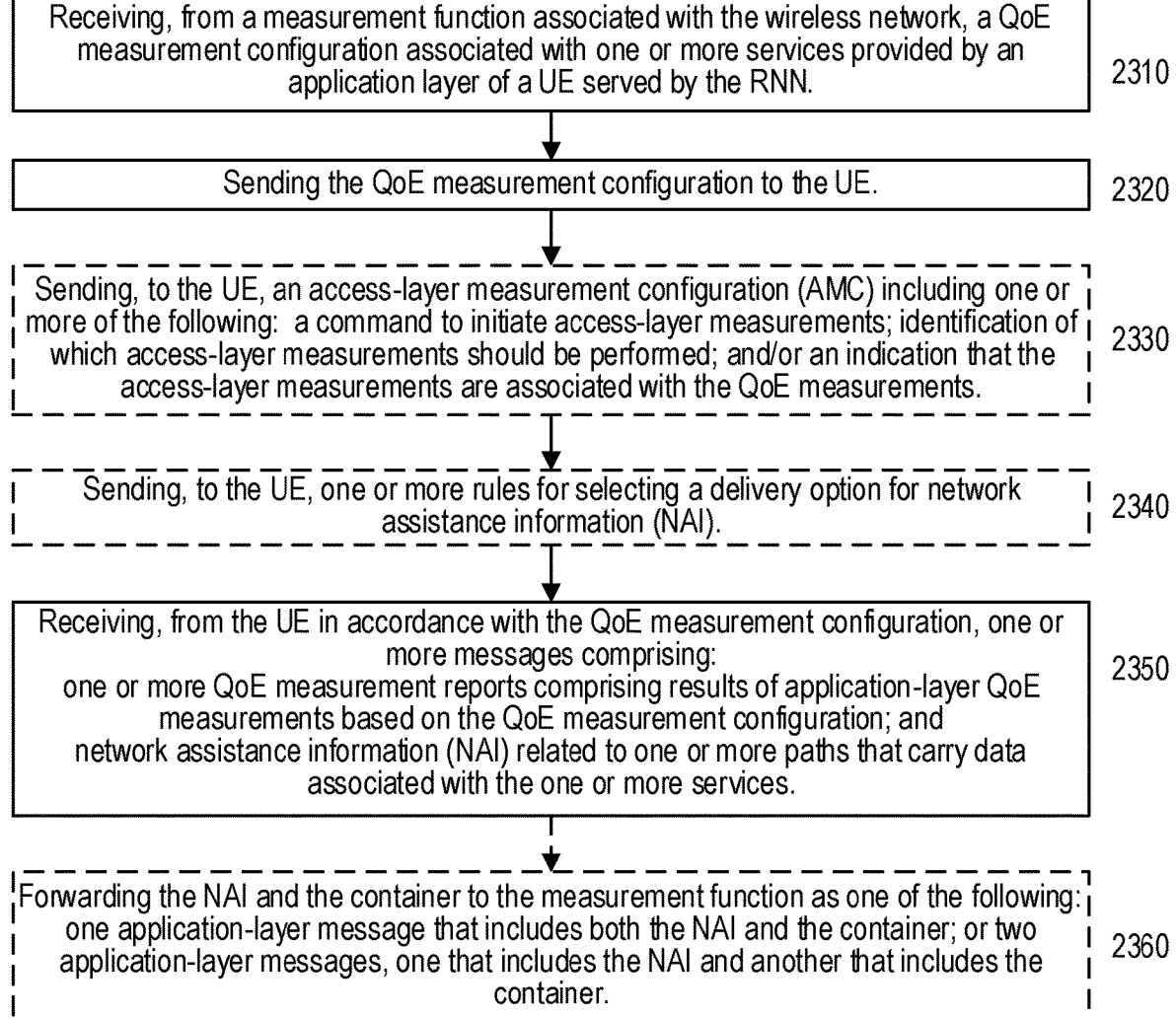

Receiving, from a measurement function associated with the wireless network, a QoE measurement configuration associated with one or more services provided by an application layer of a UE served by the RNN.    2310

Sending the QoE measurement configuration to the UE.    2320

Sending, to the UE, an access-layer measurement configuration (AMC) including one or more of the following: a command to initiate access-layer measurements; identification of which access-layer measurements should be performed; and/or an indication that the access-layer measurements are associated with the QoE measurements.    2330

Sending, to the UE, one or more rules for selecting a delivery option for network assistance information (NAI).    2340

Receiving, from the UE in accordance with the QoE measurement configuration, one or more messages comprising:
one or more QoE measurement reports comprising results of application-layer QoE measurements based on the QoE measurement configuration; and
network assistance information (NAI) related to one or more paths that carry data associated with the one or more services.    2350

Forwarding the NAI and the container to the measurement function as one of the following: one application-layer message that includes both the NAI and the container; or two application-layer messages, one that includes the NAI and another that includes the container.    2360

FIG. 23

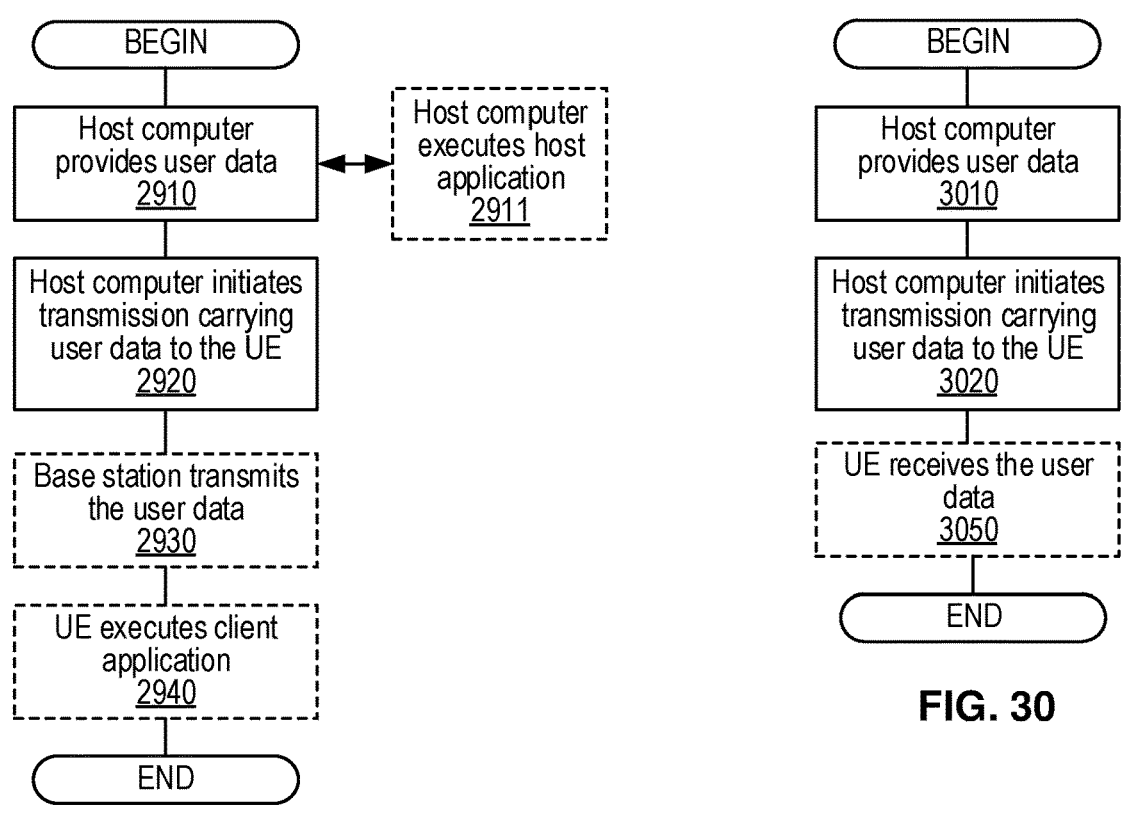
FIG. 29
FIG. 30
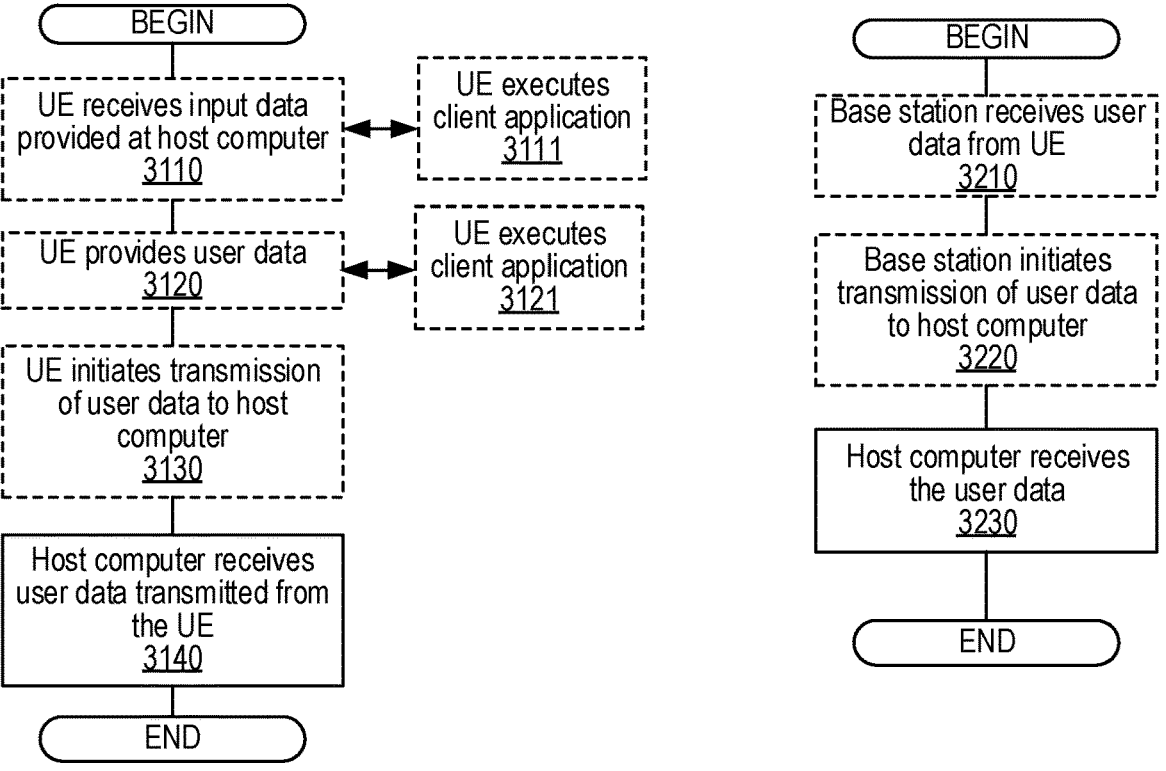
FIG. 31
FIG. 32

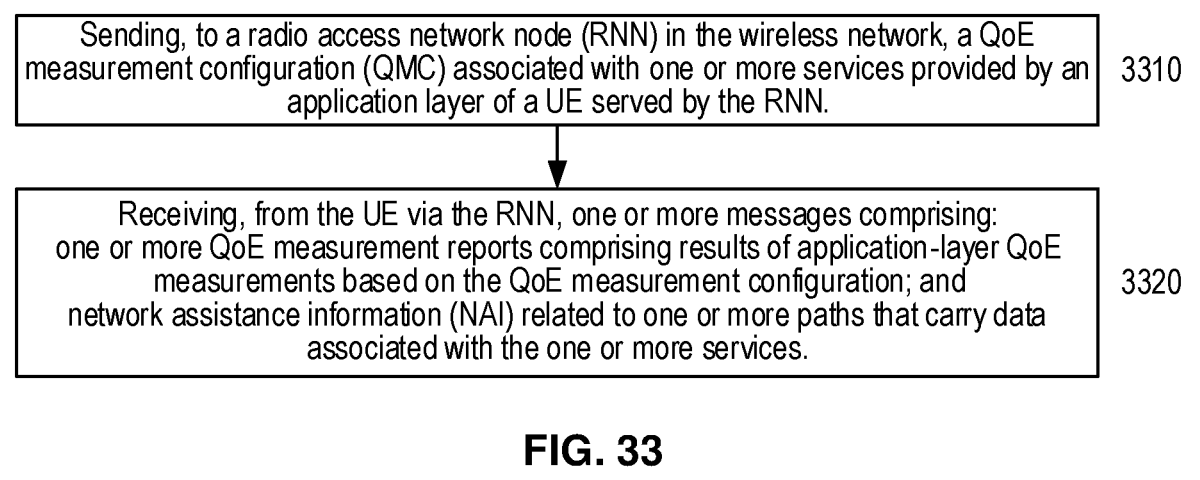

Sending, to a radio access network node (RNN) in the wireless network, a QoE measurement configuration (QMC) associated with one or more services provided by an application layer of a UE served by the RNN.    3310

Receiving, from the UE via the RNN, one or more messages comprising:
one or more QoE measurement reports comprising results of application-layer QoE measurements based on the QoE measurement configuration; and
network assistance information (NAI) related to one or more paths that carry data associated with the one or more services.    3320

FIG. 33

ENHANCED QUALITY-OF-EXPERIENCE (QoE) MEASUREMENTS WITH NON-APPLICATION LAYER INFORMATION

TECHNICAL FIELD

The present invention generally relates to wireless communication networks and particularly relates to measuring end-user experience in wireless networks, also referred to as quality of experience (QoE).

BACKGROUND

Long-Term Evolution (LTE) is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMEs 134 and 138 via respective S6a interfaces.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well 25 as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state.

Quality of Experience (QoE) measurements have been specified for UEs operating in LTE networks and in earlier-generation UMTS networks. Measurements in both networks operate according to the same high-level principles. Their purpose is to measure the experience of end users when using certain applications over a network. For example, QoE measurements for streaming services and for MTSI (Mobility Telephony Service for IMS) are supported in LTE.

RRC signaling is used to configure application layer measurements in UEs and to collect QoE measurement result files from the configured UEs. In particular, application layer measurement configuration from the core network (e.g., EPC) or a network operations/administration/maintenance (OAM) function is encapsulated in a transparent container and sent to the serving eNB, which forwards it to a UE in an RRC message. Application layer measurements made by the UE are encapsulated in a transparent container and sent to the serving eNB in an RRC message. The serving eNB then forwards the container to a Trace Collector Entity (TCE) or a Measurement Collection Entity (MCE) associated with the EPC.

Currently the fifth generation ("5G") of cellular systems, also referred to as New Radio (NR), is being standardized within the Third-Generation Partnership Project (3GPP). NR is developed for maximum flexibility to support a variety of different use cases. These include enhanced mobile broadband (eMBB), machine type communications (MTC), ultrareliable low latency communications (URLLC), side-link device-to-device (D2D), and several other use cases. 5G/NR technology shares many similarities with fourth-generation LTE. For example, both PHYs utilize similar arrangements of time-domain physical resources into 1-ms subframes that include multiple slots of equal duration, with each slot including multiple OFDM-based symbols. As another example, NR RRC layer includes RRC_IDLE and RRC_CONNECTED states, but adds another state known as RRC_INACTIVE. In addition to providing coverage via "cells," as in LTE, NR networks also provide coverage via "beams." In general, a DL "beam" is a coverage area of a network-transmitted RS that may be measured or monitored by a UE.

QoE measurements will also be needed for UEs operating in NR networks. However, the existing framework for QoE measurements does not address the various options and/or complexities of a UE's connectivity with networks that include both LTE and NR. Furthermore, the existing framework does not provide the level of granularity and/or control for QoE measurements in these networks. Solutions to these problems, issues, and/or drawbacks are needed.

SUMMARY

Embodiments of the present disclosure provide specific improvements to QoE measurements in a wireless network, such as by facilitating solutions to overcome exemplary problems summarized above and described in more detail below.

Embodiments of the present disclosure include methods (e.g., procedures) for performing quality of experience (QoE) measurements configured by a wireless network. These exemplary methods can be performed by a user equipment (UE, e.g., wireless device, IoT device, modem, etc. or component thereof).

These exemplary methods can include receiving, from a radio access network node (RNN) in the wireless network (e.g., E-UTRAN, NG-RAN), a QoE measurement configuration for one or more one or more services provided by the UE application layer. These exemplary methods can also include performing application-layer QoE measurements for the one or more services according to the QoE measurement configuration. These exemplary methods can also include sending, to or via the RNN in accordance with QoE measurement configuration, one or more messages comprising: one or more QoE measurement reports comprising results of the QoE measurements; and network assistance information (NAI) related to one or more paths that carry data associated with the one or more services.

In some embodiments, the NAI can include the following: an indication of whether one or multiple paths carry the data associated with the one or more services; channel or link quality information associated with each path; and one or more identifiers associated with each path.

In case of multiple paths, the NAI can also include one or more of the following: indication of multi-path features used in the multiple paths; indication of portions of the data carried by each path; and indication of whether the multiple paths carry the same data or different subsets of data.

In some embodiments, the multi-path features used in the multiple paths can include any of the following: dual connectivity (DC) with two different RNNs; carrier aggregation (CA) with multiple component carriers; uplink (UL) and supplementary UL; licensed and unlicensed spectrum; duplicate PDCP PDUs over multiple routes; multiple GTP-U tunnels; and multiple backhaul access protocol (BAP) routes.

In some embodiments, when the multi-path features used in the multiple paths include DC with two different RNNs, the NAI can also include an indication of which of the following carry the data: MCG bearer, MCG split bearer, SCG bearer, and SCG split bearer.

In some embodiments, the NAI can also include an indication of one or more switches between single and multiple paths during the QoE measurements and a time of occurrence for each switch. As another option, the NAI can also include a plurality of NAI subsets corresponding to respective durations between consecutive switches between single and multiple paths during the QoE measurements.

In some embodiments, the channel or link quality information associated with each path can be provided (e.g., in the NAI) in one or more of the following forms: one or more statistics for a measured application session; multiple samples or sample statistics (e.g., averages) collected during respective time intervals comprising the measured application session; and a last sample collected before sending the QoE measurement report.

In some embodiments, the NAI can also include information related to UE mobility, including any of the following: one or more of the following to which the UE was registered while performing the QoE measurements: public land mobile network (PLMN) identity, tracking area code (TAC), and/or tracking area identity (TAI); an indication that the UE has performed one or more mobility operations since sending the most recent QoE measurement report; number of mobility operations performed; identification of each mobility operation; time of occurrence of each mobility operation; identification of source and target cells for each mobility operation; list of visited cells since sending the most recent QoE measurement report; and timer values associated with each mobility operation.

In various embodiments, sending the one or more messages can include first, second, or third operations. The first operations include sending the NAI from the UE access layer to the UE application layer (e.g., within the UE); combining the NAI with the QoE measurement report; and sending the combination as an application-layer message to a management function via the RNN. The second operations include sending a container comprising the QoE measurement report from the UE application layer to the UE access layer; In combining the NAI with the container; and sending the combination to the measurement function via an access-layer message to the RNN. The third operations include sending the following to the measurement function: the NAI via an access layer-message to the RNN; and a container comprising the QoE measurement report via an application-layer message to the RNN.

In some embodiments, when multiple paths carry the data associated with the one or more applications, each message comprising a QoE measurement report and NAI can be sent according to one of the following delivery options:

via one of the multiple paths;
  redundantly via the multiple paths; or
  QoE measurements and NAI associated with the respective paths are sent via the respective paths.

In some of these embodiments, these exemplary methods can also include selecting a delivery option for the NAI based on one or more rules received from the RNN, wherein the rules are related to one or more of the following: current network conditions; current radio channel conditions; criticality of the QoE measurements and/or the NAI; and size of the QoE measurements and/or the NAI.

In some embodiments, these exemplary methods can also include receiving, from the RNN after receiving the QoE measurement configuration, an access-layer measurement configuration (AMC) including one or more of the following:

a command to initiate access-layer measurements upon UE initiation of respective application sessions for the one or more services;
  identification of which access-layer measurements should be performed; and
  an indication that the access-layer measurements are associated with the QoE measurements.

In some embodiments, these exemplary methods can also include the following: after receiving the QoE measurement configuration and the AMC, initiating respective application sessions for the one or more services; and performing access-layer measurements based on the AMC during the respective application sessions. The NAI is based on these access-layer measurements.

Other embodiments include methods (e.g., procedures) for configuring quality of experience (QoE) measurements by user equipment (UEs). These exemplary methods can be performed by a radio access network node (RNN, e.g., base station, eNB, gNB, ng-eNB, en-gNB, etc., or component thereof) in a wireless network (e.g., E-UTRAN, NG-RAN).

These exemplary methods can include receiving, from a measurement function associated with the wireless network, a QoE measurement configuration associated with one or more services provided by an application layer of a UE served by the RNN. These exemplary methods can also include sending the QoE measurement configuration to the UE. These exemplary methods can also include receiving, from the UE in accordance with the QoE measurement configuration, one or more messages comprising: QoE measurement reports comprising application-layer QoE measurements based on the QoE measurement configuration; and network assistance information (NAI) based on access-layer measurements related to one or more paths that carry data associated with the one or more services.

In various embodiments, the NAI can include any of the information discussed above in relation to UE embodiments.

In some embodiments, the one or more messages received from the UE can include one of the following:

an access layer-message that includes the NAI and an application-layer message that includes a container comprising the QoE measurement report; or
  an application-layer message that includes both the NAI and the container.

In such embodiments, these exemplary methods can also include forwarding the NAI and the container to the measurement function as one of the following:

one application-layer message that includes both the NAI and the container; or.
  two application-layer messages, one that includes the NAI and another that includes the container.

In some embodiments, these exemplary methods can also include sending, to the UE, one or more rules for selecting one of the following delivery options for the NAI:

via one of multiple paths that carry the data associated with the one or more services;
  redundantly via the multiple paths; or
  QoE measurements and NAI associated with the respective paths are sent via the respective paths.

In some embodiments, the one or more rules are related to one or more of the following: current network conditions; current radio channel conditions; criticality of the QoE measurements and/or the NAI; and size of the QoE measurements and/or the NAI.

In some embodiments, these exemplary methods can also include sending, to the UE, an access-layer measurement configuration (AMC) including one or more of the following:

a command to initiate access-layer measurements upon UE initiation of respective application sessions for the one or more services;
  identification of which access-layer measurements should be performed; and
  an indication that the access-layer measurements are associated with the QoE measurements.

In such embodiments, the received NAI can be based on the access-layer measurements.

Other embodiments include exemplary methods (e.g., procedures) for configuring quality of experience (QoE) measurements by user equipment (UEs), according to various exemplary embodiments of the present disclosure. These exemplary methods can be performed by a measurement function (e.g., MCE, TCE, etc.) associated with a wireless network (e.g., E-UTRAN, NG-RAN).

These exemplary methods can include sending, to a radio access network node (RNN) in the wireless network, a QoE measurement configuration associated with one or more services provided by an application layer of a UE served by the RNN. The exemplary method can also include the operations of block 3320, where the measurement function can receive, from the UE via the RNN, one or more messages comprising: one or more QoE measurement reports comprising results of the QoE measurements; and network assistance information (NAI) related to one or more paths that carry data associated with the one or more services.

In various embodiments, the NAI can include any of the information discussed above in relation to UE embodiments.

In various embodiments, the one or more messages received from the UE via the RNN include one or more of the following:

one application-layer message that includes both the NAI and a container comprising a QoE measurement report; and two application-layer messages, one that includes the NAI and another that includes the container comprising the QoE measurement report.

In some embodiments, when multiple paths carry the data associated with the one or more applications, each message comprising a QoE measurement report and NAI is received from the UE according to one of the following delivery options:

via one of the multiple paths;

redundantly via the multiple paths; or

QoE measurements and NAI associated with the respective paths are received via the respective paths.

Other embodiments include UEs (e.g., wireless devices, IoT devices, etc. or component(s) thereof), RNNs (e.g., base stations, eNBs, gNBs, ng-eNBs, etc., or components thereof), and measurement functions (e.g., MCEs, TCEs, etc.) configured to perform operations corresponding to any of the exemplary methods described herein. Other embodiments include non-transitory, computer-readable media storing program instructions that, when executed by processing circuitry, configure such UEs, RNNs, measurement functions to perform operations corresponding to any of the exemplary methods described herein.

Because a network is informed about individual performance of each multi-connectivity path used to carry data for a measured application-layer service, embodiments can enable the network to optimize actions taken based on QoE measurement reports. In addition, embodiments facilitate a finer and/or more granular analysis of the QoE measurement reports by leveraging information about multi-connectivity (e.g., CA, DC, and/or PDCP duplication) being used by UEs. As such, the network can classify, map, and/or associate users' QoE measurements with various RAN settings and configurations. Such classification, mapping, and/or association enables the network to determine optimized configurations that can meet QoE requirements for various services.

These and other objects, features, and advantages of embodiments of the present disclosure will become apparent upon reading the following Detailed Description in view of the Drawings briefly described below.

BRIEF DESCRIPTION OF THE DRAWINGS

FIGS. 16A-B show an exemplary ASN.1 data structure for a VarMobilityHistoryReport stored by a UE.

FIGS. 17A-D show various procedures between a UTRAN and a UE for QoE measurements in a legacy UMTS network.

FIGS. 18A-C illustrate various aspects of QoE measurement configuration for a UE in an LTE network.

FIGS. 19A-C illustrate various aspects of QoE measurement collection for a UE in an LTE network.

FIG. 21 shows an exemplary ASN.1 data structure for a MeasReportAppLayer message, according to various exemplary embodiments of the present disclosure.

FIG. 22 is a flow diagram of an exemplary method (e.g., procedure) for a user equipment (UE, e.g., wireless device, IoT device, etc. or component(s) thereof), according to various exemplary embodiments of the present disclosure.

FIG. 23 is a flow diagram of an exemplary method (e.g., procedure) for a RAN node (RNN, e.g., eNB, gNB, ng-eNB, en-gNB, etc. or component(s) thereof), according to various exemplary embodiments of the present disclosure.

FIGS. 29-32 are flow diagrams of exemplary methods and/or procedures for transmission and/or reception of user data, according to various exemplary embodiments of the present disclosure.

FIG. 33 is a flow diagram of an exemplary method (e.g., procedure) for a measurement function (e.g., MCE, TCE, etc.) associated with a wireless network, according to various exemplary embodiments of the present disclosure.

DETAILED DESCRIPTION

Figures 1, 2, 3:
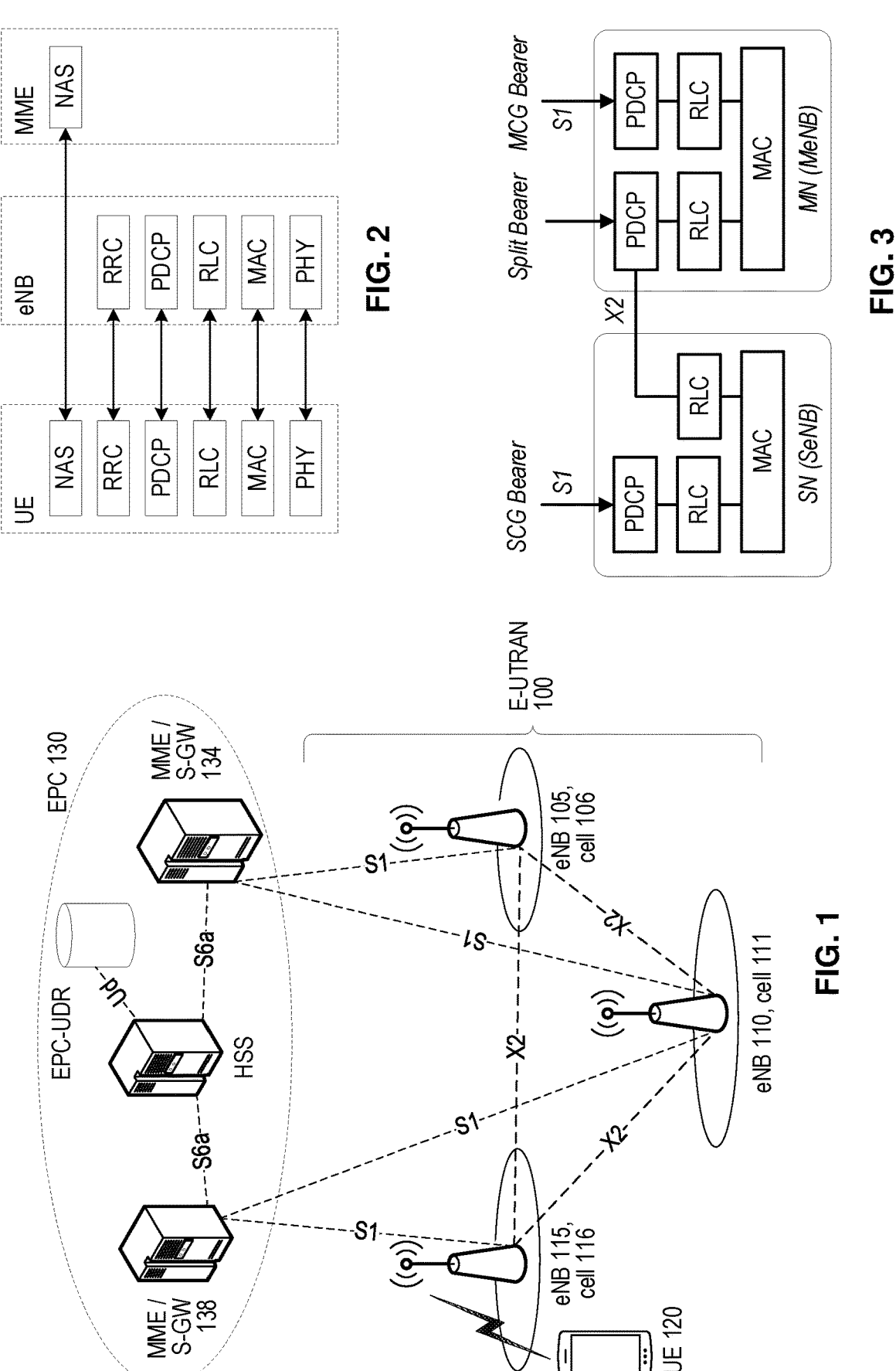
FIG. 1 is a high-level block diagram of an exemplary architecture of the Long-Term Evolution (LTE) Evolved UTRAN (E-UTRAN) and Evolved Packet Core (EPC) network, as standardized by 3GPP.
FIG. 2 is a block diagram of exemplary control plane (CP) protocol layers of the radio (Uu) interface between a user equipment (UE) and the E-UTRAN.
FIGS. 3, 4A, and 4B illustrate various aspects of dual connectivity (DC) in an LTE network.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB/en-gNB) in a 3GPP Fifth Generation (5G) NR network or an enhanced or evolved Node B (eNB/ng-eNB) in a 3GPP LTE network), base station distributed components (e.g., CU and DU), base station control- and/or user-plane components (e.g., CU-CP, CU-UP), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VOIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, the existing framework for QoE measurements does not address the various options and/or complexities of a UE's connectivity with networks that include both LTE and NR. Furthermore, the existing framework does not provide the level of granularity and/or control for QoE measurements in these networks. This is discussed in more detail below, after the following description of various aspects of LTE and NR network architecture.

3GPP Rel-10 supports bandwidths larger than 20 MHz. One important Rel-10 requirement is backward compatibility with Rel-8. As such, a wideband LTE Rel-10 carrier (e.g., >20 MHz) should appear as a plurality of carriers ("component carriers" or CCs) to a Rel-8 ("legacy") terminal. Legacy terminals can be scheduled in all parts of the wideband Rel-10 carrier. One way to achieve this is by Carrier Aggregation (CA), whereby a Rel-10 terminal can receive multiple CCs, each preferably having the same structure as a Rel-8 carrier.

LTE dual connectivity (DC) was introduced in Rel-12. In DC operation, a UE in RRC_CONNECTED state consumes radio resources provided by at least two different network points connected to one another with a non-ideal backhaul. In LTE, these two network points may be referred to as a "Master eNB" (MeNB) and a "Secondary eNB" (SeNB). More generally, master node (MN), anchor node, and MeNB can be used interchangeably, and the terms secondary node (SN), booster node, and SeNB can be used interchangeably. DC can be viewed as a special case of CA, in which the aggregated carriers (or cells) are provided by network nodes that are physically separated and not connected via a robust, high-capacity connection.

More specifically, in DC, the UE is configured with a Master Cell Group (MCG) and a Secondary Cell Group (SCG). A Cell Group (CG) is a group of serving cells associated with either the MeNB or the SeNB(s) and includes one MAC entity, a set of logical channels with associated RLC entities, a primary cell, and optionally one or more secondary cells. The Master Cell Group (MCG) is a group of serving cells associated with the MeNB and includes a primary cell (PCell) and optionally one or more secondary cells (SCells). A Secondary Cell Group (SCG) is a group of serving cells associated with the SeNB and includes a Primary SCell (PSCell) and optionally one or more SCells. The term "Special Cell" (or "SpCell" for short) refers to the PCell of the MCG or the PSCell of the SCG depending on whether the UE's MAC entity is associated with the MCG or the SCG, respectively. In non-DC operation (e.g., CA), SpCell refers to the PCell. An SpCell is always activated and supports physical uplink control channel (PUCCH) transmission and contention-based random access by UEs.

The MN provides system information (SI) and terminates the control plane connection towards the UE and, as such, is the controlling node of the UE, including handovers to and from SNs. For example, the MN terminates the connection between the eNB and the Mobility Management Entity (MME) for the UE. An SN provides additional radio resources (e.g., bearers) for radio resource bearers include MCG bearers, SCG bearers, and split bearers that have resources from both MCG and SCG. The reconfiguration, addition, and removal of SCells can be performed by RRC. When adding a new SCell, dedicated RRC signaling is used to send the UE all required SI of the SCell, such that UEs need not acquire SI directly from the SCell broadcast. It is also possible to support CA in either or both of MCG and SCG. In other words, either or both of the MCG and the SCG can include multiple cells working in CA.

Figures 4A, 4B:
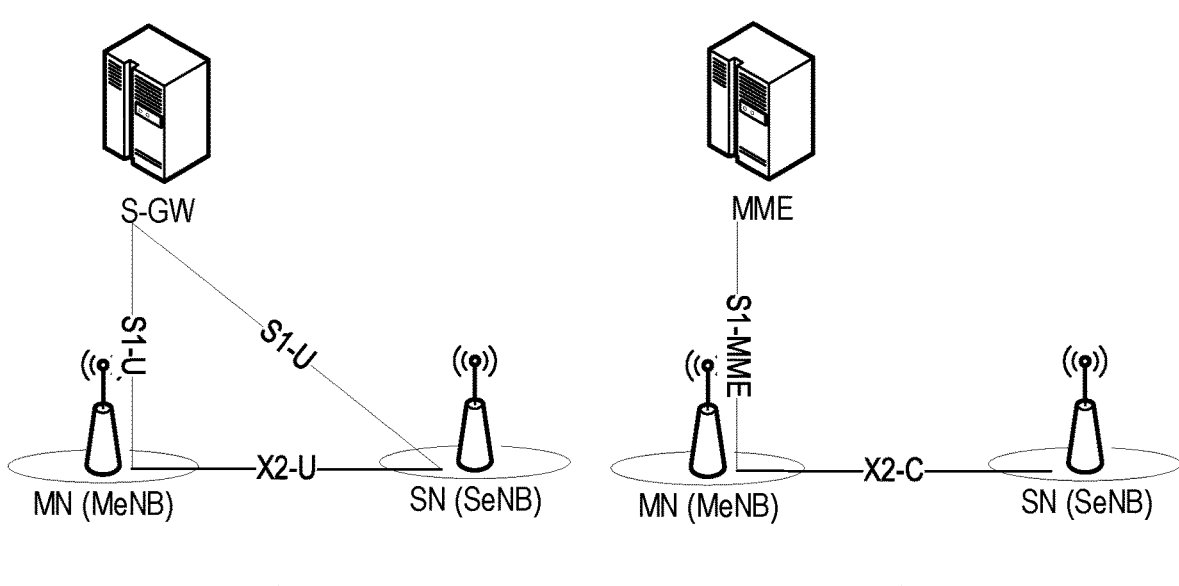

FIG. 3 shows an aggregated user plane (UP) protocol stack for LTE DC, while FIG. 4A shows the inter-eNB connectivity for LTE DC UP. The UP aggregation shown in FIG. 3 achieves benefits such as increasing the throughput for users with good channel conditions and the capability of receiving and transmitting at higher data rates than can be supported by a single node, even without a low-latency backhaul connection between MeNB/MN and SeNB/SN.

As shown in FIG. 3, the LTE DC UP includes three different types of bearers. MCG bearers are terminated in the MN, and the S1-U connection for the corresponding bearer (s) to the S-GW is terminated in the MN (shown in FIG. 4A). The SN is not involved in the transport of UP data for MCG bearers. Likewise, SCG bearers are terminated in the SN, which can be directly connected with the S-GW via S1-U (as shown in FIG. 4A). The MN is not involved in the transport of UP data for SCG bearers. An S1-U connection between S-GW and SN is only present if SCG bearers are configured. Finally, split bearers are also terminated in the MN, with PDCP data being transferred between MN and SN via X2-U interface (shown in FIG. 4A). Both SN and MN are involved in transmitting data for split bearers.

FIG. 4B shows the inter-eNB CP connectivity for LTE DC. In this arrangement, all MME signaling is carried over the MeNB's S1-MME interface to the MME, with the SeNB's signaling also carried over the X2-C interface with the MeNB. The network's RRC connection with the UE is handled only by the MeNB, such that SRBs are always configured as MCG bearer type and only use radio resources of the MeNB. However, the MeNB can also configure the UE based on input from the SeNB and, in this manner, the SeNB can indirectly control the UE.

Figure 5:
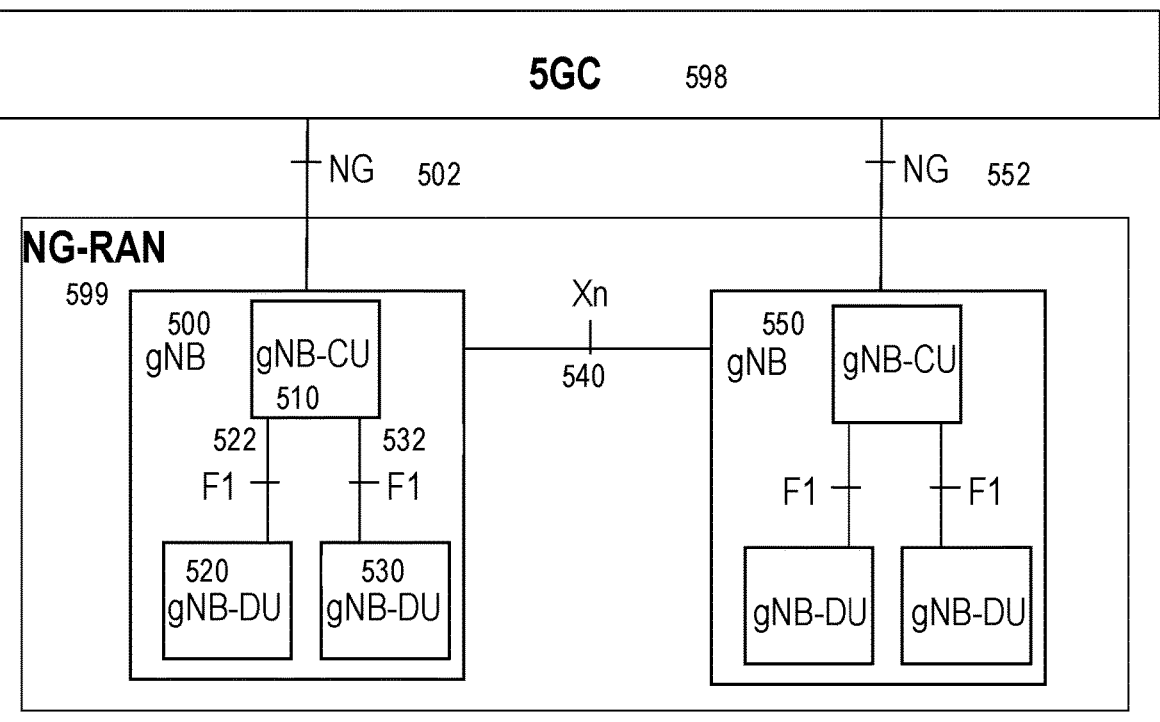
FIG. 5 shows a high-level views of an exemplary 5G network architecture.

FIG. 5 illustrates a high-level view of the 5G network architecture, consisting of a Next Generation RAN (NG-RAN) 599 and a 5G Core (5GC) 598. NG-RAN 599 can include a set of gNodeB's (gNBs) connected to the 5GC via one or more NG interfaces, such as gNBs 500, 550 connected via interfaces 502, 552, respectively. In addition, the gNBs can be connected to each other via one or more Xn interfaces, such as Xn interface 540 between gNBs 500 and 550. With respect the NR interface to UEs, each of the gNBs can support frequency division duplexing (FDD), time division duplexing (TDD), or a combination thereof.

NG-RAN 599 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501 (v16.4.0). If security protection for CP and UP data on TNL of NG-RAN interfaces is supported, NDS/IP shall be applied.

The NG RAN logical nodes shown in FIG. 5 include a central (or centralized) unit (CU or gNB-CU) and one or more distributed (or decentralized) units (DU or gNB-DU). For example, gNB 500 includes gNB-CU 510 and gNB-DUs 520 and 540. CUs (e.g., gNB-CU 510) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUS and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 522 and 532 shown in FIG. 5. The gNB-CU and connected gNB-DUs are only visible to other gNBs and the 5GC as a gNB. In other words, the F1 interface is not visible beyond gNB-CU. In the gNB split CU-DU architecture illustrated by FIG. 4, DC can be achieved by allowing a UE to connect to multiple DUs served by the same CU or by allowing a UE to connect to multiple DUs served by different CUs.

DC is also envisioned as an important feature for 5G/NR networks. 3GPP TR 38.804 (v14.0.0) describes various exemplary dual-connectivity (DC) scenarios or configurations in which the MN and SN can apply either NR RAT, LTE RAT, or both, and can connect to either EPC or 5GC. The following terminology is used to describe these exemplary DC scenarios or configurations:

DC: LTE DC (i.e., both MN and SN employ LTE, as discussed above);

EN-DC: LTE-NR DC where MN (eNB) employs LTE and SN (gNB) employs NR, and both are connected to EPC.

NGEN-DC: LTE-NR dual connectivity where a UE is connected to one ng-eNB that acts as a MN and one gNB that acts as a SN. The ng-eNB is connected to the 5GC and the gNB is connected to the ng-eNB via the Xn interface.

NE-DC: LTE-NR dual connectivity where a UE is connected to one gNB that acts as a MN and one ng-eNB that acts as a SN. The gNB is connected to 5GC and the ng-eNB is connected to the gNB via the Xn interface.

NR-DC (or NR-NR DC): both MN and SN employ NR and connect to 5GC via NG.

MR-DC (multi-RAT DC): a generalization of the Intra-E-UTRA Dual Connectivity (DC) described in 3GPP TS 36.300 (v16.0.0), where a multiple Rx/Tx UE may be configured to utilize resources provided by two different nodes connected via non-ideal backhaul, one providing E-UTRA access and the other one providing NR access. One node acts as the MN and the other as the SN, with one using LTE and the other using NR. The MN and SN are connected via a network interface and at least the MN is connected to the core network. EN-DC, NE-DC, and NGEN-DC are different example cases of MR-DC.

Figure 6:
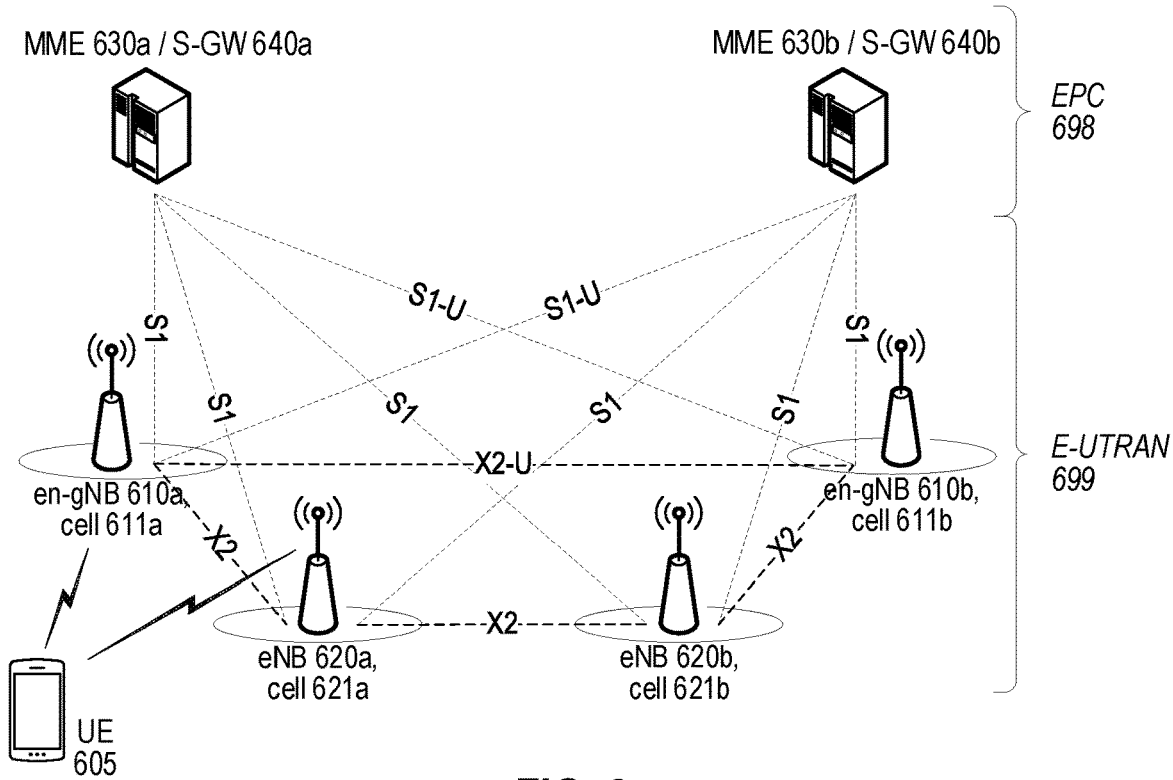
FIGS. 6-7 show high-level views of exemplary network architectures that support multi-RAT DC (MR-DC) using EPC and 5GC, respectively.

FIG. 6 shows a high-level view of an exemplary network architecture that supports EN-DC, including an E-UTRAN 699 and an EPC 698. As shown in the figure, E-UTRAN 699 can include en-gNBs 610 (e.g., 610*a,b*) and eNBs 620 (e.g., 620*a,b*) that are interconnected with each other via respective X2 (or X2-U) interfaces. The eNBs 620 can be similar to those shown in FIG. 1, while the ng-eNBs can be similar to the gNBs shown in FIG. 5 except that they connect to EPC 698 via an S1-U interface rather than to a 5GC via an X2 interface. The eNBs also connect to EPC 698 via an S1 interface, similar to the arrangement shown in FIG. 1. More specifically, en-gNBs 610 (e.g., 610*a,b*) and eNBs 620 (e.g., 620*a,b*) connect to MMEs (e.g., MMEs 630*a,b*) and S-GWs (e.g., S-GWs 640*a,b*) in EPC 698.

Each of the en-gNBs and eNBs can serve a geographic coverage area including one more cells, including cells 611*a-b* and 621*a-b* shown as exemplary in FIG. 6. Depending on the particular cell in which it is located, a UE 605 can communicate with the en-gNB or eNB serving that particular cell via the NR or LTE radio interface, respectively. In addition, UE 605 can be in EN-DC connectivity with a first cell served by an eNB and a second cell served by an en-gNB, such as cells 620*a* and 610*a* shown in FIG. 6.

Figure 7:
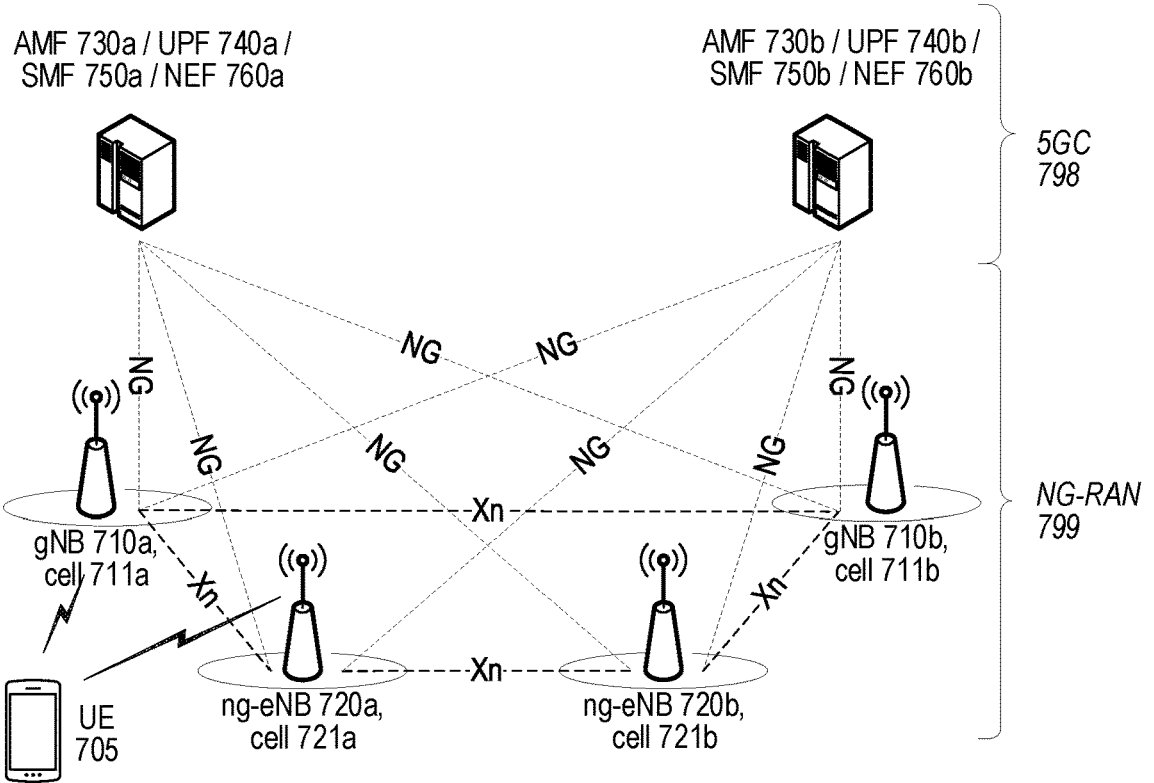

FIG. 7 shows a high-level view of an exemplary network architecture that supports MR-DC configurations based on a 5GC. More specifically, FIG. 7 shows an NG-RAN 799 and a 5GC 798. NG-RAN 799 can include gNBs 710 (e.g., 710*a,b*) and ng-eNBs 720 (e.g., 720*a,b*) that are interconnected with each other via respective Xn interfaces. The gNBs and ng-eNBs are also connected via the NG interfaces to 5GC 798, more specifically to the AMF (Access and Mobility Management Function) 730 (e.g., AMFs 730*a,b*) via respective NG-C interfaces and to the UPF (User Plane Function) 740 (e.g., UPFs 740*a,b*) via respective NG-U interfaces. Moreover, the AMFs 730*a,b* can communicate with one or more session management functions (SMFs, e.g., SMFs 750*a,b*) and network exposure functions (NEFs, e.g., NEFs 760*a,b*).

Each of the gNBs 710 can be similar to those shown in FIG. 5, while each of the ng-eNBs can be similar to the eNBs shown in FIG. 1 except that they connect to 5GC 798 via an NG interface rather than to EPC via an S1 interface. Each of the gNBs and ng-eNBs can serve a geographic coverage area including one more cells, including cells 711*a-b* and 721*a-b* shown as exemplary in FIG. 7. The gNBs and ng-eNBs can also use various directional beams to provide coverage in the respective cells. Depending on the particular cell in which it is located, a UE 705 can communicate with the gNB or ng-eNB serving that particular cell via the NR or LTE radio interface, respectively. In addition, UE 705 can be in MR-DC connectivity with a first cell served by an ng-eNB and a second cell served by a gNB, such as cells 720*a* and 710*a* shown in FIG. 7.

Figures 8, 9, 10:
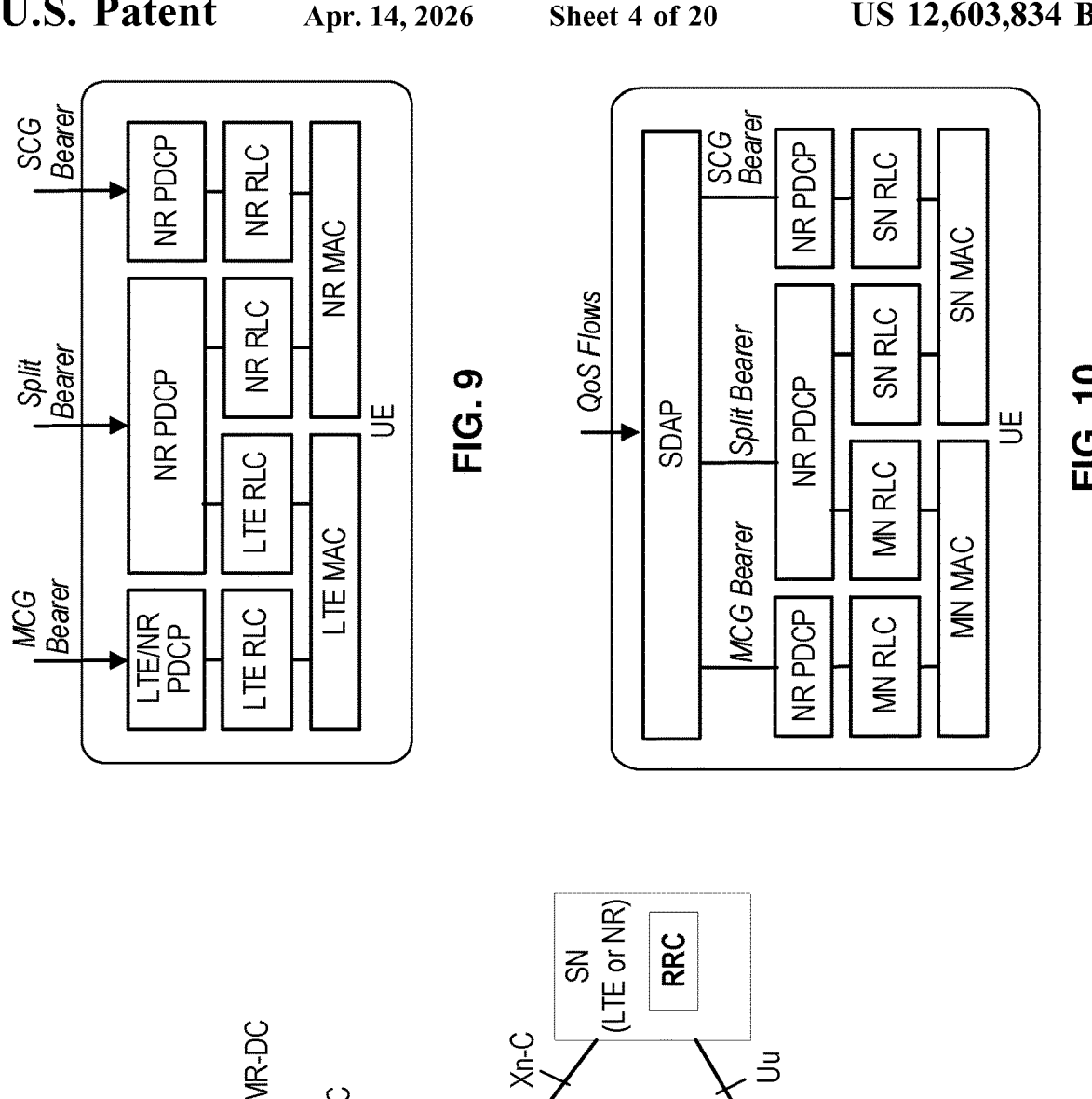
FIG. 8 is a block diagram showing a high-level comparison of control plane (CP) architectures of two DC alternatives.
FIGS. 9-10 show user plane (UP) radio protocol architectures from a UE perspective for the two DC alternatives shown in FIG. 8.

FIG. 8 is a block diagram showing a high-level comparison of control plane (CP) architectures in EN-DC with EPC (e.g., FIG. 6) and MR-DC with 5GC (e.g., FIG. 7). The particular RATs used by MN and SN in these two architectures are shown in parentheses and discussed in more detail above. In either case, the UE has a single RRC state based on the MN RRC (LTE or NR) and a single CP connection towards the CN via Uu interface to MN and S1-C or NG-C interface to CN, as the case may be. RRC PDUs generated by the SN can be transported via the X2-C or Xn-C interface to the MN (as the case may be) and the Uu interface from MN to UE. The MN always sends the initial SN RRC configuration via MCG SRB (SRB1), but subsequent reconfigurations may be transported via MN or SN. When transporting RRC PDU from the SN, the MN does not modify the UE configuration provided by the SN.

For E-UTRAN (e.g., eNB) connected to EPC, SRB1 uses E-UTRA PDCP at initial connection establishment. If the UE supports EN-DC, MCG SRB1 and SRB2 can be configured by the network to both use E-UTRA PDCP or both use NR PDCP after initial connection establishment, regardless of whether EN-DC is configured. Change from E-UTRA PDCP to NR PDCP (or vice-versa) is supported via a handover procedure (e.g., reconfiguration with mobility) or, for the initial change of SRB1 from E-UTRA PDCP to NR PDCP, with a reconfiguration without mobility before the initial security activation.

If the SN is a gNB (i.e., for EN-DC, NGEN-DC and NR-DC), the UE can be configured to establish SRB3 with the SN to enable RRC PDUs for the SN to be sent directly between the UE and the SN. RRC PDUs for the SN can only be transported directly to the UE for SN RRC reconfiguration not requiring any coordination with the MN. Measurement reporting for mobility within the SN can be done directly from the UE to the SN if SRB3 is configured.

Split SRB is supported for all MR-DC options, allowing duplication of RRC PDUs generated by the MN, via the direct path and via the SN. Split SRB uses NR PDCP.

FIGS. 9-10 show UP radio protocol architectures from a UE perspective for MR-DC with EPC (e.g., EN-DC) and with 5GC (e.g., NGEN-DC, NE-DC, and NR-DC), respectively. In both cases, a UE supports MCG, SCG, and split bearers, as discussed above. In the EN-DC arrangement shown in FIG. 9, MCG bearers have either LTE (e.g., E-UTRA) or NR PDCP and LTE RLC and MAC layers, while SCG bearers have NR PDCP, RLC, and MAC layers. Split bearers have NR PDCP layer and both LTE and NR RLC and MAC layers. In the arrangement shown in FIG. 10, all bearers have NR PDCP layers and lower layers corresponding to the RAT used by the MN and SN. One difference between the architectures in FIGS. 9-10 is that the various bearers for MR-DC with 5GC are associated with QoS flows that are terminated in an SDAP layer above PDCP.

Figure 11:
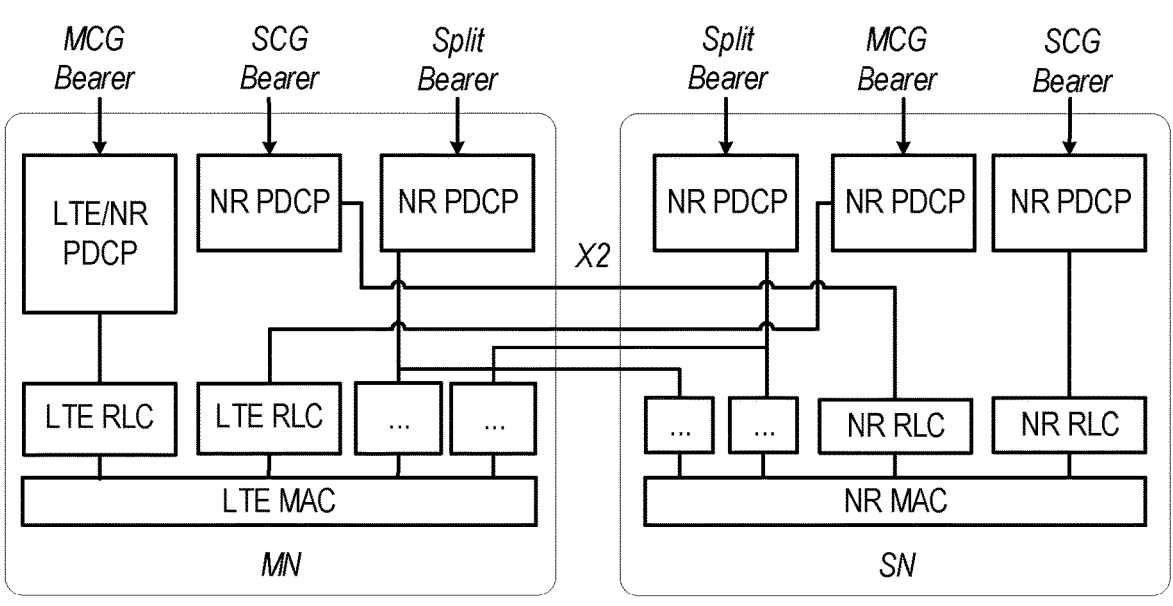
FIGS. 11-12 show UP radio protocol architectures from a network perspective for the two DC alternatives shown in FIG. 8.
Figure 12:
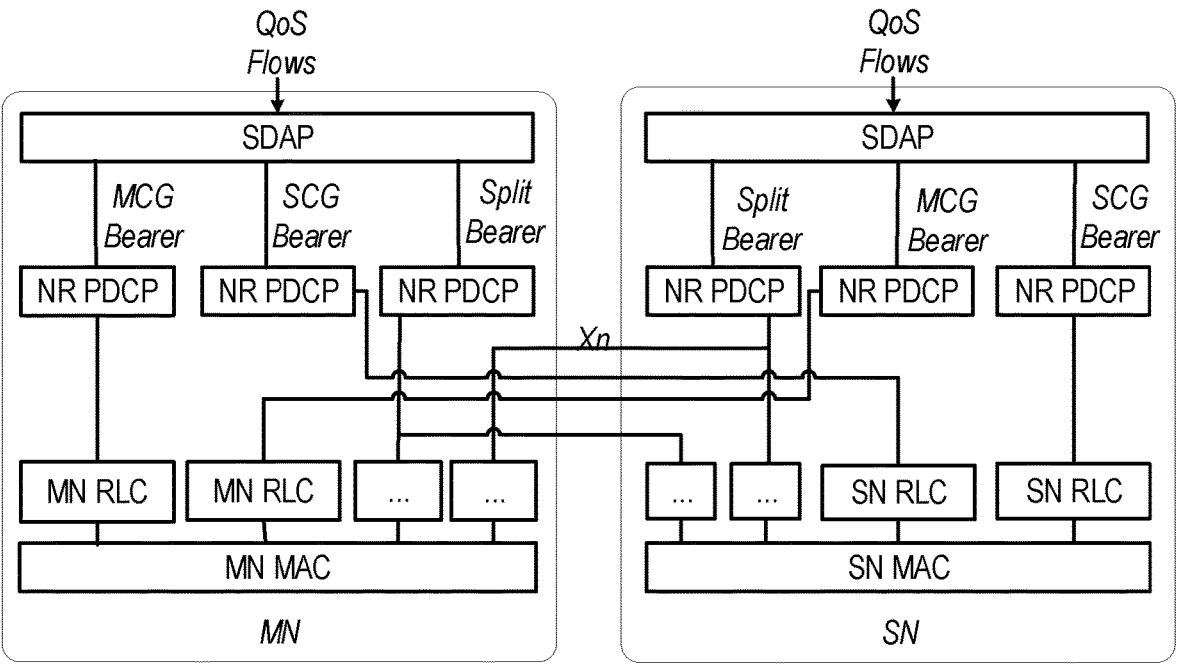

FIGS. 11-12 show UP radio protocol architectures from a network perspective for MR-DC with EPC (e.g., EN-DC) and with 5GC (e.g., NGEN-DC, NE-DC, and NR-DC), respectively. In the EN-DC arrangement shown in FIG. 11, an MCG bearer terminated in MN has PDCP layer of the RAT used by the MN, while all other bearers have NR PDCP layer. All bearers have lower layers associated with the RAT of the node(s) in which they are terminated. In the arrangement shown in FIG. 12, all bearers have NR PDCP layers and lower layers associated with the RAT of the node(s) in which they are terminated. From a network perspective, each MCG, SCG, or and split bearer can be terminated either in MN or in SN. For example, the X2 or Xn interface between the nodes will carry traffic for SCG or split bearers terminated in MN PDCP layer to lower layers in SN. Likewise, X2 or Xn will carry traffic for MCG or split bearers terminated in SN PDCP layer to lower layers in MN. One difference between the architectures in FIGS. 11-12 is that the various bearers for MR-DC with 5GC are associated with QoS flows that are terminated in an SDAP layer above PDCP.

Figure 13:
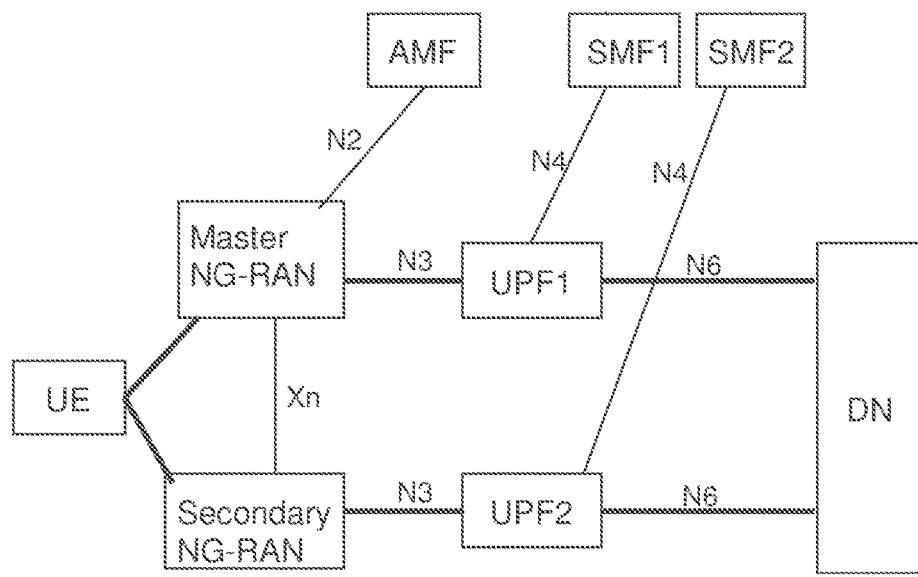
FIG. 13 shows a DC arrangement involving disjoint UP paths for a single UE via two different user plane function (UPF) instances in a 5GC.

3GPP TS 23.501 (v16.4.0) specifies various options for redundant transmission in 5G networks to facilitate high reliability communication, such as URLLC. In these arrangements, a UE may setup two redundant PDU sessions over the 5G network, such that the 5GC sets up two disjoint UP paths for the two redundant PDU Sessions. FIG. 13 shows a DC arrangement involving disjoint UP paths for a single UE via two different UPF instances, labelled UPF1 and UPF2, that connect to the same data network (DN) via respective N6 interfaces. The two UPFs also communicate with respective SMFs, labelled SMF1 and SMF2, via respective N4 interfaces and with master and secondary NG-RANs via respective N3 interfaces. Likewise, the AMF communicates with the master NG-RAN via an N2 interface.

Figure 14:
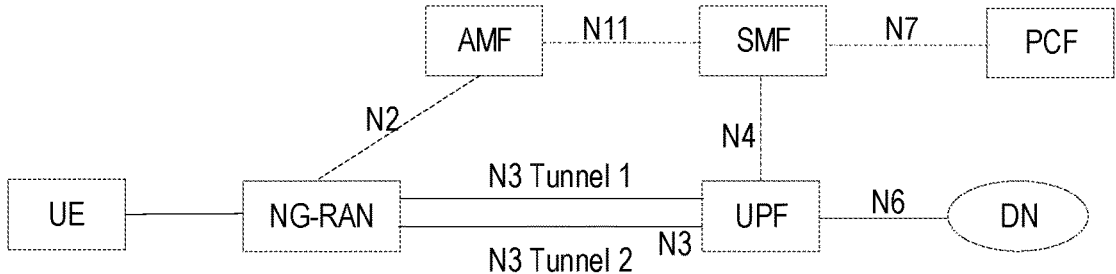
FIGS. 14-15 show two exemplary arrangements of independent tunnels associated with UPFs in a single UP path.

Another option to support high reliability requirements of some services is to deploy redundant transmission with multiple N3 and/or N9 tunnels, e.g., if the reliability of single N3 and/or N9 tunnel is not considered to be adequate. FIG. 14 shows an exemplary arrangement of two independent N3 tunnels (labelled 1 and 2) between a UPF and an NG-RAN. In this arrangement, the UPF is also referred to as the PDU session anchor (PSA). In addition to the interfaces shown in FIG. 13, FIG. 14 also shows that the AMF communicates with the SMF via an N11 interface and that the SMF communicates with a policy control function (PCF) via an N7 interface.

Figure 15:
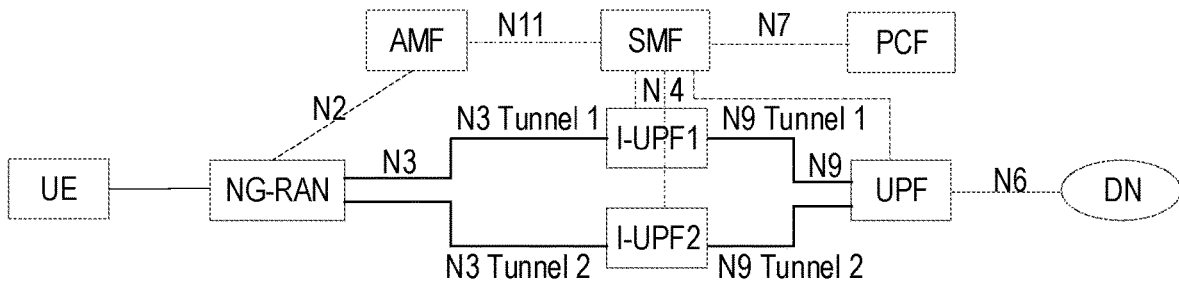

Another option to support high reliability requirements of some services is to deploy redundant intermediate UPFs (I-UPFs) between the NG-RAN and the PSA UPF. FIG. 15 shows an exemplary arrangement in which I-UPFs 1 and 2 are added to FIG. 14, i.e., between the UPF (i.e., the PSA UPF) and the NG-RAN. The respective I-UPFs carry respective independent N3 tunnels and respective independent N9 tunnels to the UPF. All UPFs communicate with the SMF via respective N4 interfaces.

3GPP TS 38.331 (v16.0.0) specifies that a UE may store information about the 16 cells most recently visited cells by the UE. This information can be stored in a UE variable called VarMobilityHistoryReport. For each cell, the variable contains a cell identity (e.g., CGI, PCI, etc.) and the time spent in the cell (in seconds). FIGS. 16A-B show an exemplary ASN.1 data structure for VarMobilityHistoryReport. More specifically, FIG. 16A shows that VarMobilityHistoryReport contains a VisitedCellsInfoList-r16 information element (IE), and FIG. 16B defines the contents of this IE. The list includes cells visited in RRC_IDLE, RRC_INACTIVE and RRC_CONNECTED states for NR and RRC_IDLE and RRC_CONNECTED for LTE.

As briefly mentioned above, Quality of Experience (QoE) measurements have been specified for UEs operating in LTE networks and in earlier-generation UMTS networks. Measurements in both networks operate according to the same high-level principles. Their purpose is to measure the experience of end users when using certain applications over a network. For example, QoE measurements for streaming services and for MTSI (Mobility Telephony Service for IMS) are supported in LTE.

QoE measurements may be initiated towards the RAN from an O&M node generically for a group of UEs (e.g., all UEs meeting one or more criteria), or they may also be initiated from the CN to the RAN for a specific UE. The configuration of the measurement includes the measurement details, which is encapsulated in a container that is transparent to RAN.

A "TRACE START" SAP message is used by the LTE EPC for initiating QoE measurements by a specific UE. This message carries details about the measurement configuration the application should collect in the "Container for application layer measurement configuration" IE, which transparent to the RAN. This message also includes details needed to reach the TCE to which the measurements should be sent.

FIGS. 17A-D show various procedures between a UTRAN and a UE for QoE measurements in a legacy UMTS network. As shown in FIG. 17A, the UTRAN can send a UE Capability Enquiry message to request the UE to report its application layer measurement capabilities. As shown in FIG. 17B, the UE can provide its application layer measurement capabilities to the UTRAN via a UE Capability Information message, particularly in a "Measurement Capability" IE that includes information related to UE capability to perform the QoE measurement collection for streaming services and/or MTSI services. Table 1 below shows exemplary contents of this IE:

TABLE 1

| IE/Group name | Need | Type and reference | Semantics description | Version |
|---|---|---|---|---|
| QoE Measurement Collection for streaming services | CV-not_iRAT_HoInfo | Enumerated (TRUE) | TRUE means that the UE supports QoE Measurement Collection for streaming services. | REL-14 |
| QoE Measurement Collection for MTSI services | CV-not_iRAT_HoInfo | Enumerated (TRUE) | TRUE means that the UE supports QoE Measurement Collection for MTSI services. | REL-15 |

The UTRAN can respond with a UE Capability Information Confirm message. FIG. 17C shows that the UTRAN can send a Measurement Control message containing "Application layer measurement configuration" IE in order to configure QoE measurement in the UE. Table 2 below shows exemplary contents of this IE:

TABLE 2

| IE/Group name | Need | Type and reference | Version |
|---|---|---|---|
| Container for application layer measurement configuration | MP | Octet string (1 . . . 1000) | REL-14 |
| Service type | MP | Enumerated (QoEStreaming, QoEMTSI) | REL-15 |

FIG. 17D shows that the UE can send QoE measurement results via UTRAN to the TCE using a Measurement Report message that includes an "Application layer measurement reporting" IE. Table 3 below shows exemplary contents of this IE:

TABLE 3

| IE/Group name | Need | Type and reference | Version |
|---|---|---|---|
| Container for application layer measurement reporting | MP | Octet string (1 . . . 8000) | REL-14 |
| Service type | MP | Enumerated (QoEStreaming, QoEMTSI) | REL-15 |

FIGS. 18A-C illustrate a procedure between an E-UTRAN and a UE for configuring QoE measurements in an LTE network. FIG. 18A shows an exemplary UE capability transfer procedure used to transfer UE radio access capability information from the UE to E-UTRAN. Initially, the E-UTRAN can send a UECapabilityInquiry message, similar to the U-TRAN arrangement shown in FIG. 17A. The UE can respond with a UECapabilityInformation message that includes a "UE-EUTRA-Capability" IE. The E-UTRAN can respond with a UECapabilityInformation-Confirm message.

This IE may further include a UE-EUTRA-Capability-v1530 IE, which can be used to indicate whether the UE supports QoE Measurement Collection for streaming services and/or MTSI services. In particular, the UE-EUTRA-Capability-v1530 IE can include a "measParameters-v1530" IE containing the information about the UE's measurement support. In some cases, the "UE-EUTRA-Capability" IE can also include a "UE-EUTRA-Capability-v16xy-IE", which can include a "qoe-Extensions-r16" field. FIG. 18B shows an exemplary ASN.1 data structure for these various IEs, with the various fields defined in Table 4 below.

TABLE 4

| Field name | Description |
|---|---|
| qoe-MeasReport | Indicates whether the UE supports QoE Measurement Collection for streaming services. |
| qoe-MTSI-MeasReport | Indicates whether the UE supports QoE Measurement Collection for MTSI services. |
| qoe-Extensions | Indicates whether the UE supports the Rel-16 extensions for QoE Measurement Collection, i.e., support of more than one QoE measurement type at a time and signaling of withinArea, sessionRecordingIndication, qoe-Reference, temporaryStopQoE and restartQoE |
| temporaryStopQoE | Indicates that reporting, but not collection, of QoE measurements shall be temporarily stopped. |
| withinArea | Indicates at handover, for each application layer measurement, whether the new cell is inside the area for the measurement, i.e., whether the UE is allowed to start new measurements in the cell |
| restartQoE | Indicates that QoE measurements can be reported again after a temporary stop. |

FIG. 18C shows an exemplary ASN.1 data structure for the qoe-Reference parameter mentioned in Table 4 above.

FIGS. 19A-C illustrate various aspects of QoE measurement collection for a UE in an LTE network. In particular, FIG. 19A shows an exemplary signal flow diagram of a QoE measurement collection process for LTE. To initiate QoE measurements, the serving eNB sends to a UE in RRC_CONNECTED state an RRCConnectionReconfiguration message that includes a QoE configuration file, e.g., a measConfigAppLayer IE within an OtherConfig IE. As discussed above, the QoE configuration file is an application-layer measurement configuration received by the eNB (e.g., from EPC) encapsulated in a transparent container, which is forwarded to UE in the RRC message. The UE responds with an RRCConnectionReconfigurationComplete message. Subsequently, the UE performs the configured QoE measurements and sends a MeasReportAppLayer RRC message to the eNB, including a QoE measurement result file. Although not shown, the eNB can forward this result file transparently (e.g., to EPC).

FIG. 19B shows an exemplary ASN.1 data structure for a measConfigAppLayer IE, including a measConfigAppLayerToAddModList-r16 and a measConfigAppLayer ToRelease-List-r16. The former may be used to add or modify multiple QoE measurement configurations (up to maxQoE-Measurement-r16), and the latter may be used to remove multiple QoE measurement configuration (up to maxQoE-Measurement-r16). In the service Type field, a value of "qoe" indicates Quality of Experience Measurement Collection for streaming services and a value of "qoemtsi" indicates Enhanced Quality of Experience Measurement Collection for MTSI. This field also includes various spare values.

The following procedural statements exemplify desired UE behavior upon reception of the measConfigAppLayer IE in the OtherConfig IE within the RRCReconfiguration:

1> if the received otherConfig includes the measConfigAppLayer ToAddModList:

2> for each service Type and qoe-Reference included in the measConfigAppLayer ToAddModList:

2> forward measConfigAppLayerContainer, qoe-Reference and service Type to upper layers considering the service Type;

2> consider itself to be configured to send application layer measurement report in accordance with 5.6.19;

2> forward withinArea to upper layers if received;

2> forward temporaryStopQoE to upper layers if received;

2> forward restartQoE to upper layers if received;

1> if the received otherConfig includes the measConfigAppLayerToReleaseList:

2> for each service Type and qoe-Reference included in the measConfigAppLayer ToReleaseList:

2> inform upper layers to clear the associated stored application layer measurement configuration;

2> discard received associated application layer measurement report information from upper layers;

2> consider itself not to be configured to send the associated application layer measurement report for that service Type and qoe-Reference.

FIG. 19C shows an exemplary ASN.1 data structure for a measReportAppLayer IE, by which a UE can send to the E-UTRAN (e.g., via SRB4) the QoE measurement results of an application (or service). The service for which the report is being sent is indicated in the "serviceType" IE. The measReportAppLayer IE can also include a qoe-reference IE, as discussed above, containing the PLMN identity and an ID associated with the QoE measurement collection.

A UE capable of application layer measurement reporting in RRC_CONNECTED may initiate the procedure when configured with application layer measurement, i.e., when measConfigAppLayer has been configured by E-UTRAN. Upon initiating the procedure, the UE shall:

1> if configured with application layer measurement, and SRB4 is configured, and the UE has received application layer measurement report information from upper layers:

2> set the measReportAppLayerContainer in the MeasReportAppLayer message to the value of the application layer measurement report information;

2> set the service Type in the MeasReportAppLayer message to the type of the application layer measurement report information;

2> set the qoe-Reference in the MeasReportAppLayer message to the value received from upper layer;

2> set the recordingSessionIndication in the MeasReportAppLayer message to the value received from upper layer;

2> submit MeasReportAppLayer message to lower layers for transmission via SRB4.

Figure 20:
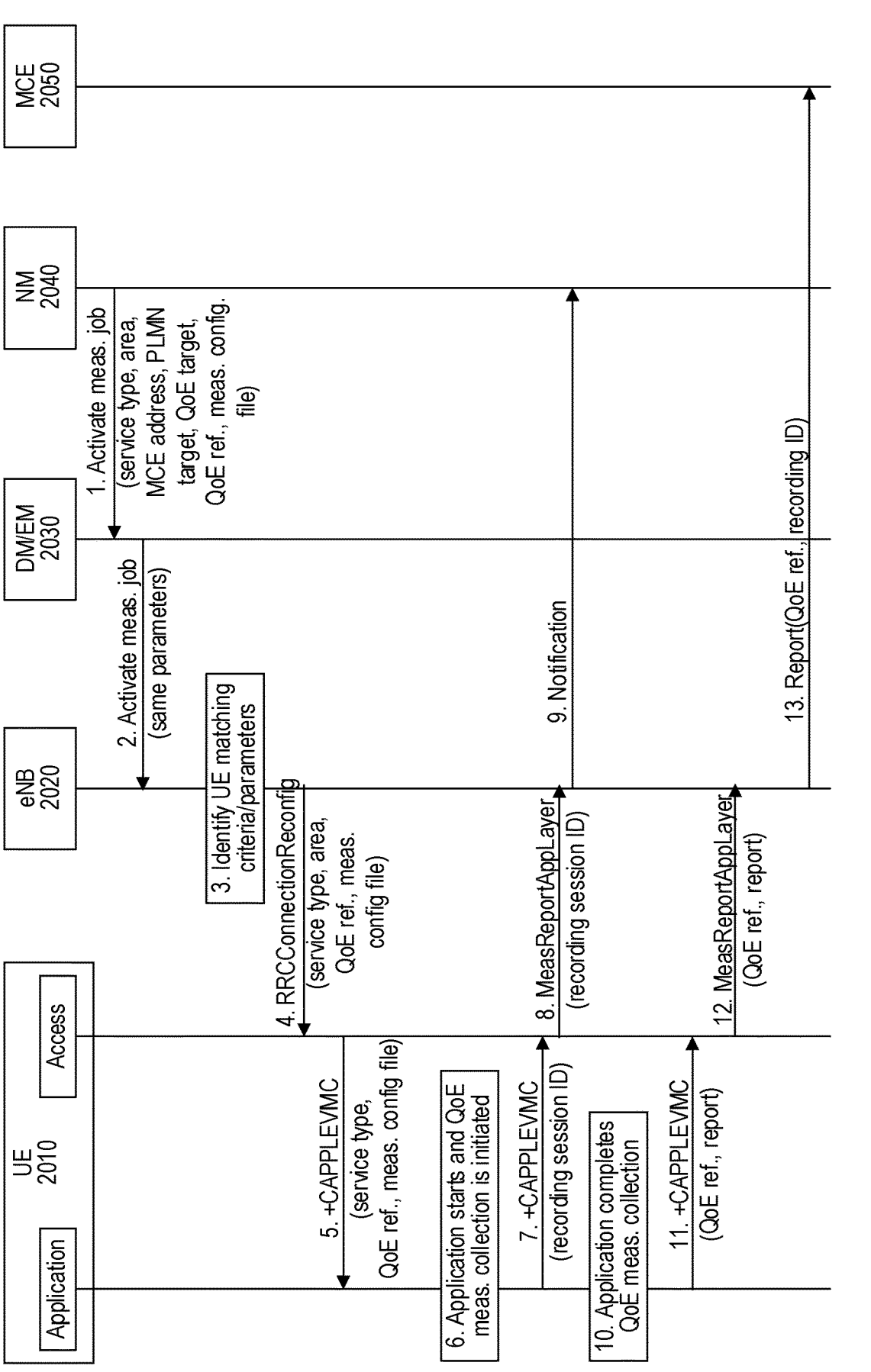
FIG. 20 shows a more detailed signal flow of activation of QoE measurement collection and reporting of collected information for a UE in an LTE network.

FIG. 20 shows a more detailed signal flow of activation of QoE measurement collection and reporting of collected information without UE mobility in an LTE network. This signal flow is between a measurement collection entity (MCE, 2050), a network manager (NM, 2040), a domain manager (DM/EM, 2030), one or more eNBs (2020) in E-UTRAN, and the UE (2010)—particularly access stratum (or access, for short) and application parts of the UE. The following description omits these reference numbers for brevity. Although the operations shown in FIG. 20 are given numerical labels, these labels are intended to facilitate the following description rather than to require and/or imply a particular order of the operations.

In operation 1, the NM sends an Activate Measurement Job message to the DM, which forwards to the message to the eNB in operation 2. The message includes a service type (e.g., streaming), an area scope, a measurement configuration file for the QoE measurements to be performed, and a QoE reference identifier. In operation 3, the eNB identifies served cells matching the area scope, as well as UEs in these served cells that match other parameters in the message (e.g., service type). The eNB can base this determination on UE capability information sent from the UE to the eNB (not shown). The following operations refer to a single matching UE but can be replicated in case of multiple matching UEs.

In operation 4, after identifying the matching UE, the eNB sends an RRCConnectionReconfiguration message to the AS (e.g., RRC layer) of the UE. The eNB includes the service type, the area scope (e.g., one or more cells, tracking areas, etc.), the measurement configuration file, and the QoE reference.

In operation 5, the UE AS forwards this information to the UE application part using an AT command +CAPPLEVMC, as specified in 3GPP TS 27.007 (v16.4.0). In general, AT commands can be used to transfer information between different layers in the UE, such as between application and AS. In particular, AT command +CAPPLEVMC is of the following form when used for QoE measurement configuration:

+CAPPLEVMC: <app-meas_service_type>,<start-stop_reporting> [,<app-meas_config_file_length>,<app-meas_config-file>], where the various fields are defined below:

<n>: integer type. Disable and enable presentation of the unsolicited result code +CAPPLEVMC to the TE.

0 Disable presentation of the unsolicited result code

1 Enable presentation of the unsolicited result code

<app-meas_service_type>: integer type. Contains the indication of what application that is target for the application level measurement configuration.

1 QoE measurement collection for streaming services

2 QoE measurement collection for MTSI services

<start-stop_reporting>: integer type. Indicates the start and stop of the application level measurement reporting for the application indicated by the <app-meas_service_ type>.

0 start the application-level measurement reporting 1 stop the application-level measurement reporting <app-meas_config_file_length>: integer type. Indicates the number of octets of the <app-meas_config-file> parameter.

<app-meas_config-file>: string of octets. Contains the application level measurement configuration file for the application indicated by the <app-meas_service_type>. The parameter shall not be subject to conventional character conversion as per +CSCS.

Returning to the discussion of FIG. 20, in operation 6, the UE starts an application associated with the service type and initiates measurement collection according to the received configuration and area. The UE assigns this measurement collection a recording session ID and reports this ID (in operation 7) to the UE AS using the same AT command. In operation 8, the UE AS sends this ID to the eNB in a MeasReportAppLayer RRC message, and the eNB notifies the NM of the initiation of the measurement collection in operation 9.

The UE application layer completes the QoE measurement collection according to the received configuration (operation 10) and reports the results to the UE AS via AT command +CAPPLEVMR (operation 11) along with the associated QoE reference ID received earlier. The report can be a transparent container, as discussed earlier. AT command +CAPPLEVMC is of the following form when used for QoE measurement reporting:

+CAPPLEVMC=<app-meas_service_type>,<app-meas_report_length>,<app-meas_report> where the various fields are defined below:

<app_meas_service_type>: integer type. Contains the indication of what application that is providing the application level measurement report.

1 QoE measurement collection for streaming services

2 QoE measurement collection for MTSI services

<app-meas_report_length>: integer type. Indicates the number of octets of the <app-meas_report> parameter.

<app-meas_report>: string of octets. Contains the application level measurement configuration file for the application indicated by the <app-meas_service_type>. The parameter shall not be subject to conventional character conversion as per+CSCS.

In operation 12, the UE AS sends the report and the QoE reference ID to the eNB in a MeasReportAppLayer RRC message. The eNB subsequently forwards the report to the MCE (operation 13). In some cases, the MCE may forward the QoE measurement report another entity in the network for analysis and further action (e.g., in the OAM system).

A new study item for "Study on NR QoE management and optimizations for diverse services" has been approved for NR Rel-16. The purpose is to study solutions for QoE measurements in NR, not only for streaming services as in LTE but also for other services such as augmented or virtual reality (AR/VR), URLLC, etc. Based on requirements of the various services, the NR study will also include more adaptive QoE management schemes that enable intelligent network optimization to satisfy user experience for diverse services.

Similar to LTE, UE QoE measurements made in NG-RAN may be initiated by a management function (e.g., OAM) in a generic way for a group of UEs, or they may be initiated by the core network (e.g., 5GC) towards a specific UE based on signaling with the NG-RAN. As mentioned above, the configuration of the measurement includes the measurement details, which is encapsulated in a container that is transparent to the NG-RAN.

In general, the RAN (e.g., E-UTRAN or NG-RAN) is not aware of an ongoing streaming session for a UE and nor of when QoE measurements are being performed by the UE. Even so, it is important for the client or management function analyzing the measurements that the entire streaming session is measured. It is beneficial, then, that the UE maintains QoE measurements for the entire session, even during handover situation. It has been concluded during a 3GPP study that fragmented QoE reports are of little use. However, it is an implementation decision when RAN stops the QoE measurements. For example, it could be done when the UE has moved outside the measured area, e.g., due to a handover.

Even so, there are various problems, issues, and/or difficulties with current QoE measurement procedures such that they are unable to meet the requirements for the variety of services that will be deployed in 5G networks that may include both E-UTRAN and NG-RAN. For example, current QoE measurement procedures are unable to provide the degree of observability needed for network operators to gain detailed and/or accurate insight into end-user experience and control/configure network operation in accordance with Service Level Agreements.

For example, in both LTE and NR, the user data can reach the UE over multiple paths over the air interface. Moreover, duplication and/or multiple tunnels can be used between a serving node (e.g., gNB) and CN functions (e.g., UPF), or between CN functions (e.g., I-UPF and UPF). As a more specific example, one or more of the following RAN-related features and/or technologies can be used to deliver data for an application session to the UE:

DC with MCG bearer, MCG split bearer, SCG bearer, or SCG split bearer;

CA in DL and/or UL;

Supplementary UL;

Unlicensed spectrum (e.g., NR-U, LTE-LAA, etc.);

PDCP duplication;

GTP-U multiple tunnels/duplication; and

BAP duplication (e.g., for IAB nodes).

All these features can have a significant impact on end-user QoE. However, current QoE measurement and reporting procedures provide no information about their use, which results in an incomplete view of how the connectivity for the measured application is established.

Accordingly, exemplary embodiments of the present disclosure provide techniques that facilitate improved QoE measurement configuration and reporting, particularly in relation to providing detailed information about RAN multi-connectivity features and/or duplication/redundant transmission options used for delivering or retrieving the data for the measured application session to/from the UE. This newly proposed detailed information is referred to as the Network Assistance Information (NAI) and is delivered to the entity collecting the QoE reports, such as a Measurement Collector Entity (MCE), as a complement to the QoE measurement report. The NAI indicates (some examples given below, for a comprehensive list please see chapters 5.1-5.2):

the path(s) taken by the corresponding data (e.g., multi-connectivity feature used for delivering the data to the application);

in addition to the overall performance result, the performance per individual path (e.g., per DC leg, per GTP tunnel, per BAP/PDCP duplication path, etc.);

radio-related measurement results per path; and/or mobility-related information etc.

Exemplary embodiments can provide various benefits, advantages, and/or solutions to problems described herein. For example, because a network is informed about individual performance of each multi-connectivity path used to carry a data for the measured application, embodiments can enable the network (e.g., OAM system) to optimize measures taken based on the QoE reports. In addition, embodiments facilitate a finer and/or more granular analysis of the QoE report by leveraging NAI related to CA, DC, and/or PDCP duplication being used. As such, an OAM system would be able to classify the users' QoE various RAN settings and configurations. Such classification and mapping between end-user QoE and network configuration would enable the OAM system to suggest optimized configurations that can meet QoE requirements for various services.

In the following description of exemplary embodiments, the following groups of terms and/or abbreviations are used synonymously:

"QoE measurement report", "QoE report", "measurement report"; and "report";

"QoE measurement configuration" and "QoE measurement";

"Service" and "application";

"leg" and "path";

"Measurement collection entity", "MCE", "trace collection entity", and "TCE".

Furthermore, the term "multi-connectivity" is used in the following description to mean that data for the measured application session is sent (e.g., duplicated or not duplicated) to the UE via multiple paths, e.g., DC, split bearer, GTP-U multiple tunnels/duplication, BAP duplication, PDCP duplication or CA. In contrast, "dual connectivity" or DC is used to generically refer to any of the specific multi-node configurations discussed above, including LTE-DC, EN-DC, NR-DC, and MR-DC. In general, however, embodiments are applicable to DC as well as single connectivity via LTE or NR.

In various embodiments, a UE can be configured for application-layer QoE measurements by a RAN node, and the data on which the measurements are transmitted and/or received by the UE using one or more multi-connectivity and/or duplication/redundancy features (collectively referred to as "multi-path features"), including any of the following:

DC with MCG bearer, MCG split bearer, SCG bearer, or SCG split bearer. The MCG split bearer and SCG split bearer use two paths due to the bearer splitting at MN and SN, respectively.

CA in DL and/or UL, where each component carrier corresponds to a path.

Supplementary UL, which can correspond to a different path than normal UL.

Unlicensed spectrum (e.g., NR-U, LTE-LAA, etc.), which can correspond to a different path than data delivered via licensed spectrum.

PDCP duplication, where the route taken by each duplicated copy of a PDCP PDU corresponds to a path. In NR, there can be up to four paths corresponding to four copies of the same PDCP PDU.

GTP-U multiple tunnels/duplication, where the route taken by each GTP-U tunnel of the same bearer corresponds to one path, regardless of whether the different tunnels carry the same data or different subsets of data for the bearer.

BAP duplication (e.g., for IAB nodes), where each duplicate BAP route carrying the data for the same bearer corresponds to a different path.

In various embodiments, the UE can provide NAI with respect to the different "paths" mentioned above, delivered to the MCE as a complementary information to the legacy QoE measurement report. In various embodiments, the NAI can be included in or provided separately from the QoE measurement report. The NAI may consist of various information described in more detail below, including various combinations of this information (e.g., DC and PDCP duplication).

In embodiments where the UE is using DC, the NAI can include an indication that DC is being used for the measured session. In addition, the NAI can include an indication of whether the data for the measured session is delivered via MCG bearer, MCG split bearer, SCG bearer, and/or SCG split bearer. In some cases, more details can be included in the NAI, such as particular frequencies for MCG bearer and SCG bearer. In some embodiments, the NAI can include an individual report for each path (e.g., bearer) and a corresponding identifier for each path.

In embodiments where the UE is using CA, the NAI can include an indication of whether the data for the measured session is delivered via a single carrier or multiple carriers. In some embodiments, the NAI can include an individual report for each path (e.g., CC) and a corresponding identifier for each CC.

In embodiments where the UE is using CA, the NAI can include an indication of whether data for the measured session is delivered via NR or LTE unlicensed spectrum, possibly in combination with licensed spectrum. In embodiments where the UE is using supplementary UL (SUL), the NAI can include an indication that the data for the measured session is delivered via SUL and/or an indication of portions delivered by UL and by SUL.

In embodiments where the UE is using PDCP duplication, the NAI can include an indication of whether data for the measured session is delivered via a single PDCP path or multiple PDCP paths. In some embodiments, the NAI can include an individual report for each PDCP path and a corresponding identifier for each PDCP path.

In embodiments where the UE is using GTP-U multiple tunnels/duplication, the NAI can include an indication of whether data for the measured session is delivered via a single GTP-U tunnel or multiple GTP-U tunnels. In some embodiments, the NAI can include an indication of whether two GTP-U tunnels carry the same data or different subsets of the data for the bearer associated with the application session. In some embodiments, the NAI can include an individual report for each path (e.g., GTP-U tunnel) and a corresponding identifier for each GTP-U tunnel (e.g., GTP-TEID, TNL address, etc.).

In embodiments where the UE is using BAP duplication, the NAI can include an indication of whether data for the measured session is delivered via one or multiple BAP paths. In some embodiments, the NAI can include an indication of whether two BAP paths carry the same data or different subsets of the data for the bearer associated with the application session. In some embodiments, the NAI can include an individual report for each BAP path and a corresponding identifier for each BAP path (e.g., BAP Routing ID).

In some embodiments, the NAI can include a quality of service (QoS) metric or setting associated with a radio bearer and/or data flow (e.g., 5G QoS flow) that carries data for the measured application session.

In some embodiments, the NAI can include channel or link quality associated with each multi-connectivity path that carries data for the measured application session. In various embodiments, this information can be provided in any of the following forms:

statistics (e.g., average, maximum, minimum, variance, and/or standard deviation) for channel quality calculated during the measured application session;

multiple samples collected during the measured application session, optionally with associated timestamps or sample time intervals;

multiple averages, each calculated during a time interval forming a part of the duration of the measured application session; and the value of the last sample collected prior to sending the QoE report.

In various embodiments, the channel or link quality information can include any of the following:

Beam- or cell-level measurements (e.g., filtered layer 3 (RRC) measurements or unfiltered layer 1 (PHY) measurements) of any of the following quantities: RSRP, RSRQ, SINR, RSSI, RSCP, EcNo, path loss;

Number of HARQ, RLC, and/or TCP retransmissions (e.g., average number per data packet);

Block error rate (BLER);

Fraction of lost packets;

RAT, carrier frequency, and/or component carriers used.

In some embodiments, the NAI can include information related to UE mobility. For example, the NAI can include one or more of the following:

a "handover flag" to indicate that the UE has performed a handover since sending the most recent QoE measurement report, optionally including a timestamp indicating the HO occurrence time. The HO occurrence time can be an absolute time or relative to the start time of the QoE measurement.

number of handovers.

source and target cell for each handover.

list of visited cells since the last QoE report was sent (e.g., UE mobility history information discussed in more detail below).

type of mobility operation, e.g., regular HO, conditional HO, Dual Active Protocol Stack Handover (DAPS) HO, RACH-less handover, SCell change, SCell addition, MN-SN role switch, etc.

interruption time for each handover (e.g., value of T304 when it was stopped).

In some embodiments, the UE application layer can log and include sensor information as part of the QoE measurement report. This can include location, speed, acceleration, orientation, etc. Sensors can include GNSS receivers, Bluetooth/WLAN receivers, accelerometers, barometric pressure meters, and 5G/LTE receiver (e.g., for cell ID information or OTDOA measurements).

In some embodiments, the NAI can include information about RLF, re-establishment, and/or beam failure recovery. In some embodiments, the NAI can include the PLMN identity, tracking area code (TAC), and/or tracking area identity (TAI) in which UE is registered while performing QoE measurements. In some embodiments, the NAI can include indices of the beams providing the coverage of the serving cell for the UE while performing the QoE measurements.

As mentioned above, in some embodiments, the NAI can include UE mobility history information. This can include information about the latest cells the UE visited and the time spent in these cells, as stored in VarMobilityHistoryReport defined in 3GPP TS 38.331 (v16.0.0). The existing UE mobility history information contains the 16 latest visited cells for the UE for all states.

A more relevant history for QoE measurements would be the visited cells since the last QoE report was sent, and only the cells which the UE has visited when it was in RRC_CONNECTED. In some embodiments, a new mobility history information (i.e., limited to these visited cells) can be defined specifically for QoE measurements. The UE can store a list of most recent cells visited in RRC_CONNECTED mode since the last QoE measurement report in a new variable, and provide this information in the MeasReportAppLayer IE along with the current measurement container. FIG. 21 shows an exemplary ASN.1 data structure for a MeasReportAppLayer message according to these embodiments. The mobilityHistoryReport-r17 IE in FIG. 21 contains the list mentioned above.

In some embodiments, the NAI can include a link to, or identifier for, one or more mobile drive test (MDT) reports that correspond to the QoE measurement report (e.g., in the same time period). For example, an MDT report can e.g., be identified by the Trace Reference as defined in 3GPP TS 32.422 (v16.1.0).

In some embodiments, the NAI can include an indication that the UE's connectivity mode changed during the measured application session. This can be done according to one of the following techniques:

by indicating all used connectivity modes (e.g., multi- and single-connectivity) and timestamps of when switches between connectivity modes occurred during the measured application session); or by dividing the QoE report into sub-reports with each sub-report covering a time period during which a particular connectivity mode was used, optionally complemented by indications of start and stop times for such time periods.

In some embodiments, a QoE measurement report containing the NAI may be provided per multi-connectivity leg (i.e., path). In other embodiments, a QoE measurement report containing the NAI can be provided as an integral QoE measurement report for the application, i.e., for all multi-connectivity legs carrying the data for the measured application session. As an option, the connectivity mode may be indicated in a part of the QoE report that is common to all the involved access bearers.

In some embodiments, UE logging of the NAI can be initiated by RAN node once the QoE configuration is sent to the UE. In some embodiments, the network can monitor the services used by the UE and collect/log the NAI once the UE starts the targeted services. In some embodiments, the network can collect/log the latest NAI once it receives the QoE measurement report from the UE. In some embodiments, the UE can provide the collected NAI in the QoE measurement report or separately from the QoE measurement report, e.g., in the same container or message.

The QoE measurement report is generated at the UE application layer, which does not have direct access to NAI about multi-connectivity for the application session (DC, CA, PDCP duplication, GTP-U duplication, BAP duplication) used by the UE for delivering the data for the measured application. Furthermore, NAI related to radio link quality is available at the UE access layer but not (directly) available at the UE application layer. According to various embodiments, various procedures can be used in the UE and RAN node (e.g., gNB) for delivering the QoE measurement report including or associated with the NAI to the MCE. These include the following examples:

UE access layer delivers the NAI to UE application layer, using an AT command. The UE application layer includes NAI in the QoE measurement report.

When the container with the QoE measurement report is received at the UE access layer from the UE application layer, the UE access layer adds the available NAI directly to the message carrying the QoE measurement report, e.g., alongside the container. This approach is exemplified by the ASN.1 data structure shown in FIG. 21. The NAI and the QoE measurement report can be sent in the same message, either as separate information entities or with the NAI as a part of (i.e., included in) the QoE report.

UE access layer delivers the NAI directly to the MCE or indirectly via the RAN. The MCE infers the binding between the content of the QoE report and the measurement NAI.

After receiving the QoE measurement report from the UE, the RAN node (e.g., gNB) adds NAI information to the QoE measurement report before sending it to the MCE. Thus, the NAI and the QoE measurement report can be sent in the same message, either as separate information entities or with the NAI as a part of (i.e., included in) the QoE report.

In case the UE uses multi-connectivity for the data for the measured application session, the QoE measurement report (with or without the NAI) can be delivered to the MCE in one of the following ways:

An integral report for all legs/paths is sent over one path, e.g., a single DC node/carrier/GTP-U tunnel/PDCP path/BAP duplication path. The UE can select the path on which the report is sent based on various criteria such as link quality, data rate, energy consumption, etc. For example, the report can be sent over the path with better/best link quality and/or the highest data rate. As another example, the report can be sent over the path that will incur the least UE energy consumption (e.g., transmit power x transmission time). This criterion may be particularly beneficial when the UE's battery level is low.

Alternately, a report pertaining to each leg/path is sent via that leg/path. In case of DC, CA, PDCP duplication or BAP duplication, multiple GTP-U tunnels, an ID binding the corresponding multiple reports for one measured application is included in the report(s).

Alternately, in case of multiple available radio paths or GTP tunnels, the QoE report is sent redundantly on at least two of the available radio paths or GTP tunnels with a report identifier ensuring that the receiver (RAN node and/or MCE) can identify duplicated reports. This may be particularly beneficial when the reception of QoE report is considered critical.

In some embodiments, the UE can autonomously decide which of the above QoE report delivery/transmission alternatives to use, based on conditions related to the network (e.g., available legs/paths), the radio channel (e.g., link quality, data rate, etc.), criticality of the report, size of the report, etc.

Alternately, the network may configure a UE with rules for selecting which QoE report delivery/transmission alternative to select based on conditions related to the network (e.g., available legs/paths), the radio channel (e.g., link quality, data rate, etc.), criticality of the report, size of the report, etc.

In the above cases where NAI is provided with the QoE measurement report, the NAI may either be included as a part of the QoE measurement report or it may be information separate from the QoE measurement report, but provided together with the QoE report, e.g., in the same message.

The embodiments described above can be further illustrated with reference to FIGS. 22-23 and 33, which show exemplary methods (e.g., procedures) performed by a UE, a RAN node (RNN), and a measurement function, respectively. In other words, various features of operations described below correspond to various embodiments described above. These exemplary methods can also be used cooperatively to provide various exemplary benefits and/or advantages. Although FIGS. 22-23 and 33 show specific blocks in a particular order, the operations of the respective methods can be performed in different orders than shown and can be combined and/or divided into blocks having different functionality than shown. Optional blocks or operations are indicated by dashed lines.

In particular, FIG. 22 shows a flow diagram of an exemplary method (e.g., procedure) for performing quality of experience (QoE) measurements configured by a wireless network, according to various exemplary embodiments of the present disclosure. The exemplary method can be performed by a user equipment (UE, e.g., wireless device, IoT device, modem, etc. or component thereof) such as UEs described elsewhere herein.

The exemplary method can include operations of block 2210, where the UE can receive, from a radio access network node (RNN) in the wireless network (e.g., E-UTRAN, NG-RAN), a QoE measurement configuration for one or more one or more services provided by the UE application layer. The exemplary method can include operations of block 2240, where the UE can perform application-layer QoE measurements for the one or more services according to the QoE measurement configuration. The exemplary method can include operations of block 2270, where the UE can send, to or via the RNN in accordance with QoE measurement configuration, one or more messages comprising: one or more QoE measurement reports comprising results of the QoE measurements; and network assistance information (NAI) related to one or more paths that carry data associated with the one or more services.

In some embodiments, the NAI can include the following:
an indication of whether one or multiple paths carry the data associated with the one or more services;
channel or link quality information associated with each path; and one or more identifiers associated with each path.
In case of multiple paths, the NAI can also include one or more of the following:
indication of multi-path features used in the multiple paths;
indication of portions of the data carried by each path; and
indication of whether the multiple paths carry the same data or different subsets of data.

In some embodiments, the multi-path features used in the multiple paths can include any of the following:
DC with two different RNNs;
CA with multiple component carriers (e.g., in UL and/or DL);
UL (i.e., with corresponding DL) and supplementary UL (i.e., without corresponding DL);
licensed and unlicensed spectrum;
duplicate PDCP PDUs over multiple routes;
multiple GTP-U tunnels; and
multiple backhaul access protocol (BAP) routes.

In some embodiments, when the multi-path features used in the multiple paths include DC with two different RNNs, the NAI can also include an indication of which of the following carry the data: MCG bearer, MCG split bearer, SCG bearer, and SCG split bearer.

In some embodiments, the NAI can also include an indication of one or more switches between single and multiple paths during the QoE measurements and a time of occurrence for each switch. As another option, the NAI can also include a plurality of NAI subsets corresponding to respective durations between consecutive switches between single and multiple paths during the QoE measurements.

In some embodiments, the channel or link quality information associated with each path (e.g., in the NAI) can be based on one or more of the following access-layer measurements: reference signal received power (RSRP), reference signal received quality (RSRQ), signal-to-interference-plus-noise ratio (SINR), received signal strength (RSSI), reference signal code power (RSCP), Ec/NO ratio, pathloss, hybrid ARQ (HARQ) retransmission information, radio link control (RLC) retransmission information, transmission control protocol (TCP) retransmission information, listen-before-talk (LBT) failure rate, block error rate, and fraction of lost packets.

In some embodiments, the channel or link quality information associated with each path can be provided (e.g., in the NAI) in one or more of the following forms:
one or more statistics for a measured application session;
multiple samples or sample statistics (e.g., averages) collected during respective time intervals comprising the measured application session; and
a last sample collected before sending the QoE measurement report.

In some embodiments, the NAI can also include information related to UE mobility, including any of the following:
one or more of the following to which the UE was registered while performing the QoE measurements: public land mobile network (PLMN) identity, tracking area code (TAC), and/or tracking area identity (TAI);
an indication that the UE has performed one or more mobility operations since sending the most recent QoE measurement report;
number of mobility operations performed;
identification of each mobility operation;
time of occurrence of each mobility operation;
identification of source and target cells for each mobility operation;

list of visited cells since sending the most recent QoE measurement report; and timer values associated with each mobility operation.

In some embodiments, the list of visited cells can include only cells visited while the UE was in a connected state.

In various embodiments, sending the one or more messages in block 2270 can include various sub-blocks or operations. In some embodiments, block 2270 can include the first operations of sub-blocks 2271-2272. In sub-block 2271, the UE can send the NAI from the UE access layer to the UE application layer (e.g., within the UE). In sub-block 2272, the UE (e.g., application layer) can combine the NAI with the QoE measurement report and send the combination as an application-layer message to a management function (e.g., MCE) via the RNN.

In other embodiments, block 2270 can include the second operations of sub-blocks 2273-2274. In sub-block 2273, the UE can send a container comprising the QoE measurement report from the UE application layer to the UE access layer (e.g., within the UE). In sub-block 2274, the UE (e.g., access layer) can combine the NAI with the container and sending the combination to the measurement function via an access-layer message (e.g., RRC) to the RNN.

In other embodiments, block 2270 can include the third operations of sub-block 2275, where the UE can send the following to the measurement function: the NAI via an access layer-message to the RNN; and a container comprising the QoE measurement report via an application-layer message to the RNN.

In some embodiments, when multiple paths carry the data associated with the one or more applications, each message comprising a QoE measurement report and NAI can be sent (e.g., in block 2270) according to one of the following delivery options:

via one of the multiple paths;

redundantly via the multiple paths; or

QoE measurements and NAI associated with the respective paths are sent via the respective paths.

In some of these embodiments, the exemplary method can also include operations of block 2260, where the UE can select a delivery option for the NAI based on one or more rules received from the RNN, wherein the rules are related to one or more of the following: current network conditions; current radio channel conditions; criticality of the QoE measurements and/or the NAI; and size of the QoE measurements and/or the NAI.

In some embodiments, the exemplary method can also include operations of block 2220, where the UE can receive, from the RNN after receiving the QoE measurement configuration (e.g., in block 2210), an access-layer measurement configuration (AMC) including one or more of the following:

a command to initiate access-layer measurements upon UE initiation of respective application sessions for the one or more services;

identification of which access-layer measurements should be performed; and an indication that the access-layer measurements are associated with the QoE measurements.

In some embodiments, the exemplary method can also include operations of blocks 2230 and 2250. In block 2230, the UE can, after receiving the QoE measurement configuration (e.g., in block 2210) and the AMC (e.g., in block 2220), initiate respective application sessions for the one or more services. In block 2250, the UE can perform access-layer measurements based on the AMC during the respective application sessions. The NAI is based on these access-layer measurements.

In addition, FIG. 23 shows a flow diagram of an exemplary method (e.g., procedure) for configuring quality of experience (QoE) measurements by user equipment (UEs), according to various exemplary embodiments of the present disclosure. The exemplary method can be performed by a radio access network node (RNN, e.g., base station, eNB, gNB, ng-eNB, etc., or components thereof) such as RNNs described elsewhere herein.

The exemplary method can include the operations of block 2310, where the RNN can receive, from a measurement function associated with the wireless network, a QoE measurement configuration associated with one or more services provided by an application layer of a UE served by the RNN. The exemplary method can also include the operations of block 2320, where the RNN can send the QoE measurement configuration to the UE. This can be done, for example, based on determining that the UE meets the criteria included in the QoE measurement configuration. The exemplary method can also include the operations of block 2350, where the RNN can receive, from the UE in accordance with the QoE measurement configuration, one or more messages comprising: QoE measurement reports comprising application-layer QoE measurements based on the QoE measurement configuration; and network assistance information (NAI) based on access-layer measurements related to one or more paths that carry data associated with the one or more services.

In some embodiments, the NAI can include the following:

an indication of whether one or multiple paths carry the data associated with the one or more services;

channel or link quality information associated with each path; and one or more identifiers associated with each path.

In case of multiple paths, the NAI can also include one or more of the following:

indication of multi-path features used in the multiple paths;

indication of portions of the data carried by each path; and indication of whether the multiple paths carry the same data or different subsets of data.

In some embodiments, the multi-path features used in the multiple paths can include any of the following:

DC with two different RNNs;

CA with multiple component carriers (e.g., in UL and/or DL);

UL (i.e., with corresponding DL) and supplementary UL (i.e., without corresponding DL);

licensed and unlicensed spectrum;

duplicate PDCP PDUs over multiple routes;

multiple GTP-U tunnels; and multiple backhaul access protocol (BAP) routes.

In some embodiments, when the multi-path features used in the multiple paths include DC with two different RNNs, the NAI can also include an indication of which of the following carry the data: MCG bearer, MCG split bearer, SCG bearer, and SCG split bearer.

In some embodiments, the NAI can also include an indication of one or more switches between single and multiple paths during the QoE measurements and a time of occurrence for each switch. As another option, the NAI can also include a plurality of NAI subsets corresponding to respective durations between consecutive switches between single and multiple paths during the QoE measurements.

In some embodiments, the channel or link quality information associated with each path (e.g., in the NAI) can be based on one or more of the following access-layer measurements: reference signal received power (RSRP), reference signal received quality (RSRQ), signal-to-interference-plus-noise ratio (SINR), received signal strength (RSSI), reference signal code power (RSCP), Ec/NO ratio, pathloss, hybrid ARQ (HARQ) retransmission information, radio link control (RLC) retransmission information, transmission control protocol (TCP) retransmission information, listen-before-talk (LBT) failure rate, block error rate, and fraction of lost packets. In some embodiments, the channel or link quality information associated with each path can be provided (e.g., in the NAI) in one or more of the following forms:

one or more statistics for a measured application session;

multiple samples or sample statistics (e.g., averages) collected during respective time intervals comprising the measured application session; and a last sample collected before sending the QoE measurement report.

In some embodiments, the NAI can also include information related to UE mobility, including any of the following:

one or more of the following to which the UE was registered while performing the QoE measurements: public land mobile network (PLMN) identity, tracking area code (TAC), and/or tracking area identity (TAI);

an indication that the UE has performed one or more mobility operations since sending the most recent QoE measurement report;

number of mobility operations performed;

identification of each mobility operation;

time of occurrence of each mobility operation;

identification of source and target cells for each mobility operation;

list of visited cells since sending the most recent QoE measurement report; and timer values associated with each mobility operation.

In some embodiments, the list of visited cells can include only cells visited while the UE was in a connected state.

In some embodiments, the one or more messages received from the UE (e.g., in block 2350) can include one of the following:

an access layer-message that includes the NAI and an application-layer message that includes a container comprising the QoE measurement report; or an application-layer message that includes both the NAI and the container.

In such embodiments, the exemplary method can also include the operations of block 2360, where the RNN can forward the NAI and the container to the measurement function as one of the following:

one application-layer message that includes both the NAI and the container; or two application-layer messages, one that includes the NAI and another that includes the container.

In some embodiments, the exemplary method can also include operations of block 2340, where the RNN can send, to the UE, one or more rules for selecting one of the following delivery options for the NAI:

via one of multiple paths that carry the data associated with the one or more services;

redundantly via the multiple paths; or

QoE measurements and NAI associated with the respective paths are sent via the respective paths.

In some embodiments, the one or more rules are related to one or more of the following: current network conditions; current radio channel conditions; criticality of the QoE measurements and/or NAI; and size of the QoE measurements and/or NAI.

In some embodiments, the exemplary method can also include operations of block 2330, where the RNN can send, to the UE (e.g., after sending the QoE measurement configuration in block 2320), an access-layer measurement configuration (AMC) including one or more of the following:

a command to initiate access-layer measurements upon UE initiation of respective application sessions for the one or more services;

identification of which access-layer measurements should be performed; and an indication that the access-layer measurements are associated with the QoE measurements.

In such embodiments, the received NAI can be based on the access-layer measurements.

In addition, FIG. 33 shows a flow diagram of another exemplary method (e.g., procedure) for configuring quality of experience (QoE) measurements by user equipment (UEs), according to various exemplary embodiments of the present disclosure. The exemplary method can be performed by a measurement function (e.g., MCE, TCE, etc.) associated with a wireless network (e.g., E-UTRAN, NG-RAN), such as measurement functions described elsewhere herein.

The exemplary method can include the operations of block 3310, where the measurement function can send, to a radio access network node (RNN) in the wireless network, a QoE measurement configuration associated with one or more services provided by an application layer of a UE served by the RNN. The exemplary method can also include the operations of block 3320, where the measurement function can receive, from the UE via the RNN, one or more messages comprising: one or more QoE measurement reports comprising results of the QoE measurements; and network assistance information (NAI) related to one or more paths that carry data associated with the one or more services.

In some embodiments, the NAI can include the following:

an indication of whether one or multiple paths carry the data associated with the one or more services;

channel or link quality information associated with each path; and one or more identifiers associated with each path.

In case of multiple paths, the NAI can also include one or more of the following:

indication of multi-path features used in the multiple paths;

indication of portions of the data carried by each path; and indication of whether the multiple paths carry the same data or different subsets of data.

In some embodiments, the multi-path features used in the multiple paths can include any of the following:

DC with two different RNNs;

CA with multiple component carriers (e.g., in UL and/or DL);

UL (i.e., with corresponding DL) and supplementary UL (i.e., without corresponding DL);

licensed and unlicensed spectrum;

duplicate PDCP PDUs over multiple routes;

multiple GTP-U tunnels; and multiple backhaul access protocol (BAP) routes.

In some embodiments, when the multi-path features used in the multiple paths include DC with two different RNNs, the NAI can also include an indication of which of the following carry the data: MCG bearer, MCG split bearer, SCG bearer, and SCG split bearer.

In some embodiments, the NAI can also include an indication of one or more switches between single and multiple paths during the QoE measurements and a time of occurrence for each switch. As another option, the NAI can also include a plurality of NAI subsets corresponding to respective durations between consecutive switches between single and multiple paths during the QoE measurements.

In some embodiments, the channel or link quality information associated with each path (e.g., in the NAI) can be based on one or more of the following access-layer measurements: reference signal received power (RSRP), reference signal received quality (RSRQ), signal-to-interference-plus-noise ratio (SINR), received signal strength (RSSI), reference signal code power (RSCP), Ec/NO ratio, pathloss, hybrid ARQ (HARQ) retransmission information, radio link control (RLC) retransmission information, transmission control protocol (TCP) retransmission information, listen-before-talk (LBT) failure rate, block error rate, and fraction of lost packets.

In some embodiments, the channel or link quality information associated with each path can be provided (e.g., in the NAI) in one or more of the following forms:

one or more statistics for a measured application session;

multiple samples or sample statistics (e.g., averages) collected during respective time intervals comprising the measured application session; and a last sample collected before sending the QoE measurement report.

In some embodiments, the NAI can also include information related to UE mobility, including any of the following:

one or more of the following to which the UE was registered while performing the QoE measurements: public land mobile network (PLMN) identity, tracking area code (TAC), and/or tracking area identity (TAI);

an indication that the UE has performed one or more mobility operations since sending the most recent QoE measurement report;

number of mobility operations performed;

identification of each mobility operation;

time of occurrence of each mobility operation;

identification of source and target cells for each mobility operation;

list of visited cells since sending the most recent QoE measurement report; and timer values associated with each mobility operation.

In some embodiments, the list of visited cells can include only cells visited while the UE was in a connected state.

In various embodiments, the one or more messages received from the UE via the RNN include one or more of the following:

one application-layer message that includes both the NAI and a container comprising a QoE measurement report; and two application-layer messages, one that includes the NAI and another that includes the container comprising the QoE measurement report.

In some embodiments, when multiple paths carry the data associated with the one or more applications, each message comprising a QoE measurement report and NAI is received from the UE according to one of the following delivery options:

via one of the multiple paths;

redundantly via the multiple paths; or

QoE measurements and NAI associated with the respective paths are received via the respective paths.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 24:
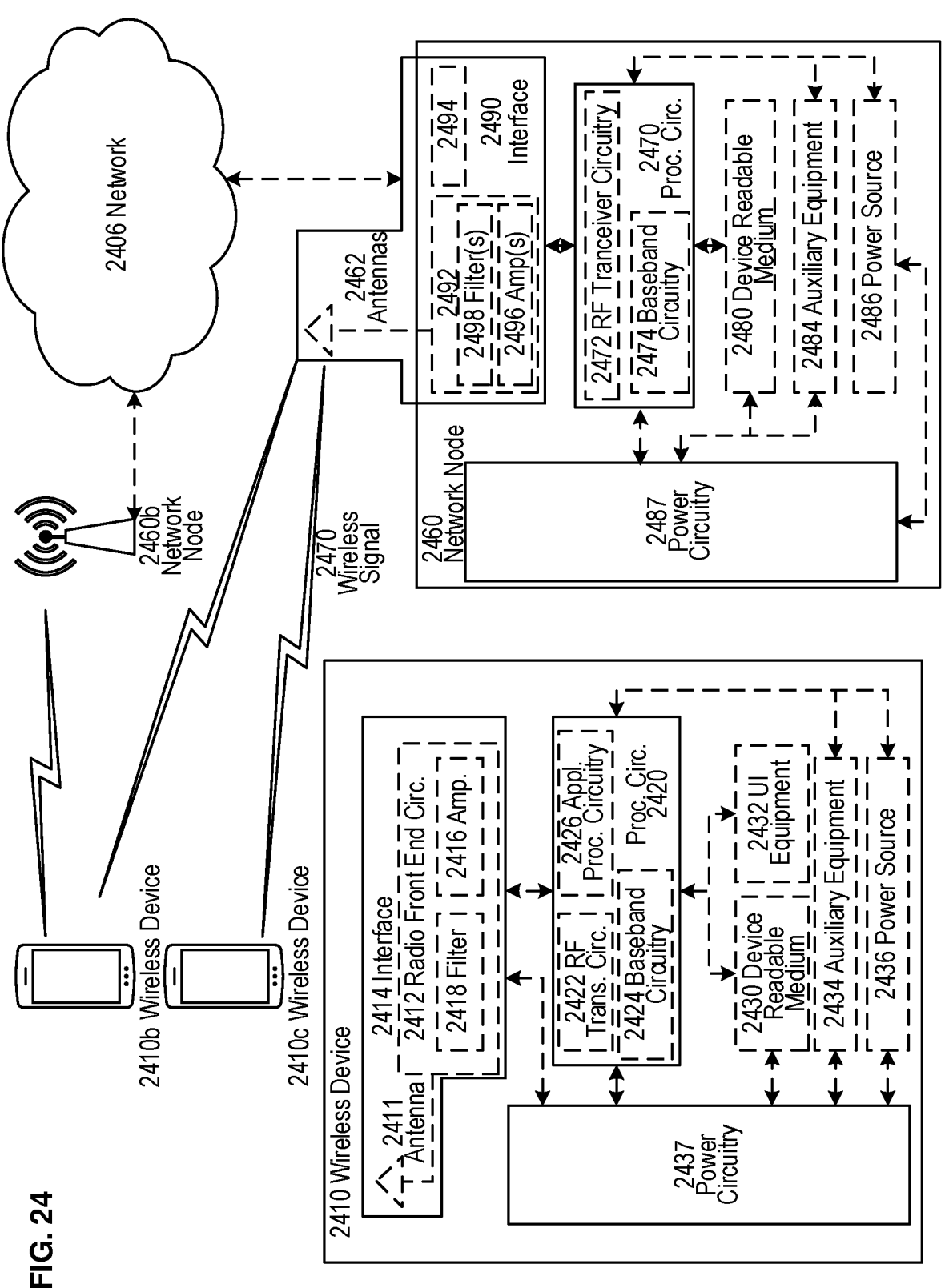
FIG. 24 illustrates an exemplary embodiment of a wireless network, according to various exemplary embodiments of the present disclosure.

For example, FIG. 24 shows an exemplary wireless network in which various embodiments disclosed herein can be implemented. For simplicity, the wireless network of FIG. 24 only depicts network 2406, network nodes 2460 and 2460b, and WDs 2410, 2410b, and 2410c. In practice, a wireless network can further include any additional elements suitable to support communication between wireless devices or between a wireless device and another communication device, such as a landline telephone, a service provider, or any other network node or end device. Of the illustrated components, network node 2460 and wireless device (WD) 2410 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2406 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2460 and WD 2410 comprise various components described in more detail below. These components work together in order to provide network node and/or wireless device 20) functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level)

and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 24, network node 2460 includes processing circuitry 2470, device readable medium 2480, interface 2490, auxiliary equipment 2484, power source 2486, power circuitry 2487, and antenna 2462. Although network node 2460 illustrated in the example wireless network of FIG. 24 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 2460 are depicted as single boxes located within a larger box, or nested within multiple boxes, in practice, a network node can comprise multiple different physical components that make up a single illustrated component (e.g., device readable medium 2480 can comprise multiple separate hard drives as well as multiple RAM modules).

Similarly, network node 2460 can be composed of multiple physically separate components (e.g., a NodeB component and a RNC component, or a BTS component and a BSC component, etc.), which can each have their own respective components. In certain scenarios in which network node 2460 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 2460 can be configured to support multiple radio access technologies (RATs). In such embodiments, some components can be duplicated (e.g., separate device readable medium 2480 for the different RATs) and some components can be reused (e.g., the same antenna 2462 can be shared by the RATs). Network node 2460 can also include multiple sets of the various illustrated components for different wireless technologies integrated into network node 2460, such as, for example, GSM, WCDMA, LTE, NR, WiFi, or Bluetooth wireless technologies. These wireless technologies can be integrated into the same or different chip or set of chips and other components within network node 2460.

Processing circuitry 2470 can be configured to perform any determining, calculating, or similar operations (e.g., certain obtaining operations) described herein as being provided by a network node. These operations performed by processing circuitry 2470 can include processing information obtained by processing circuitry 2470 by, for example, converting the obtained information into other information, comparing the obtained information or converted information to information stored in the network node, and/or performing one or more operations based on the obtained information or converted information, and as a result of said processing making a determination.

Processing circuitry 2470 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 2460, either alone or in conjunction with other network node 2460 components (e.g., device readable medium 2480). Such functionality can include any of the various wireless features, functions, or benefits discussed herein.

For example, processing circuitry 2470 can execute instructions stored in device readable medium 2480 or in memory within processing circuitry 2470. In some embodiments, processing circuitry 2470 can include a system on a chip (SOC). As a more specific example, instructions (also referred to as a computer program product) stored in medium 2480 can include instructions that, when executed by processing circuitry 2470, can configure network node 2460 to perform operations corresponding to various exemplary methods (e.g., procedures) described herein.

In some embodiments, processing circuitry 2470 can include one or more of radio frequency (RF) transceiver circuitry 2472 and baseband processing circuitry 2474. In some embodiments, radio frequency (RF) transceiver circuitry 2472 and baseband processing circuitry 2474 can be on separate chips (or sets of chips), boards, or units, such as radio units and digital units. In alternative embodiments, part or all of RF transceiver circuitry 2472 and baseband processing circuitry 2474 can be on the same chip or set of chips, boards, or units.

In certain embodiments, some or all of the functionality described herein as being provided by a network node, base station, eNB or other such network device can be performed by processing circuitry 2470 executing instructions stored on device readable medium 2480 or memory within processing circuitry 2470. In alternative embodiments, some or all of the functionality can be provided by processing circuitry 2470 without executing instructions stored on a separate or discrete device readable medium, such as in a hard-wired manner. In any of those embodiments, whether executing instructions stored on a device readable storage medium or not, processing circuitry 2470 can be configured to perform the described functionality. The benefits provided by such functionality are not limited to processing circuitry 2470 alone or to other components of network node 2460 but are enjoyed by network node 2460 as a whole, and/or by end users and the wireless network generally.

Device readable medium 2480 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 2470. Device readable medium 2480 can store any suitable instructions, data or information, including a computer program, software, an application including one or more of logic, rules, code, tables, etc. and/or other instructions capable of being executed by processing circuitry 2470 and, utilized by network node 2460. Device readable medium 2480 can be used to store any calculations made by processing circuitry 2470 and/or any data received via interface 2490. In some embodiments, processing circuitry 2470 and device readable medium 2480 can be considered to be integrated.

Interface 2490 is used in the wired or wireless communication of signaling and/or data between network node 2460, network 2406, and/or WDs 2410. As illustrated, interface 2490 comprises port(s)/terminal(s) 2494 to send and receive data, for example to and from network 2406 over a wired connection. Interface 2490 also includes radio front end circuitry 2492 that can be coupled to, or in certain embodiments a part of, antenna 2462. Radio front end circuitry 2492 comprises filters 2498 and amplifiers 2496. Radio front end circuitry 2492 can be connected to antenna 2462 and processing circuitry 2470. Radio front end circuitry can be configured to condition signals communicated between antenna 2462 and processing circuitry 2470. Radio front end circuitry 2492 can receive digital data that is to be sent out to other network nodes or WDs via a wireless connection. Radio front end circuitry 2492 can convert the digital data into a radio signal having the appropriate channel and bandwidth parameters using a combination of filters 2498 and/or amplifiers 2496. The radio signal can then be transmitted via antenna 2462. Similarly, when receiving data, antenna 2462 can collect radio signals which are then converted into digital data by radio front end circuitry 2492. The digital data can be passed to processing circuitry 2470. In other embodiments, the interface can comprise different components and/or different combinations of components.

In certain alternative embodiments, network node 2460 may not include separate radio front end circuitry 2492, instead, processing circuitry 2470 can comprise radio front end circuitry and can be connected to antenna 2462 without separate radio front end circuitry 2492. Similarly, in some embodiments, all or some of RF transceiver circuitry 2472 can be considered a part of interface 2490. In still other embodiments, interface 2490 can include one or more ports or terminals 2494, radio front end circuitry 2492, and RF transceiver circuitry 2472, as part of a radio unit (not shown), and interface 2490 can communicate with baseband processing circuitry 2474, which is part of a digital unit (not shown).

Antenna 2462 can include one or more antennas, or antenna arrays, configured to send and/or receive wireless signals. Antenna 2462 can be coupled to radio front end circuitry 2490 and can be any type of antenna capable of transmitting and receiving data and/or signals wirelessly. In some embodiments, antenna 2462 can comprise one or more omni-directional, sector or panel antennas operable to transmit/receive radio signals between, for example, 2 GHz and 66 GHZ. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 2462 can be separate from network node 2460 and can be connectable to network node 2460 through an interface or port.

Antenna 2462, interface 2490, and/or processing circuitry 2470 can be configured to perform any receiving operations and/or certain obtaining operations described herein as being performed by a network node. Any information, data and/or signals can be received from a wireless device, another network node and/or any other network equipment. Similarly, antenna 2462, interface 2490, and/or processing circuitry 2470 can be configured to perform any transmitting operations described herein as being performed by a network node. Any information, data and/or signals can be transmitted to a wireless device, another network node and/or any other network equipment.

Power circuitry 2487 can comprise, or be coupled to, power management circuitry and can be configured to supply the components of network node 2460 with power for performing the functionality described herein. Power circuitry 2487 can receive power from power source 2486. Power source 2486 and/or power circuitry 2487 can be configured to provide power to the various components of network node 2460 in a form suitable for the respective components (e.g., at a voltage and current level needed for each respective component). Power source 2486 can either be included in, or external to, power circuitry 2487 and/or network node 2460. For example, network node 2460 can be connectable to an external power source (e.g., an electricity outlet) via an input circuitry or interface such as an electrical cable, whereby the external power source supplies power to power circuitry 2487. As a further example, power source 2486 can comprise a source of power in the form of a battery or battery pack which is connected to, or integrated in, power circuitry 2487. The battery can provide backup power should the external power source fail. Other types of power sources, such as photovoltaic devices, can also be used.

Alternative embodiments of network node 2460 can include additional components beyond those shown in FIG. 24 that can be responsible for providing certain aspects of the network node's functionality, including any of the functionality described herein and/or any functionality necessary to support the subject matter described herein. For example, network node 2460 can include user interface equipment to allow and/or facilitate input of information into network node 2460 and to allow and/or facilitate output of information from network node 2460. This can allow and/or facilitate a user to perform diagnostic, maintenance, repair, and other administrative functions for network node 2460.

In some embodiments, a wireless device (WD, e.g., WD 2410) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VOIP) phones, wireless local loop phones, desktop computers, personal digital assistants (PDAs), wireless 20) cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 2410 includes antenna 2411, interface 2414, processing circuitry 2420, device readable medium 2430, user interface equipment 2432, auxiliary equipment 2434, power source 2436 and power circuitry 2437. WD 2410 can include multiple sets of one or more of the illustrated components for different wireless technologies supported by WD 2410, such as, for example, GSM, WCDMA, LTE, NR, WiFi, WiMAX, or Bluetooth wireless technologies, just to mention a few. These wireless technologies can be integrated into the same or different chips or set of chips as other components within WD 2410.

Antenna 2411 can include one or more antennas or antenna arrays, configured to send and/or receive wireless signals, and is connected to interface 2414. In certain alternative embodiments, antenna 2411 can be separate from WD 2410 and be connectable to WD 2410 through an interface or port. Antenna 2411, interface 2414, and/or processing circuitry 2420 can be configured to perform any receiving or transmitting operations described herein as being performed by a WD. Any information, data and/or signals can be received from a network node and/or another WD. In some embodiments, radio front end circuitry and/or antenna 2411 can be considered an interface.

As illustrated, interface 2414 comprises radio front end circuitry 2412 and antenna 2411. Radio front end circuitry 2412 comprise one or more filters 2418 and amplifiers 2416. Radio front end circuitry 2414 is connected to antenna 2411 and processing circuitry 2420 and can be configured to condition signals communicated between antenna 2411 and processing circuitry 2420. Radio front end circuitry 2412 can be coupled to or a part of antenna 2411. In some embodiments, WD 2410 may not include separate radio front end circuitry 2412; rather, processing circuitry 2420 can comprise radio front end circuitry and can be connected to antenna 2411. Similarly, in some embodiments, some or all of RF transceiver circuitry 2422 can be considered a part of interface 2414. Radio front end circuitry 2412 can receive digital data that is to be sent out to other network nodes or WDs via a wireless connection. Radio front end circuitry 2412 can convert the digital data into a radio signal having the appropriate channel and bandwidth parameters using a combination of filters 2418 and/or amplifiers 2416. The radio signal can then be transmitted via antenna 2411. Similarly, when receiving data, antenna 2411 can collect radio signals which are then converted into digital data by radio front end circuitry 2412. The digital data can be passed to processing circuitry 2420. In other embodiments, the interface can comprise different components and/or different combinations of components.

Processing circuitry 2420 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 2410 functionality either alone or in combination with other WD 2410 components, such as device readable medium 2430. Such functionality can include any of the various wireless features or benefits discussed herein.

For example, processing circuitry 2420 can execute instructions stored in device readable medium 2430 or in memory within processing circuitry 2420 to provide the functionality disclosed herein. More specifically, instructions (also referred to as a computer program product) stored in medium 2430 can include instructions that, when executed by processor 2420, can configure wireless device 2410 to perform operations corresponding to various exemplary methods (e.g., procedures) described herein.

As illustrated, processing circuitry 2420 includes one or more of RF transceiver circuitry 2422, baseband processing circuitry 2424, and application processing circuitry 2426. In other embodiments, the processing circuitry can comprise different components and/or different combinations of components. In certain embodiments processing circuitry 2420 of WD 2410 can comprise a SOC. In some embodiments, RF transceiver circuitry 2422, baseband processing circuitry 2424, and application processing circuitry 2426 can be on separate chips or sets of chips. In alternative embodiments, part or all of baseband processing circuitry 2424 and application processing circuitry 2426 can be combined into one chip or set of chips, and RF transceiver circuitry 2422 can be on a separate chip or set of chips. In still alternative embodiments, part or all of RF transceiver circuitry 2422 and baseband processing circuitry 2424 can be on the same chip or set of chips, and application processing circuitry 2426 can be on a separate chip or set of chips. In yet other alternative embodiments, part or all of RF transceiver circuitry 2422, baseband processing circuitry 2424, and application processing circuitry 2426 can be combined in the same chip or set of chips. In some embodiments, RF transceiver circuitry 2422 can be a part of interface 2414. RF transceiver circuitry 2422 can condition RF signals for processing circuitry 2420.

In certain embodiments, some or all of the functionality described herein as being performed by a WD can be provided by processing circuitry 2420 executing instructions stored on device readable medium 2430, which in certain embodiments can be a computer-readable storage medium. In alternative embodiments, some or all of the functionality can be provided by processing circuitry 2420 without executing instructions stored on a separate or discrete device readable storage medium, such as in a hard-wired manner. In any of those particular embodiments, whether executing instructions stored on a device readable storage medium or not, processing circuitry 2420 can be configured to perform the described functionality. The benefits provided by such functionality are not limited to processing circuitry 2420 alone or to other components of WD 2410, but are enjoyed by WD 2410 as a whole, and/or by end users and the wireless network generally.

Processing circuitry 2420 can be configured to perform any determining, calculating, or similar operations (e.g., certain obtaining operations) described herein as being performed by a WD. These operations, as performed by processing circuitry 2420, can include processing information obtained by processing circuitry 2420 by, for example, converting the obtained information into other information, comparing the obtained information or converted information to information stored by WD 2410, and/or performing one or more operations based on the obtained information or converted information, and as a result of said processing making a determination.

Device readable medium 2430 can be operable to store a computer program, software, an application including one or more of logic, rules, code, tables, etc. and/or other instructions capable of being executed by processing circuitry 2420. Device readable medium 2430 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 2420. In some embodiments, processing circuitry 2420 and device readable medium 2430 can be considered to be integrated.

User interface equipment 2432 can include components that allow and/or facilitate a human user to interact with WD 2410. Such interaction can be of many forms, such as visual, audial, tactile, etc. User interface equipment 2432 can be operable to produce output to the user and to allow and/or facilitate the user to provide input to WD 2410. The type of interaction can vary depending on the type of user interface equipment 2432 installed in WD 2410. For example, if WD 2410 is a smart phone, the interaction can be via a touch screen; if WD 2410 is a smart meter, the interaction can be through a screen that provides usage (e.g., the number of gallons used) or a speaker that provides an audible alert (e.g., if smoke is detected). User interface equipment 2432 can include input interfaces, devices and circuits, and output interfaces, devices and circuits. User interface equipment 2432 can be configured to allow and/or facilitate input of information into WD 2410 and is connected to processing circuitry 2420 to allow and/or facilitate processing circuitry 2420 to process the input information. User interface equipment 2432 can include, for example, a microphone, a proximity or other sensor, keys/buttons, a touch display, one or more cameras, a USB port, or other input circuitry. User interface equipment 2432 is also configured to allow and/or facilitate output of information from WD 2410, and to allow and/or facilitate processing circuitry 2420 to output information from WD 2410. User interface equipment 2432 can include, for example, a speaker, a display, vibrating circuitry, a USB port, a headphone interface, or other output circuitry. Using one or more input and output interfaces, devices, and circuits, of user interface equipment 2432, WD 2410 can communicate with end users and/or the wireless network and allow and/or facilitate them to benefit from the functionality described herein.

Auxiliary equipment 2434 is operable to provide more specific functionality which may not be generally performed by WDs. This can comprise specialized sensors for doing measurements for various purposes, interfaces for additional types of communication such as wired communications etc. The inclusion and type of components of auxiliary equipment 2434 can vary depending on the embodiment and/or scenario.

Power source 2436 can, in some embodiments, be in the form of a battery or battery pack. Other types of power sources, such as an external power source (e.g., an electricity outlet), photovoltaic devices or power cells, can also be used. WD 2410 can further comprise power circuitry 2437 for delivering power from power source 2436 to the various parts of WD 2410 which need power from power source 2436 to carry out any functionality described or indicated herein. Power circuitry 2437 can in certain embodiments comprise power management circuitry. 20) Power circuitry 2437 can additionally or alternatively be operable to receive power from an external power source; in which case WD 2410 can be connectable to the external power source (such as an electricity outlet) via input circuitry or an interface such as an electrical power cable. Power circuitry 2437 can also in certain embodiments be operable to deliver power from an external power source to power source 2436. This can be, for example, for the charging of power 25 source 2436. Power circuitry 2437 can perform any converting or other modification to the power from power source 2436 to make it suitable for supply to the respective components of WD 2410.

Figure 25:
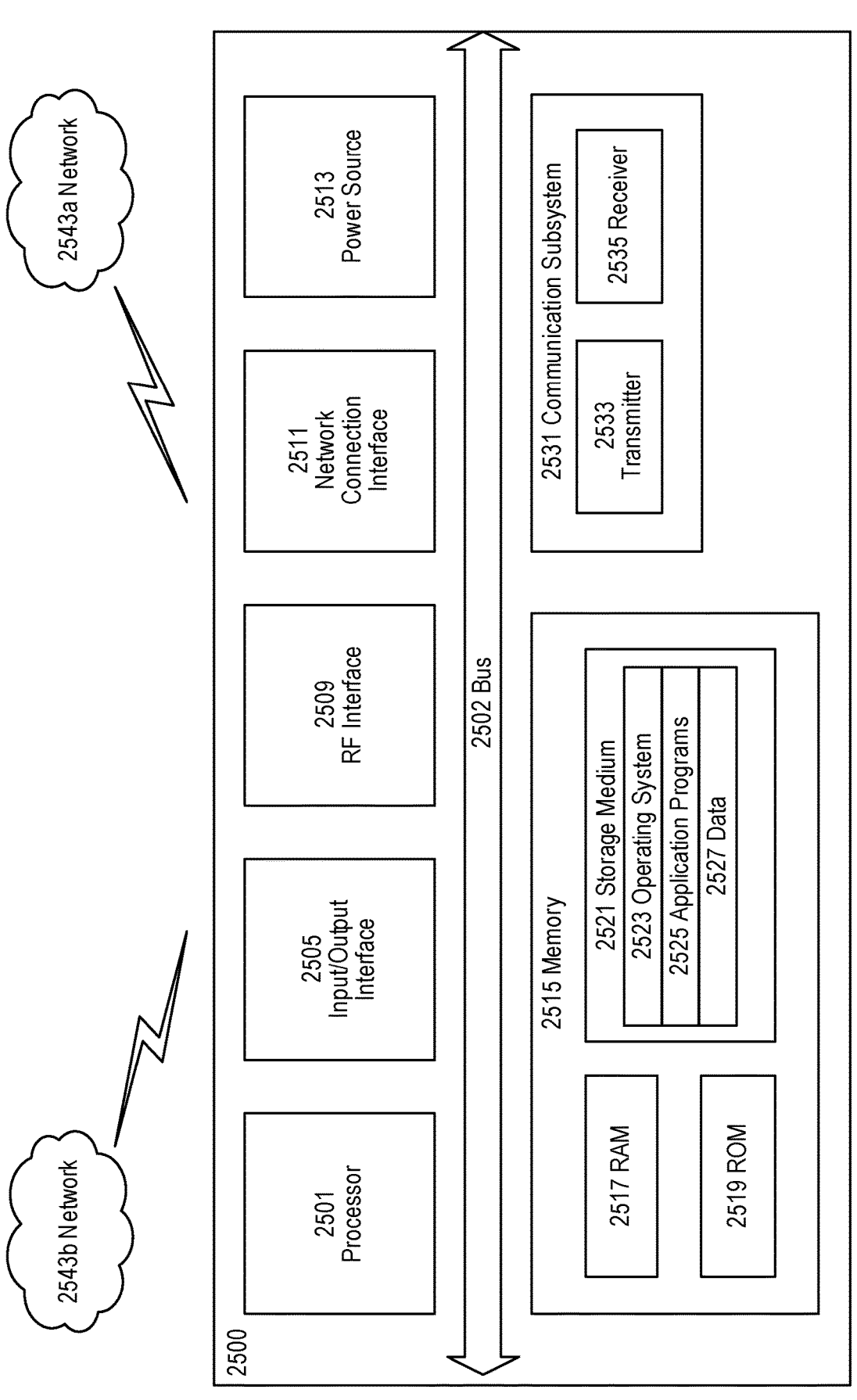
FIG. 25 illustrates an exemplary embodiment of a UE, according to various exemplary embodiments of the present disclosure.

FIG. 25 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 25200 can be any UE identified by the 3$^{rd}$ Generation Partnership Project (3GPP), including a NB-IoT UE, a machine type communication (MTC) UE, and/or an enhanced MTC (eMTC) UE. UE 2500, as illustrated in FIG. 25, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE can be used interchangeable. Accordingly, although FIG. 25 is a UE, the components discussed herein are equally applicable to a WD, and vice-versa.

In FIG. 25, UE 2500 includes processing circuitry 2501 that is operatively coupled to input/output interface 2505, radio frequency (RF) interface 2509, network connection interface 2511, memory 2515 including random access memory (RAM) 2517, read-only memory (ROM) 2519, and storage medium 2521 or the like, communication subsystem 2531, power source 2533, and/or any other component, or any combination thereof. Storage medium 2521 includes operating system 2523, application program 2525, and data 2527. In other embodiments, storage medium 2521 can include other similar types of information. Certain UEs can utilize all of the components shown in FIG. 25, or only a subset of the components. The level of integration between the components can vary from one UE to another UE.

Further, certain UEs can contain multiple instances of a component, such as multiple processors, memories, transceivers, transmitters, receivers, etc.

In FIG. 25, processing circuitry 2501 can be configured to process computer instructions and data. Processing circuitry 2501 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2501 can include two central processing units (CPUs). Data can be information in a form suitable for use by a computer.

In the depicted embodiment, input/output interface 2505 can be configured to provide a communication interface to an input device, output device, or input and output device. UE 2500 can be configured to use an output device via input/output interface 2505. An output device can use the same type of interface port as an input device. For example, a USB port can be used to provide input to and output from UE 2500. The output device can be a speaker, a sound card, a video card, a display, a monitor, a printer, an actuator, an emitter, a smartcard, another output device, or any combination thereof. UE 2500 can be configured to use an input device via input/output interface 2505 to allow and/or facilitate a user to capture information into UE 2500. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 25, RF interface 2509 can be configured to provide a communication interface to RF components such as a transmitter, a receiver, and an antenna. Network connection interface 2511 can be configured to provide a communication interface to network 2543a. Network 2543a can encompass wired and/or wireless networks such as a local-area network (LAN), a wide-area network (WAN), a computer network, a wireless network, a telecommunications network, another like network or any combination thereof. For example, network 2543a can comprise a Wi-Fi network. Network connection interface 2511 can be configured to include a receiver and a transmitter interface used to communicate with one or more other devices over a communication network according to one or more communication protocols, such as Ethernet, TCP/IP, SONET, ATM, or the like. Network connection interface 2511 can implement receiver and transmitter functionality appropriate to the communication network links (e.g., optical, electrical, and the like). The transmitter and receiver functions can share circuit components, software or firmware, or alternatively can be implemented separately.

RAM 2517 can be configured to interface via bus 2502 to processing circuitry 2501 to provide storage or caching of data or computer instructions during the execution of software programs such as the operating system, application programs, and device drivers. ROM 2519 can be configured to provide computer instructions or data to processing circuitry 2501. For example, ROM 2519 can be configured to store invariant low-level system code or data for basic system functions such as basic input and output (I/O), startup, or reception of keystrokes from a keyboard that are stored in a non-volatile memory. Storage medium 2521 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 2521 can be configured to include operating system 2523; application program 2525 such as a web browser application, a widget or gadget engine or another application; and data file 2527. Storage medium 2521 can store, for use by UE 2500, any of a variety of various operating systems or combinations of operating systems. For example, application program 2525 can include executable program instructions (also referred to as a computer program product) that, when executed by processor 2501, can configure UE 2500 to perform operations corresponding to various exemplary methods (e.g., procedures) described herein.

Storage medium 2521 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2521 can allow and/or facilitate UE 2500 to access computer-executable instructions, application programs or the like, stored on transitory or non-transitory memory media, to off-load data, or to upload data. An article of manufacture, such as one utilizing a communication system can be tangibly embodied in storage medium 2521, which can comprise a device readable medium.

In FIG. 25, processing circuitry 2501 can be configured to communicate with network 2543b using communication subsystem 2531. Network 2543a and network 2543b can be the same network or networks or different network or networks. Communication subsystem 2531 can be configured to include one or more transceivers used to communicate with network 2543b. For example, communication subsystem 2531 can be configured to include one or more transceivers used to communicate with one or more remote transceivers of another device capable of wireless communication such as another WD, UE, or base station of a radio access network (RAN) according to one or more communication protocols, such as IEEE 802.25, CDMA, WCDMA, GSM, LTE, UTRAN, WiMax, or the like. Each transceiver can include transmitter 2533 and/or receiver 2535 to implement transmitter or receiver functionality, respectively, appropriate to the RAN links (e.g., frequency allocations and the like). Further, transmitter 2533 and receiver 2535 of each transceiver can share circuit components, software or firmware, or alternatively can be implemented separately.

In the illustrated embodiment, the communication functions of communication subsystem 2531 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 2531 can include cellular communication, Wi-Fi communication, Bluetooth communication, and GPS communication. Network 2543*b* can encompass wired and/or wireless networks such as a local-area network (LAN), a wide-area network (WAN), a computer network, a wireless network, a telecommunications network, another like network or any combination thereof. For example, network 2543*b* can be a cellular network, a Wi-Fi network, and/or a near-field network. Power source 2513 can be configured to provide alternating current (AC) or direct current (DC) power to components of UE 2500.

The features, benefits and/or functions described herein can be implemented in one of the components of UE 2500 or partitioned across multiple components of UE 2500. Further, the features, benefits, and/or functions described herein can be implemented in any combination of hardware, software or firmware. In one example, communication subsystem 2531 can be configured to include any of the components described herein. Further, processing circuitry 2501 can be configured to communicate with any of such components over bus 2502. In another example, any of such components can be represented by program instructions stored in memory that when executed by processing circuitry 2501 perform the corresponding functions described herein. In another example, the functionality of any of such components can be partitioned between processing circuitry 2501 and communication subsystem 2531. In another example, the non-computationally intensive functions of any of such components can be implemented in software or firmware and the computationally intensive functions can be implemented in hardware.

Figure 26:
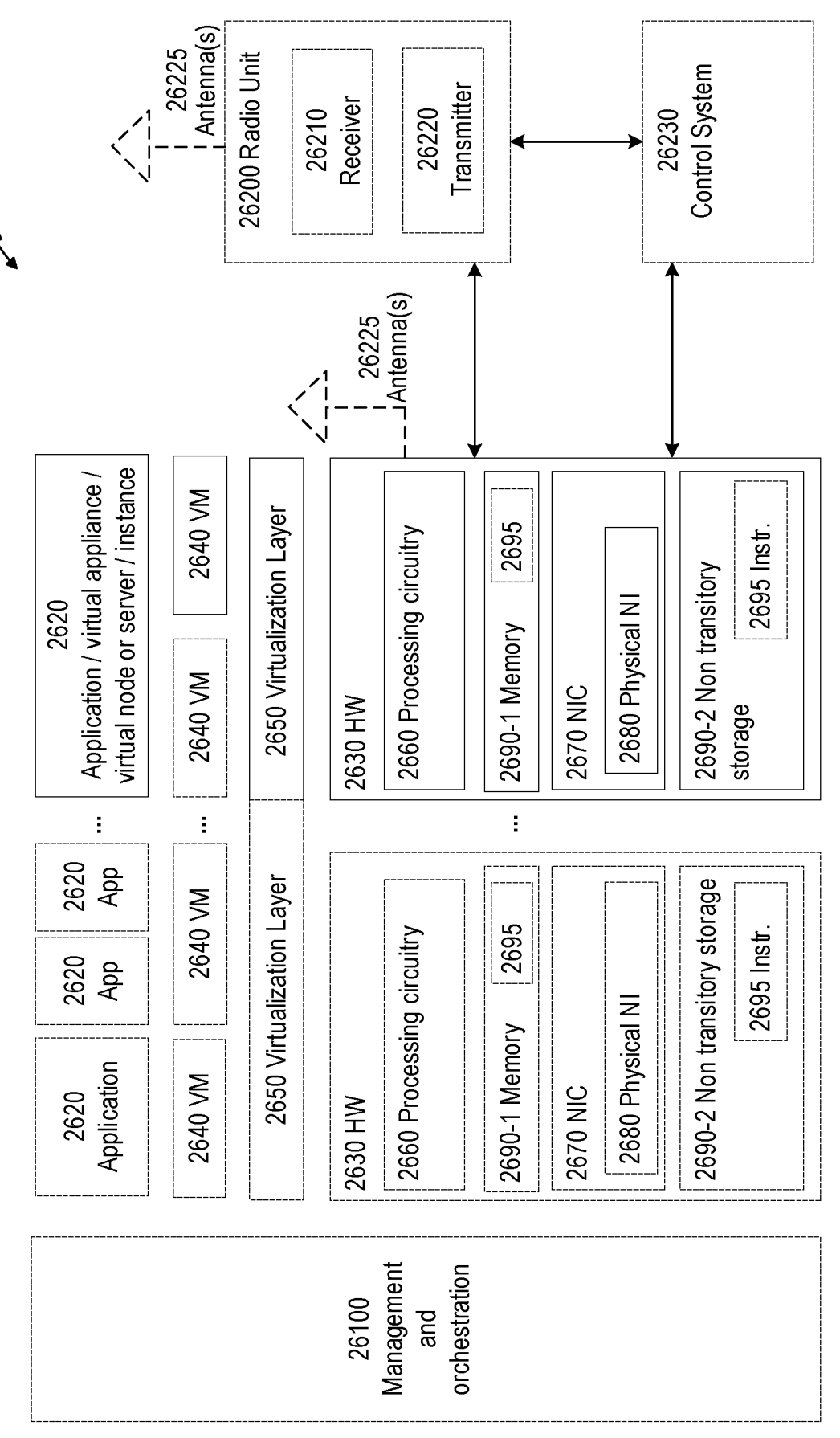
FIG. 26 is a block diagram illustrating an exemplary virtualization environment usable for implementation of various embodiments of network nodes described herein.

FIG. 26 is a schematic block diagram illustrating a virtualization environment 2600 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 2600 hosted by one or more of hardware nodes 2630. Further, in embodiments in which the virtual node is not a radio access node or does not require radio connectivity (e.g., a core network node), then the network node can be entirely virtualized.

The functions can be implemented by one or more applications 2620 (which can alternatively be called software instances, virtual appliances, network functions, virtual nodes, virtual network functions, etc.) operative to implement some of the features, functions, and/or benefits of some of the embodiments disclosed herein. Applications 2620 are run in virtualization environment 2600 which provides hardware 2630 comprising processing circuitry 2660 and memory 2690. Memory 2690 contains instructions 2695 executable by processing circuitry 2660 whereby application 2620 is operative to provide one or more of the features, benefits, and/or functions disclosed herein.

Virtualization environment 2600 can include general-purpose or special-purpose network hardware devices (or nodes) 2630 comprising a set of one or more processors or processing circuitry 2660, which can be commercial off-the-shelf (COTS) processors, dedicated Application Specific Integrated Circuits (ASICs), or any other type of processing circuitry including digital or analog hardware components or special purpose processors. Each hardware device can comprise memory 2690-1 which can be non-persistent memory for temporarily storing instructions 2695 or software executed by processing circuitry 2660. For example, instructions 2695 can include program instructions (also referred to as a computer program product) that, when executed by processing circuitry 2660, can configure hardware node 2620 to perform operations corresponding to various exemplary methods (e.g., procedures) described herein. Such operations can also be attributed to virtual node(s) 2620 that is/are hosted by hardware node 2630.

Each hardware device can comprise one or more network interface controllers (NICs) 2670, also known as network interface cards, which include physical network interface 2680. Each hardware device can also include non-transitory, persistent, machine-readable storage media 2690-2 having stored therein software 2695 and/or instructions executable by processing circuitry 2660. Software 2695 can include any type of software including software for instantiating one or more virtualization layers 2650 (also referred to as hypervisors), software to execute virtual machines 2640 as well as software allowing it to execute functions, features and/or benefits described in relation with some embodiments described herein.

Virtual machines 2640, comprise virtual processing, virtual memory, virtual networking or interface and virtual storage, and can be run by a corresponding virtualization layer 2650 or hypervisor. Different embodiments of the instance of virtual appliance 2620 can be implemented on one or more of virtual machines 2640, and the implementations can be made in different ways.

During operation, processing circuitry 2660 executes software 2695 to instantiate the hypervisor or virtualization layer 2650, which can sometimes be referred to as a virtual machine monitor (VMM). Virtualization layer 2650 can present a virtual operating platform that appears like networking hardware to virtual machine 2640.

As shown in FIG. 26, hardware 2630 can be a standalone network node with generic or specific components. Hardware 2630 can comprise antenna 26225 and can implement some functions via virtualization. Alternatively, hardware 2630 can be part of a larger cluster of hardware (e.g., such as in a data center or customer premise equipment (CPE)) where many hardware nodes work together and are managed via management and orchestration (MANO) 26100, which, among others, oversees lifecycle management of applications 2620.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 2640 can be a software implementation of a physical machine that runs programs as if they were executing on a physical, non-virtualized machine. Each of virtual machines 2640, and that part of hardware 2630 that executes that virtual machine, be it hardware dedicated to that virtual machine and/or hardware shared by that virtual machine with others of the virtual machines 2640, forms a separate virtual network elements (VNE).

Still in the context of NFV, Virtual Network Function (VNF) is responsible for handling specific network functions that run in one or more virtual machines 2640 on top of hardware networking infrastructure 2630 and corresponds to application 2620 in FIG. 26. As an example, such an arrangement can be used to implement a measurement function (e.g., MCE, TCE) described elsewhere herein.

In some embodiments, one or more radio units 26200 that each include one or more transmitters 26220 and one or more receivers 26210 can be coupled to one or more antennas 26225. Radio units 26200 can communicate directly with hardware nodes 2630 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 26230, which can alternatively be used for communication between the hardware nodes 2630 and radio units 26200.

Figure 27:
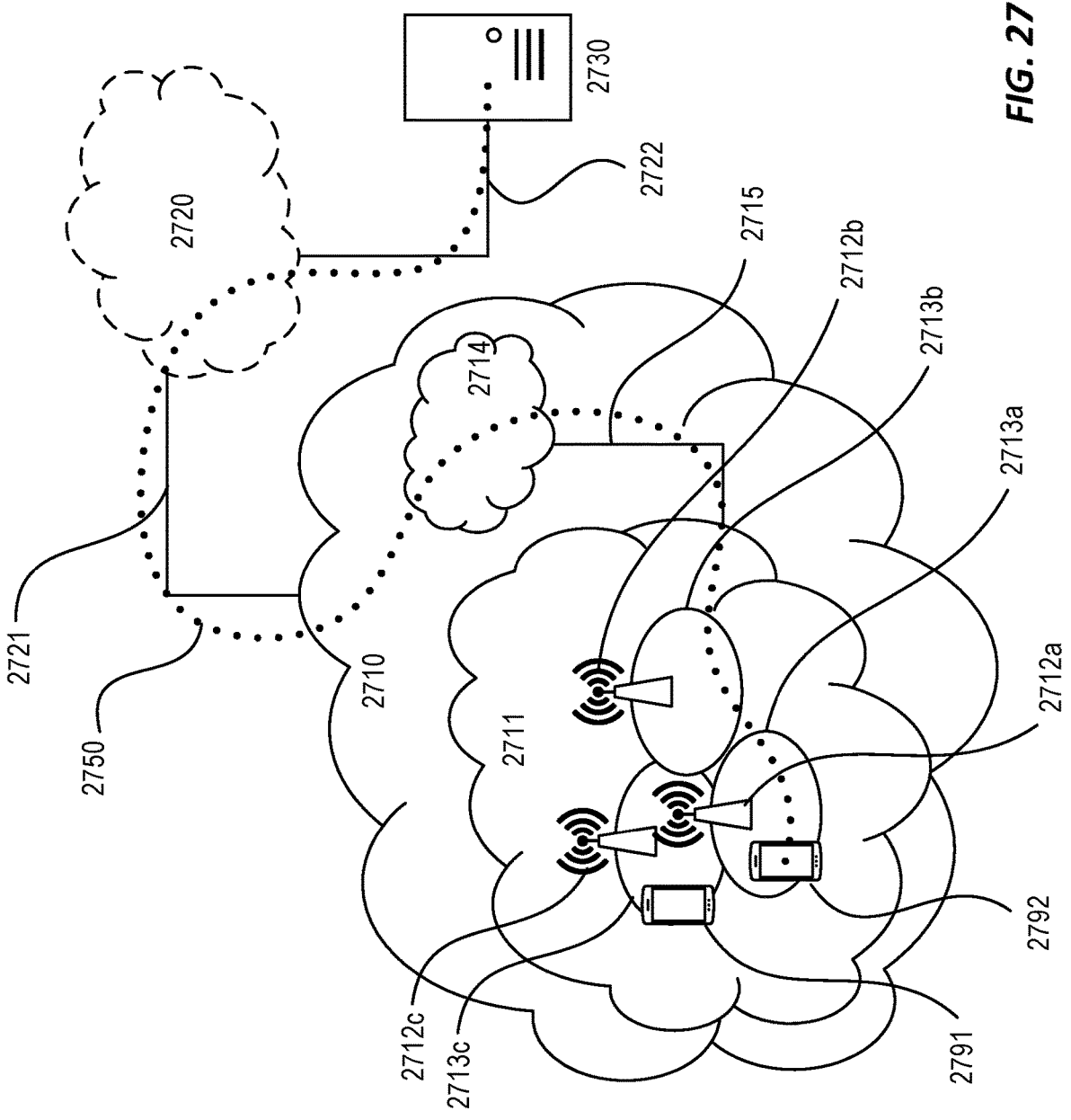
FIGS. 27-28 are block diagrams of various exemplary communication systems and/or networks, according to various exemplary embodiments of the present disclosure.

With reference to FIG. 27, in accordance with an embodiment, a communication system includes telecommunication network 2710, such as a 3GPP-type cellular network, which comprises access network 2711, such as a radio access network, and core network 2714. Access network 2711 comprises a plurality of base stations 2712a, 2712b, 2712c, such as NBs, eNBs, gNBs or other types of wireless access points, each defining a corresponding coverage area 2713a, 2713b, 2713c. Each base station 2712a, 2712b, 2712c is connectable to core network 2714 over a wired or wireless connection 2715. A first UE 2791 located in coverage area 2713c can be configured to wirelessly connect to, or be paged by, the corresponding base station 2712c. A second UE 2792 in coverage area 2713a is wirelessly connectable to the corresponding base station 2712a. While a plurality of UEs 2791, 2792 are illustrated in this example, the disclosed embodiments are equally applicable to a situation where a sole UE is in the coverage area or where a sole UE is connecting to the Telecommunication network 2710 is itself connected to host computer 2730, which can be embodied in the hardware and/or software of a standalone server, a cloud-implemented server, a distributed server or as processing resources in a server farm. Host computer 2730 can be under the ownership or control of a service provider or can be operated by the service provider or on behalf of the service provider. Connections 2721 and 2722 between telecommunication network 2710 and host computer 2730 can extend directly from core network 2714 to host computer 2730 or can go via an optional intermediate network 2720. Intermediate network 2720 can be one of, or a combination of more than one of, a public, private or hosted network; intermediate network 2720, if any, can be a backbone network or the Internet; in particular, intermediate network 2720 can comprise two or more sub-networks (not shown).

The communication system of FIG. 27 as a whole enables connectivity between the connected UEs 2791, 2792 and host computer 2730. The connectivity can be described as an over-the-top (OTT) connection 2750. Host computer 2730 and the connected UEs 2791, 2792 are configured to communicate data and/or signaling via OTT connection 2750, using access network 2711, core network 2714, any intermediate network 2720 and possible further infrastructure (not shown) as intermediaries. OTT connection 2750 can be transparent in the sense that the participating communication devices through which OTT connection 2750 passes are unaware of routing of uplink and downlink communications. For example, base station 2712 may not or need not be informed about the past routing of an incoming downlink communication with data originating from host computer 2730 to be forwarded (e.g., handed over) to a connected UE 2791. Similarly, base station 2712 need not be aware of the future routing of an outgoing uplink communication originating from the UE 2791 towards the host computer 2730.

Example implementations, in accordance with an embodiment, of the UE, base station and host computer discussed in the preceding paragraphs will now be described with reference to FIG. 28. In communication system 2800, host computer 2810 comprises hardware 2815 including communication interface 2816 configured to set up and maintain a wired or wireless connection with an interface of a different communication device of communication system 2800. Host computer 2810 further comprises processing circuitry 2818, which can have storage and/or processing capabilities. In particular, processing circuitry 2818 can comprise one or more programmable processors, application-specific integrated circuits, field programmable gate arrays or combinations of these (not shown) adapted to execute instructions. Host computer 2810 further comprises software 2811, which is stored in or accessible by host computer 2810 and executable by processing circuitry 2818. Software 2811 includes host application 2812. Host application 2812 can be operable to provide a service to a remote user, such as UE 2830 connecting via OTT connection 2850 terminating at UE 2830 and host computer 2810. In providing the service to the remote user, host application 2812 can provide user data which is transmitted using OTT connection 2850.

Communication system 2800 can also include base station 2820 provided in a telecommunication system and comprising hardware 2825 enabling it to communicate with host computer 2810 and with UE 2830. Hardware 2825 can include communication interface 2826 for setting up and maintaining a wired or wireless connection with an interface of a different communication device of communication system 2800, as well as radio interface 2827 for setting up and maintaining at least wireless connection 2870 with UE 2830 located in a coverage area (not shown in FIG. 28) served by base station 2820. Communication interface 2826 can be configured to facilitate connection 2860 to host computer 2810. Connection 2860 can be direct, or it can pass through a core network (not shown in FIG. 28) of the telecommunication system and/or through one or more intermediate networks outside the telecommunication system. In the embodiment shown, hardware 2825 of base station 2820 can also include processing circuitry 2828, which can comprise one or more programmable processors, application-specific integrated circuits, field programmable gate arrays or combinations of these (not shown) adapted to execute instructions.

Base station 2820 also includes software 2821 stored internally or accessible via an external connection. For example, software 2821 can include program instructions (also referred to as a computer program product) that, when executed by processing circuitry 2828, can configure base station 2820 to perform operations corresponding to various exemplary methods (e.g., procedures) described herein.

Communication system 2800 can also include UE 2830 already referred to, whose hardware 2835 can include radio interface 2837 configured to set up and maintain wireless connection 2870 with a base station serving a coverage area in which UE 2830 is currently located. Hardware 2835 of UE 2830 can also include processing circuitry 2838, which can comprise one or more programmable processors, application-specific integrated circuits, field programmable gate arrays or combinations of these (not shown) adapted to execute instructions.

UE 2830 also includes software 2831, which is stored in or accessible by UE 2830 and executable by processing circuitry 2838. Software 2831 includes client application 2832. Client application 2832 can be operable to provide a service to a human or non-human user via UE 2830, with the support of host computer 2810. In host computer 2810, an executing host application 2812 can communicate with the executing client application 2832 via OTT connection 2850 terminating at UE 2830 and host computer 2810. In providing the service to the user, client application 2832 can receive request data from host application 2812 and provide user data in response to the request data. OTT connection 2850 can transfer both the request data and the user data. Client application 2832 can interact with the user to generate the user data that it provides. Software 2831 can also include program instructions (also referred to as a computer program product) that, when executed by processing circuitry 2838, can configure UE 2830 to perform operations corresponding to various exemplary methods (e.g., procedures) described herein.

Figure 28:
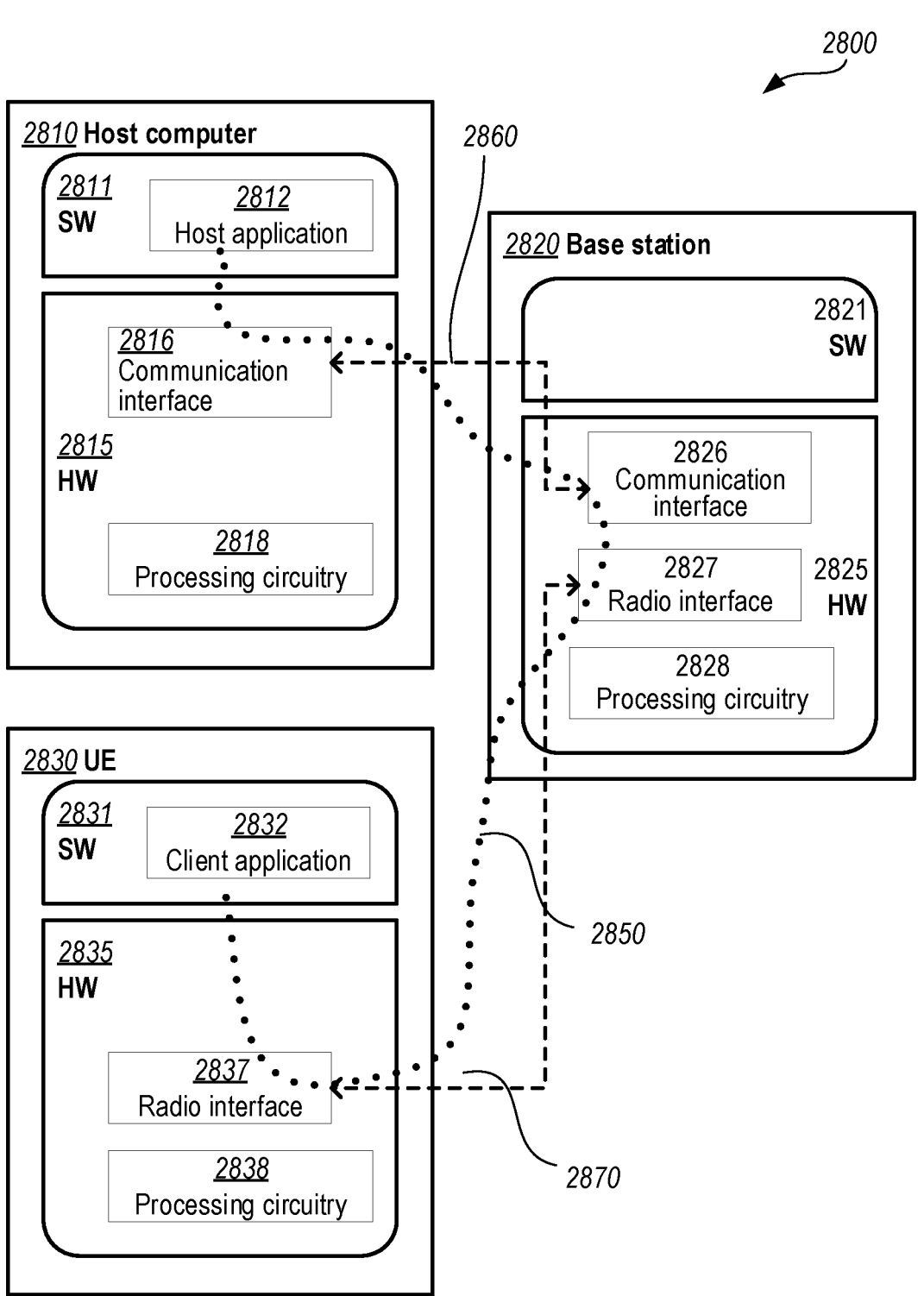

As an example, host computer 2810, base station 2820 and UE 2830 illustrated in FIG. 28 can be similar or identical to host computer 2730, one of base stations 2712*a*, 2712*b*, 2712*c* and one of UEs 2791, 2792 of FIG. 27, respectively. This is to say, the inner workings of these entities can be as shown in FIG. 28 and independently, the surrounding network topology can be that of FIG. 27.

In FIG. 28, OTT connection 2850 has been drawn abstractly to illustrate the communication between host computer 2810 and UE 2830 via base station 2820, without explicit 20) reference to any intermediary devices and the precise routing of messages via these devices. Network infrastructure can determine the routing, which it can be configured to hide from UE 2830 or from the service provider operating host computer 2810, or both. While OTT connection 2850 is active, the network infrastructure can further take decisions by which it dynamically changes the routing (e.g., on the basis of load balancing consideration or reconfiguration of the network). 25

Wireless connection 2870 between UE 2830 and base station 2820 is in accordance with the teachings of the embodiments described throughout this disclosure. One or more of the various embodiments improve the performance of OTT services provided to UE 2830 using OTT connection 2850, in which wireless connection 2870 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 2850 between host computer 2810 and UE 2830, in response to variations in the measurement results. The measurement procedure and/or the network functionality for reconfiguring OTT connection 2850 can be implemented in software 2811 and hardware 2815 of host computer 2810 or in software 2831 and hardware 2835 of UE 2830, or both. In embodiments, sensors (not shown) can be deployed in or in association with communication devices through which OTT connection 2850 passes; the sensors can participate in the measurement procedure by supplying values of the monitored quantities exemplified above or supplying values of other physical quantities from which software 2811, 2831 can compute or estimate the monitored quantities. The reconfiguring of OTT connection 2850 can include message format, retransmission settings, preferred routing etc.; the reconfiguring need not affect base station 2820, and it can be unknown or imperceptible to base station 2820. Such procedures and functionalities can be known and practiced in the art. In certain embodiments, measurements can involve proprietary UE signaling facilitating host computer 2810's measurements of throughput, propagation times, latency and the like. The measurements can be implemented in that software 2811 and 2831 causes messages to be transmitted, in particular empty or 'dummy' messages, using OTT connection 2850 while it monitors propagation times, errors, etc.

FIG. 29 is a flowchart illustrating an exemplary method (e.g., procedure) implemented in a communication system, in accordance with various embodiments. The communication system includes a host computer, a base station and a UE which, in some exemplary embodiments, can be those described with reference to other figures herein. For simplicity of the present disclosure, only drawing references to FIG. 29 will be included in this section. In step 2910, the host computer provides user data. In substep 2911 (which can be optional) of step 2910, the host computer provides the user data by executing a host application. In step 2920, the host computer initiates a transmission carrying the user data to the UE. In step 2930 (which can be optional), the base station transmits to the UE the user data which was carried in the transmission that the host computer initiated, in accordance with the teachings of the embodiments described throughout this disclosure. In step 2940 (which can also be optional), the UE executes a client application associated with the host application executed by the host computer.

FIG. 30 is a flowchart illustrating an exemplary method (e.g., procedure) implemented in a communication system, in accordance with various embodiments. The communication system includes a host computer, a base station and a UE which can be those described with reference to other figures herein. For simplicity of the present disclosure, only drawing references to FIG. 30 will be included in this section. In step 3010 of the method, the host computer provides user data. In an optional substep (not shown) the host computer provides the user data by executing a host application. In step 3020, the host computer initiates a transmission carrying the user data to the UE. The transmission can pass via the base station, in accordance with the teachings of the embodiments described throughout this disclosure. In step 3030 (which can be optional), the UE receives the user data carried in the transmission.

FIG. 31 is a flowchart illustrating an exemplary method (e.g., procedure) implemented in a communication system, in accordance with various embodiments. The communication system includes a host computer, a base station and a UE which can be those described with reference to other figures herein. For simplicity of the present disclosure, only drawing references to FIG. 31 will be included in this section. In step 3110 (which can be optional), the UE receives input data provided by the host computer. Additionally or alternatively, in step 3120, the UE provides user data. In substep 3121 (which can be optional) of step 3120, the UE provides the user data by executing a client application. In substep 3111 (which can be optional) of step 3110, the UE executes a client application which provides the user data in reaction to the received input data provided by the host computer. In providing the user data, the executed client application can further consider user input received from the user. Regardless of the specific manner in which the user data was provided, the UE initiates, in substep 3130 (which can be optional), transmission of the user data to the host computer. In step 3140 of the method, the host computer receives the user data transmitted from the UE, in accordance with the teachings of the embodiments described throughout this disclosure.

FIG. 32 is a flowchart illustrating an exemplary method (e.g., procedure) implemented in a communication system, in accordance with various embodiments. The communication system includes a host computer, a base station and a UE which can be those described with reference to other figures herein. For simplicity of the present disclosure, only drawing references to FIG. 32 will be included in this section. In step 3210 (which can be optional), in accordance with the teachings of the embodiments described throughout this disclosure, the base station receives user data from the UE. In step 3220 (which can be optional), the base station initiates transmission of the received user data to the host computer. In step 3230 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The techniques and apparatus described herein include, but are not limited to, the following enumerated examples:

A1. A method, for a user equipment (UE), for performing quality of experience (QoE) measurements configured by a wireless network, the method comprising:

receiving, from a radio access network node (RNN) in the wireless network, a QoE measurement configuration for one or more applications; and performing measurements for the one or more applications, wherein the measurements include:

application-layer QoE measurements based on the QoE measurement configuration, and access-layer measurements related to one or more paths that carry data associated with the one or more applications; and sending, to the RNN in accordance with QoE measurement configuration, one or more messages comprising:

QoE measurement reports comprising the QoE measurements; and network assistance information (NAI) based on the access-layer measurements.

A2. The method of embodiment A1, wherein the NAI includes:

an indication of whether one or multiple paths carry the data associated with the one or more applications; and in case of multiple paths, one or more of the following:

indication of multi-path features used in the multiple paths;

indication of portions of the data carried by each path;

indication of whether the multiple paths carry the same data or different subsets of the data;

channel or link quality information associated with each path; and one or more identifiers associated with each path.

A3. The method of embodiment A2, wherein the multipath features used in the multiple paths include any of the following:

dual connectivity (DC) with two different RNNs;

carrier aggregation (CA) with multiple component carriers;

uplink (UL) and supplementary UL;

licensed and unlicensed spectrum;

duplicate PDCP PDUs over multiple routes;

multiple GTP-U tunnels; and multiple backhaul access protocol (BAP) routes.

A4. The method of embodiment A3, wherein when the multi-path features used in the multiple paths include DC with two different RNNs, the NAI includes an indication of whether the data is carried by MCG bearer, MCG split bearer, SCG bearer, and/or SCG split bearer.

A5. The method of any of embodiments A2-A4, wherein the NAI also includes one of the following:

indication of one or more switches between single and multiple paths during the QoE measurements and a time of occurrence for each switch; or a plurality of NAI subsets corresponding to respective durations between consecutive switches between single and multiple paths during the QoE measurements.

A6. The method of any of embodiments A2-A5, wherein the channel or link quality information associated with each path is based on one or more of the following access-layer measurements: reference signal received power (RSRP), reference signal received quality (RSRQ), signal-to-interference-plus-noise ratio (SINR), received signal strength (RSSI), reference signal code power (RSCP), Ec/NO ratio, pathloss, hybrid ARQ (HARQ) retransmission information, radio link control (RLC) retransmission information, transmission control protocol (TCP) retransmission information, listen-before-talk (LBT) failure rate, block error rate, and fraction of lost packets.

A7. The method of any of embodiments A2-A6, wherein the channel or link quality information associated with each path is provided in one or more of the following forms:

one or more statistics for a measured application session;

multiple samples or sample averages collected during respective time intervals comprising the measured application session; and a last sample collected before sending the QoE measurement report.

A8. The method of any of embodiments A1-A7, wherein the NAI also includes information related to UE mobility, including any of the following:

public land mobile network (PLMN) identity, tracking area code (TAC), and/or tracking area identity (TAI) in which UE is registered while performing the access-layer and QoE measurements;

an indication that the UE has performed one or more mobility operations since sending the most recent QoE measurement report;

number of mobility operations performed;

identification of each mobility operation;

time of occurrence of each mobility operation;

identification of source and target cells for each mobility operation;

list of visited cells since sending the most recent QoE measurement report; and timer values associated with each mobility operation.

A9. The method of embodiment A8, wherein the list of visited cells includes only cells visited while the UE was in a connected state.

A10. The method of any of embodiments A1-A9, wherein sending the one or more messages to the RNN in accordance with QoE measurement configuration comprises:

sending the NAI from the UE access layer to the UE application layer; and combining the NAI with the QoE measurement report and sending the combination as an application-layer message to a measurement collection entity (MCE) via the RNN.

A11. The method of any of embodiments A1-A9, wherein sending the one or more messages in accordance with QoE measurement configuration comprises:

sending a container comprising the QoE measurement report from the UE application layer to the UE access layer;

combining the NAI with the container and sending the combination to the RNN in an access-layer message.

A12. The method of any of embodiments A1-A9, wherein sending the one or more messages in accordance with QoE measurement configuration comprises:

sending the QoE measurement report to a measurement collection entity (MCE) via the RNN; and sending the NAI to the RNN in an access-layer message.

A13. The method of any of embodiments A1-A12, wherein when multiple paths carry the data associated with the one or more applications, each message comprising a QoE measurement report and NAI is sent according to one of the following delivery options:

via one of the multiple paths;

redundantly via the multiple paths; or

QoE measurements and NAI associated with the respective paths are sent via the respective paths.

A14. The method of embodiment A13, further comprising selecting a delivery option for the NAI based on one or more of the following:

current network conditions;

current radio channel conditions;

criticality of the QoE measurements and/or NAI;

size of the QoE measurements and/or NAI; and one or more rules provided by the RNN.

A15. The method of any of embodiments A1-A14, further comprising, after receiving the QoE measurement configuration, receiving, from the RNN, an access-layer measurement configuration (AMC) including one or more of the following:

a command to initiate access-layer measurements upon UE initiation of respective application sessions for the one or more applications;

identification of which access-layer measurements should be performed; and an indication that the access-layer measurements are associated with the QoE measurements.

A16. The method of embodiment A15, wherein:

the method further comprises, after receiving the QoE measurement configuration and the AMC, initiating respective application sessions for the one or more applications;

performing the measurements is initiated in response to initiating the respective application sessions; and performing the access-layer measurements is based on the AMC.

B1. A method, for a radio access network node (RNN) in a wireless network, for configuring quality of experience (QoE) measurements by user equipment (UEs), the method comprising:

receiving, from a measurement function in the wireless network, a QoE measurement configuration associated with one or more applications;

sending the QoE measurement configuration to a UE; and receiving, from the UE in accordance with the QoE measurement configuration, one or more messages comprising:

QoE measurement reports comprising application-layer QoE measurements based on the QoE measurement configuration; and network assistance information (NAI) based on access-layer measurements related to one or more paths that carry data associated with the one or more applications.

B2. The method of embodiment B1, wherein the NAI includes:

an indication of whether one or multiple paths carry the data associated with the one or more applications; and in case of multiple paths, one or more of the following:

indication of multi-path features used in the multiple paths;

indication of portions of the data carried by each path;

indication of whether the multiple paths carry the same data or different subsets of the data;

channel or link quality information associated with each path; and one or more identifiers associated with each path.

B3. The method of embodiment B2, wherein the multi-path features used in the multiple paths include any of the following:

dual connectivity (DC) with two different RNNs;

carrier aggregation (CA) with multiple component carriers;

uplink (UL) and supplementary UL;

licensed and unlicensed spectrum;

duplicate PDCP PDUs over multiple routes;

multiple GTP-U tunnels; and multiple backhaul access protocol (BAP) routes.

B4. The method of embodiment B3, wherein when the multi-path features used in the multiple paths include DC with two different RNNs, the NAI includes an indication of whether the data is carried by MCG bearer, MCG split bearer, SCG bearer, and/or SCG split bearer.

B5. The method of any of embodiments B2-B4, wherein the NAI also includes one of the following:

indication of one or more switches between single and multiple paths during the QoE measurements and a time of occurrence for each switch; or a plurality of NAI subsets corresponding to respective durations between consecutive switches between single and multiple paths during the QoE measurements.

B6. The method of any of embodiments B2-B5, wherein the channel or link quality information associated with each path is based on one or more of the following access-layer measurements: reference signal received power (RSRP), reference signal received quality (RSRQ), signal-to-interference-plus-noise ratio (SINR), received signal strength (RSSI), reference signal code power (RSCP), Ec/N0 ratio, pathloss, hybrid ARQ (HARQ) retransmission information, radio link control (RLC) retransmission information, transmission control protocol (TCP) retransmission information, listen-before-talk (LBT) failure rate, block error rate, and fraction of lost packets.

B7. The method of any of embodiments B2-B6, wherein the channel or link quality information associated with each path is provided in one or more of the following forms:

one or more statistics for a measured application session;

multiple samples or sample averages collected during respective time intervals comprising the measured application session; and a last sample collected before sending the QoE measurement report.

B8. The method of any of embodiments B1-B7, wherein the NAI also includes information related to UE mobility, including any of the following:

public land mobile network (PLMN) identity, tracking area code (TAC), and/or tracking area identity (TAI) in which UE is registered while performing the access-layer and QoE measurements;

an indication that the UE has performed one or more mobility operations since sending the most recent QoE measurement report;

number of mobility operations performed;

identification of each mobility operation;

time of occurrence of each mobility operation;

identification of source and target cells for each mobility operation;

list of visited cells since sending the most recent QoE measurement report; and timer values associated with each mobility operation.

B9 The method of embodiment B8, wherein the list of visited cells include only cells visited while the UE was in a connected state.

B10. The method of any of embodiments B1-B9, wherein:
the one or more messages from the UE include an application-layer message that includes the NAI and a container comprising a QoE measurement report; and
the method further comprises forwarding the application-layer message to a measurement collection entity (MCE).

B11. The method of any of embodiments B1-B9, wherein:
the one or more messages from the UE include:
an application-layer message that includes a container comprising a QoE measurement report; and
an access-layer message including the NAI;
the method further comprises forwarding the application-layer message and the access-layer message to a measurement collection entity (MCE) as one of the following:
as combined into a single application-layer message; or
as separate application-layer messages.

B12. The method of any of embodiments B1-B11, further comprising sending, to the UE, one or more rules for selecting one of the following delivery options for the NAI:
via one of multiple paths that carry the data associated with the one or more applications;
redundantly via the multiple paths; or
QoE measurements and NAI associated with the respective paths are sent via the respective paths.

B13. The method of embodiment B12, wherein the one or more rules are related to one or more of the following:
current network conditions;
current radio channel conditions;
criticality of the QoE measurements and/or NAI; and
size of the QoE measurements and/or NAI.

B14. The method of any of embodiments B1-B13, further comprising, after sending the QoE measurement configuration, sending, to the UE, an access-layer measurement configuration (AMC) including one or more of the following:
a command to initiate access-layer measurements upon UE initiation of respective application sessions for the one or more applications;
identification of which access-layer measurements should be performed; and
an indication that the access-layer measurements are associated with the QoE measurements.

C1. A method, for a measurement function associated with a wireless network, for configuring quality of experience (QoE) measurements by user equipment (UEs), the method comprising:
sending, to a radio access network node (RNN) in the wireless network, a QoE measurement configuration associated with one or more applications and with a UE served by the RNN; and
receiving, from the UE via the RNN, one or more messages comprising:
QoE measurement reports comprising application-layer QoE measurements based on the QoE measurement configuration, and network assistance information (NAI) based on access-layer measurements related to one or more paths that carry data associated with the one or more applications.

C2. The method of embodiment C1, wherein the NAI includes:
an indication of whether one or multiple paths carry the data associated with the one or more applications; and
in case of multiple paths, one or more of the following:
indication of multi-path features used in the multiple paths;
indication of portions of the data carried by each path;
indication of whether the multiple paths carry the same data or different subsets of the data;
channel or link quality information associated with each path; and
one or more identifiers associated with each path.

C3. The method of embodiment C2, wherein the multi-path features used in the multiple paths include any of the following:
dual connectivity (DC) with two different RNNs;
carrier aggregation (CA) with multiple component carriers;
uplink (UL) and supplementary UL;
licensed and unlicensed spectrum;
duplicate PDCP PDUs over multiple routes;
multiple GTP-U tunnels; and
multiple backhaul access protocol (BAP) routes.

C4. The method of embodiment C3, wherein when the multi-path features used in the multiple paths include DC with two different RNNs, the NAI includes an indication of whether the data is carried by MCG bearer, MCG split bearer, SCG bearer, and/or SCG split bearer.

C5. The method of any of embodiments C2-C4, wherein the NAI also includes one of the following:
indication of one or more switches between single and multiple paths during the QoE measurements and a time of occurrence for each switch; or
a plurality of NAI subsets corresponding to respective durations between consecutive switches between single and multiple paths during the QoE measurements.

C6. The method of any of embodiments C2-C5, wherein the channel or link quality information associated with each path is based on one or more of the following access-layer measurements: reference signal received power (RSRP), reference signal received quality (RSRQ), signal-to-interference-plus-noise ratio (SINR), received signal strength (RSSI), reference signal code power (RSCP), Ec/NO ratio, pathloss, hybrid ARQ (HARQ) retransmission information, radio link control (RLC) retransmission information, transmission control protocol (TCP) retransmission information, listen-before-talk (LBT) failure rate, block error rate, and fraction of lost packets.

C7. The method of any of embodiments C2-C6, wherein the channel or link quality information associated with each path is provided in one or more of the following forms:
one or more statistics for a measured application session;
multiple samples or sample averages collected during respective time intervals comprising the measured application session; and a last sample collected before sending the QoE measurement report.

C8. The method of any of embodiments C1-C7, wherein the NAI also includes information related to UE mobility, including any of the following:

public land mobile network (PLMN) identity, tracking area code (TAC), and/or tracking area identity (TAI) in which UE is registered while performing the access-layer and QoE measurements;

an indication that the UE has performed one or more mobility operations since sending the most recent QoE measurement report;

number of mobility operations performed;

identification of each mobility operation;

time of occurrence of each mobility operation;

identification of source and target cells for each mobility operation;

list of visited cells since sending the most recent QoE measurement report; and timer values associated with each mobility operation.

C9. The method of embodiment C8, wherein the list of visited cells include only cells visited while the UE was in a connected state.

C10. The method of any of embodiments C1-C9, wherein the one or more messages received from the UE via the RNN include one or more of the following:

an application-layer message that includes the NAI and a container comprising a QoE measurement report; and a first application-layer message including the container and a second application-layer message including the NAI.

C11. The method of any of embodiments C1-C11, wherein when multiple paths carry the data associated with the one or more applications, each message comprising a QoE measurement report and NAI is received from the UE according to one of the following delivery options:

via one of the multiple paths;

redundantly via the multiple paths; or

QoE measurements and NAI associated with the respective paths are received via the respective paths.

D1. A user equipment (UE) arranged to perform quality of experience (QoE) measurements configured by a wireless network, the UE comprising:

radio transceiver circuitry configured to communicate with a radio access network node (RNN) in the wireless network; and processing circuitry operatively coupled to the radio transceiver circuitry, whereby the processing circuitry and the radio transceiver circuitry are configured to perform operations corresponding to the methods of any of embodiments A1-A16.

D2. A user equipment (UE) arranged to perform quality of experience (QoE) measurements configured by a wireless network, the UE being further arranged to perform operations corresponding to the methods of any of embodiments A1-A16.

D3. A non-transitory, computer-readable medium storing computer-executable instructions that, when executed by processing circuitry of a user equipment (UE) arranged to perform quality of experience (QoE) measurements configured by a wireless network, configure the UE to perform operations corresponding to the methods of any of embodiments A1-A16.

D4. A computer program product comprising computer-executable instructions that, when executed by processing circuitry of a user equipment (UE) arranged to perform quality of experience (QoE) measurements configured by a wireless network, configure the UE to perform operations corresponding to the methods of any of embodiments A1-A16.

E1. A radio access network node (RNN) arranged to configure quality of experience (QoE) measurements by user equipment (UEs) in a wireless network, the RNN comprising:

communication interface circuitry configured to communicate with one or more UEs and with a measurement collection entity (MCE) in the wireless network; and processing circuitry operatively coupled to the communication interface circuitry, whereby the processing circuitry and the communication interface circuitry are configured to perform operations corresponding to the methods of any of embodiments B1-B14.

E2. A radio network node (RNN) arranged to configure quality of experience (QoE) measurements by user equipment (UEs) in a wireless network, the RNN being further arranged to perform operations corresponding to the methods of any of embodiments B1-B14.

E3. A non-transitory, computer-readable medium storing computer-executable instructions that, when executed by processing circuitry of a radio network node (RNN) arranged to configure quality of experience (QoE) measurements by user equipment (UEs) in a wireless network, configure the RNN to perform operations corresponding to the methods of any of embodiments B1-B14.

E4. A computer program product comprising computer-executable instructions that, when executed by processing circuitry of a radio network node (RNN) arranged to configure quality of experience (QoE) measurements by user equipment (UEs) in a wireless network, configure the RNN to perform operations corresponding to the methods of any of embodiments B1-B14.

F1. A measurement function in a wireless network, the measurement function comprising:

communication interface circuitry configured to communicate with one or more UEs via at least one radio access network node (RNN) in the wireless network; and processing circuitry operatively coupled to the communication interface circuitry, whereby the processing circuitry and the communication interface circuitry are configured to perform operations corresponding to the methods of any of embodiments C1-C11.

F2. A measurement function in a wireless network, the measurement function being arranged to perform operations corresponding to the methods of any of embodiments C1-C11.

F3. A non-transitory, computer-readable medium storing computer-executable instructions that, when executed by processing circuitry associated with a measurement function in a wireless network, configure the measurement function to perform operations corresponding to the methods of any of embodiments C1-C11.

F4. A computer program product comprising computer-executable instructions that, when executed by processing circuitry associated with a measurement function in a wireless network, configure the measurement function to perform operations corresponding to the methods of any of embodiments C1-C11.

The invention claimed is:

1. A method for a user equipment (UE) to perform quality of experience (QoE) measurements configured by a wireless network, the method comprising:

receiving, from a radio access network node (RNN) in the wireless network, a QoE measurement configuration for one or more services provided by the UE application layer;

performing application-layer QoE measurements for the one or more services in accordance with the QoE measurement configuration; and sending, to or via the RNN in accordance with QoE measurement configuration, one or more messages comprising:

a QoE measurement report comprising results of the QoE measurements; and network assistance information (NAI) related to one or more paths that carry data associated with the one or more services, wherein:

sending the one or more messages to the RNN in accordance with QoE measurement configuration comprises first operations, second operations, or third operations;

the first operations include:

sending the NAI from the UE access layer to the UE application layer; and combining the NAI with the QoE measurement report and sending the combination as an application-layer message to a measurement function via the RNN;

the second operations include:

sending a container comprising the QoE measurement report from the UE application layer to the UE access layer; and combining the NAI with the container and sending the combination to the measurement function via an access-layer message to the RNN; and the third operations include:

sending the following to the measurement function:

the NAI via an access layer-message to the RNN; and a container comprising the QoE measurement report via an application-layer message to the RNN.

2. The method of claim 1, wherein the NAI includes the following:

an indication of whether one or multiple paths carry the data associated with the one or more services;

channel or link quality information associated with each path that carries the data;

one or more identifiers associated with each path that carries the data; and when multiple paths carry the data associated with the one or more services, one or more of the following:

indication of multi-path features used in the multiple paths;

indication of portions of the data carried by each path; and indication of whether the multiple paths carry the same data or different subsets of the data.

3. The method of claim 1, wherein the NAI includes information related to UE mobility, including any of the following:

one or more of the following to which the UE was registered while performing the QoE measurements: public land mobile network (PLMN) identity; tracking area code (TAC); and tracking area identity (TAI);

an indication that the UE has performed one or more mobility operations since sending the most recent QoE measurement report;

number of mobility operations performed;

identification of each mobility operation;

time of occurrence of each mobility operation;

identification of source and target cells for each mobility operation;

list of visited cells since sending the most recent QoE measurement report; and timer values associated with each mobility operation.

4. The method of claim 1, wherein when multiple paths carry the data associated with the one or more services, each message comprising a QoE measurement report and NAI is sent according to one of the following delivery options:

via one of the multiple paths;

redundantly via the multiple paths; or

QoE measurements and NAI associated with the respective paths are sent via the respective paths.

5. The method of claim 1, further comprising, after receiving the QoE measurement configuration, receiving from the RNN an access-layer measurement configuration (AMC) that includes one or more of the following:

a command to initiate access-layer measurements upon UE initiation of respective application sessions for the one or more services;

identification of which access-layer measurements should be performed; and an indication that the access-layer measurements are associated with the QoE measurements.

6. A user equipment (UE) arranged to perform quality of experience (QoE) measurements configured by a wireless network, the UE comprising:

radio interface circuitry configured to communicate with a radio access network node (RNN) in the wireless network; and processing circuitry operatively coupled to the radio interface circuitry, whereby the processing circuitry and the radio interface circuitry are configured to perform operations corresponding to the method of claim 1.

7. The UE of claim 6, wherein the NAI includes the following:

an indication of whether one or multiple paths carry the data associated with the one or more services;

channel or link quality information associated with each path that carries the data;

one or more identifiers associated with each path that carries the data; and when multiple paths carry the data associated with the one or more services, one or more of the following:

indication of multi-path features used in the multiple paths;

indication of portions of the data carried by each path; and indication of whether the multiple paths carry the same data or different subsets of the data.

8. The UE of claim 6, wherein the NAI includes information related to UE mobility, including any of the following:

one or more of the following to which the UE was registered while performing the QoE measurements: public land mobile network (PLMN) identity; tracking area code (TAC); and tracking area identity (TAI);

an indication that the UE has performed one or more mobility operations since sending the most recent QoE measurement report;

number of mobility operations performed;

identification of each mobility operation;

time of occurrence of each mobility operation;

identification of source and target cells for each mobility operation;

list of visited cells since sending the most recent QoE measurement report; and timer values associated with each mobility operation.

9. A method for a radio access network node (RNN) in a wireless network to configures quality of experience (QoE) measurements by user equipment (UEs), the method comprising:

receiving, from a measurement function associated with the wireless network, a QoE measurement configuration associated with one or more services provided by an application layer of a UE served by the RNN;

sending the QoE measurement configuration to the UE; and receiving, from the UE in accordance with the QoE measurement configuration, one or more messages comprising:

a QoE measurement report comprising results of application-layer QoE measurements based on the QoE measurement configuration; and network assistance information (NAI) related to one or more paths that carry data associated with the one or more services, wherein:

the one or more messages are arranged according to one of the following:

an access layer-message that includes the NAI and an application-layer message that includes a container comprising the QoE measurement report; or an application-layer message that includes both the NAI and the container comprising the QoE measurement report; and the method further comprises forwarding the NAI and the container comprising the QoE measurement report to the measurement function as one of the following:

one application-layer message that includes both the NAI and the container; or two application-layer messages, one that includes the NAI and another that includes the container.

10. The method of claim 9, further comprising sending, to the UE, one or more rules for selecting one of the following delivery options for the NAI:

via one of multiple paths that carry the data associated with the one or more services;

redundantly via the multiple paths; or

QoE measurements and NAI associated with the respective paths are sent via the respective paths.

11. The method of claim 9, further comprising, after sending the QoE measurement configuration, sending to the UE an access-layer measurement configuration (AMC) that includes one or more of the following:

a command to initiate access-layer measurements upon UE initiation of respective application sessions for the one or more services;

identification of which access-layer measurements should be performed; and an indication that the access-layer measurements are associated with the QoE measurements, wherein the received NAI is based on the access-layer measurements.

12. A radio access network node (RNN) arranged to configure quality of experience (QoE) measurements by user equipment (UEs) in a wireless network, the RNN comprising:

communication interface circuitry configured to communicate with one or more UEs and with a measurement function associated with the wireless network; and processing circuitry operatively coupled to the communication interface circuitry, whereby the processing circuitry and the communication interface circuitry are configured to perform operations corresponding to the method of claim 9.

13. The RNN of claim 12, wherein the NAI includes the following:

an indication of whether one or multiple paths carry the data associated with the one or more services;

channel or link quality information associated with each path that carries the data;

one or more identifiers associated with each path that carries the data; and when multiple paths carry the data associated with the one or more services, one or more of the following:

indication of multi-path features used in the multiple paths;

indication of portions of the data carried by each path; and indication of whether the multiple paths carry the same data or different subsets of the data.

14. The RNN of claim 13, wherein the NAI includes information related to UE mobility, including any of the following:

one or more of the following to which the UE was registered while performing the QoE measurements: public land mobile network (PLMN) identity; tracking area code (TAC); and tracking area identity (TAI);

an indication that the UE has performed one or more mobility operations since sending the most recent QoE measurement report;

number of mobility operations performed;

identification of each mobility operation;

time of occurrence of each mobility operation;

identification of source and target cells for each mobility operation;

list of visited cells since sending the most recent QoE measurement report; and timer values associated with each mobility operation.

15. A method for a measurement function associated with a wireless network to configure quality of experience (QoE) measurements by user equipment (UEs) in the wireless network, the method comprising:

sending, to a radio access network node (RNN) in the wireless network, a QoE measurement configuration associated with one or more services provided by an application layer of a UE served by the RNN; and receiving, from the UE via the RNN, one or more messages comprising:

a QoE measurement report comprising results of application-layer QoE measurements based on the QoE measurement configuration, and network assistance information (NAI) related to one or more paths that carry data associated with the one or more services, wherein the one or more messages are arranged according to one of the following:

one application-layer message that includes both the NAI and a container comprising a QoE measurement report; or two application-layer messages, one that includes the NAI and another that includes the container comprising the QoE measurement report.

16. The method of claim 15, wherein the NAI includes the following:

an indication of whether one or multiple paths carry the data associated with the one or more services;

channel or link quality information associated with each path that carries the data;

one or more identifiers associated with each path that carries the data; and when multiple paths carry the data associated with the one or more services, one or more of the following:

indication of multi-path features used in the multiple paths;

indication of portions of the data carried by each path; and indication of whether the multiple paths carry the same data or different subsets of the data.

17. The method of claim 15, wherein the NAI also includes information related to UE mobility, including any of the following:

one or more of the following to which the UE was registered while performing the QoE measurements: public land mobile network (PLMN) identity; tracking area code (TAC); and tracking area identity (TAI);

an indication that the UE has performed one or more mobility operations since sending the most recent QoE measurement report;

number of mobility operations performed;

identification of each mobility operation;

time of occurrence of each mobility operation;

identification of source and target cells for each mobility operation;

list of visited cells since sending the most recent QoE measurement report; and timer values associated with each mobility operation.

18. A measurement function associated with a wireless network, wherein the measurement function is implemented by the following:

communication interface circuitry configured to communicate with one or more user equipment (UEs) via at least one radio access network node (RNN) in the wireless network; and processing circuitry operatively coupled to the communication interface circuitry, whereby the processing circuitry and the communication interface circuitry are configured to perform operations corresponding to the method of claim 15.

\* \* \* \* \*